United States Patent
Lin et al.

(10) Patent No.: US 11,004,173 B2
(45) Date of Patent: *May 11, 2021

(54) METHOD FOR PROCESSING PROJECTION-BASED FRAME THAT INCLUDES AT LEAST ONE PROJECTION FACE PACKED IN 360-DEGREE VIRTUAL REALITY PROJECTION LAYOUT

(71) Applicant: MEDIATEK INC., Hsin-Chu (TW)

(72) Inventors: Jian-Liang Lin, Hsinchu (TW); Peng Wang, Beijing (CN); Lin Liu, Beijing (CN); Ya-Hsuan Lee, Hsinchu (TW); Hung-Chih Lin, Hsinchu (TW); Shen-Kai Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/143,410

(22) Filed: Sep. 26, 2018

(65) Prior Publication Data

US 2019/0026858 A1    Jan. 24, 2019

Related U.S. Application Data

(63) Continuation-in-part of application No. 15/917,844, filed on Mar. 12, 2018.

(Continued)

(30) Foreign Application Priority Data

Apr. 3, 2018   (WO) ............... PCT/CN2018/081723
Sep. 25, 2018  (WO) ............... PCT/CN2018/107351

(51) Int. Cl.
*H04N 19/182*    (2014.01)
*H04N 19/59*     (2014.01)
(Continued)

(52) U.S. Cl.
CPC ............ *G06T 3/0062* (2013.01); *G06T 3/005* (2013.01); *G06T 3/0037* (2013.01); *G06T 11/00* (2013.01);
(Continued)

(58) Field of Classification Search
CPC .. H04N 13/161; H04N 13/111; H04N 19/182; G06T 3/0062; G06T 3/005
See application file for complete search history.

(56) References Cited

U.S. PATENT DOCUMENTS 6,781,598 B1   8/2004  Yamamoto
8,786,675 B2   7/2014  Deering
(Continued)

FOREIGN PATENT DOCUMENTS

CN    101002474 A    7/2007
CN    101127911 A    2/2008
(Continued)

OTHER PUBLICATIONS

"International Search Report" dated Nov. 16, 2018 for International application No. PCT/CN2018/100933, International filing date:Aug. 17, 2018.

(Continued)

*Primary Examiner* — Brian T Pendleton
*Assistant Examiner* — Frank Johnson
(74) *Attorney, Agent, or Firm* — Winston Hsu

(57) ABSTRACT

A video processing method includes: obtaining a plurality of projection faces from an omnidirectional content of a sphere, wherein the omnidirectional content of the sphere is mapped onto the projection faces via cubemap projection, and the projection faces comprise a first projection face; obtaining, by a re-sampling circuit, a first re-sampled projection face by re-sampling at least a portion of the first projection face through non-uniform mapping; generating a projection- (Continued)

based frame according to a projection layout of the cubemap projection, wherein the projection-based frame comprises the first re-sampled projection face packed in the projection layout; and encoding the projection-based frame to generate a part of a bitstream.

10 Claims, 32 Drawing Sheets

Related U.S. Application Data

(60) Provisional application No. 62/470,425, filed on Mar. 13, 2017, provisional application No. 62/563,787, filed on Sep. 27, 2017, provisional application No. 62/583,078, filed on Nov. 8, 2017, provisional application No. 62/583,573, filed on Nov. 9, 2017.

(51) Int. Cl.
| | |
|---|---|
| *G06T 11/00* | (2006.01) |
| *G06T 3/00* | (2006.01) |
| *G06T 19/00* | (2011.01) |
| *H04N 19/597* | (2014.01) |
| *H04N 19/55* | (2014.01) |
| *H04N 19/86* | (2014.01) |

(52) U.S. Cl.
CPC ......... *G06T 19/006* (2013.01); *H04N 19/182* (2014.11); *H04N 19/55* (2014.11); *H04N 19/59* (2014.11); *H04N 19/597* (2014.11); *H04N 19/86* (2014.11)

(56) References Cited

U.S. PATENT DOCUMENTS

| | | | | |
|---|---|---|---|---|
| 9,721,393 | B1* | 8/2017 | Dunn | G09G 5/005 |
| 2004/0105597 | A1* | 6/2004 | Lelescu | G06T 3/0018 |
| | | | | 382/276 |
| 2009/0123088 | A1 | 5/2009 | Kallay | |
| 2014/0152655 | A1 | 6/2014 | Johnston | |
| 2014/0218354 | A1 | 8/2014 | Park | |
| 2016/0088282 | A1 | 3/2016 | Sadi | |
| 2016/0352791 | A1* | 12/2016 | Adams | H04L 65/4069 |
| 2016/0353146 | A1* | 12/2016 | Weaver | H04N 21/2662 |
| 2017/0045941 | A1 | 2/2017 | Tokubo | |
| 2017/0084073 | A1* | 3/2017 | Pio | G06T 15/20 |
| 2017/0251204 | A1* | 8/2017 | Gupte | H04N 13/178 |
| 2017/0280126 | A1* | 9/2017 | Van der Auwera | |
| | | | | G06T 3/0062 |
| 2017/0358126 | A1 | 12/2017 | Lim | |
| 2018/0027257 | A1* | 1/2018 | Izumi | G06T 9/00 |
| | | | | 386/328 |
| 2018/0167613 | A1* | 6/2018 | Hannuksela | H04N 19/17 |
| 2018/0249164 | A1 | 8/2018 | Kim | |
| 2018/0262775 | A1 | 9/2018 | Lee | |
| 2018/0288363 | A1* | 10/2018 | Amengual Galdon | |
| | | | | H04N 19/40 |
| 2018/0357804 | A1* | 12/2018 | Forutanpour | H04N 5/247 |
| 2018/0359487 | A1* | 12/2018 | Bang | H04N 19/50 |
| 2019/0005709 | A1* | 1/2019 | Kim | H04N 13/286 |
| 2019/0188828 | A1* | 6/2019 | Aggarwal | H04N 13/00 |
| 2019/0215532 | A1* | 7/2019 | He | G06T 17/10 |
| 2019/0253624 | A1* | 8/2019 | Kim | G06T 3/40 |

FOREIGN PATENT DOCUMENTS

| | | |
|---|---|---|
| CN | 104219584 A | 12/2014 |
| CN | 105898254 A | 8/2016 |
| CN | 105915907 A | 8/2016 |
| CN | 205545713 U | 8/2016 |
| CN | 106056531 A | 10/2016 |
| CN | 106162139 A | 11/2016 |
| CN | 205721064 U | 11/2016 |
| CN | 106358033 A | 1/2017 |
| CN | 106686381 A | 5/2017 |
| CN | 106846245 A | 6/2017 |
| CN | 107622474 A | 1/2018 |
| JP | 2000-67227 A | 3/2000 |
| JP | 2007-257100 A | 10/2007 |
| WO | 2004047426 A2 | 6/2004 |
| WO | 2006/016781 A1 | 2/2006 |
| WO | 2016/140082 A1 | 9/2016 |
| WO | 2016171404 A1 | 10/2016 |
| WO | 2017/158236 A2 | 9/2017 |
| WO | 2017/217763 A1 | 12/2017 |
| WO | 2018/064965 A1 | 4/2018 |

OTHER PUBLICATIONS

"International Search Report" dated Dec. 28, 2018 for International application No. PCT/CN2018/107351, International filing date:Sep. 25, 2018.

"International Search Report" dated May 31, 2018 for International application No. PCT/CN2018/078785, International filing date:Mar. 13, 2018.

"International Search Report" dated Jun. 22, 2018 for International application No. PCT/CN2018/081723, International filing date:Apr. 3, 2018.

Lee, Title of Invention: Method and Apparatus for Processing Projection-Based Frame With at Least One Projection Face Generated Using Non-Uniform Mapping, U.S. Appl. No. 15/766,829, filed Apr. 9, 2018.

Kashyap Kammachi-Sreedhar et al., AHG8: Nested polygonal chain packing of 360-degree ERP pictures, Joint Video Exploration Team (JVET) of ITU-T SG 16 WP 3 and ISO/IEC JTC 1/SC 29/WG 11, 5th Meeting, Jan. 12-20, 2017, pp. 1-3, JVET-E0090v2, Nokia, Geneva, CH.

Peng Wang et al., AHG 8: A viewport-based pyramid projection for VR360 video streaming, Joint Video Exploration Team (JVET) of ITU-T SG 16 WP 3 and ISO/IEC JTC 1/SC 29/WG 11, 5th Meeting, Jan. 12-20, 2017, pp. 1-4, JVET-E0058, MediaTek Inc., Geneva, CH.

Yan Ye et al., Algorithm descriptions of projection format conversion and video quality metrics in 360Lib, Joint Video Exploration Team (JVET) of ITU-T SG 16 WP 3 and ISO/IEC JTC 1/SC 29/WG 11, 5th Meeting, Jan. 12-20, 2017, pp. 1-22, JVET-E1003, InterDigital Communications, Samsung Electronics, Intel, Geneva, CH.

Thomas Engelhardt et al., Octahedron Environment Maps, http://www.vis.uni-stutt gart.de/engelhts/paper/vmvOctaMaps.pdf, Topics 1-6, Figures 1 and 4, 2008, USA.

K. Kammachi Sreedhar et al., AHG8: Test results for viewport-dependent pyramid, cube map, and equirectangular panorama schemes, Joint Video Exploration Team (JVET) of ITU-T SG 16 WP 3 and ISO/IEC JTC 1/SC 29/WG 11, 4th Meeting: Chengdu, CN, Oct. 15-21, 2016, Document: JVET-D0078, Summary, Section 1.1-1.4, Figures 2-4.

* cited by examiner (A)

(B)

|  | Pixels in faces | | | | Padding pixels | | | | |
|---|---|---|---|---|---|---|---|---|---|
| Ai | ● | ● | ● | ● | ● | ● | ● | ● | A'i |
| Weighting | 8 | 7 | 6 | 5 | 3 | 2 | 1 | 0 | |
| i | 3 | 2 | 1 | 0 | 0 | 1 | 2 | 3 | |

FIG. 35

|  | Pixels in faces | | | | Padding pixels | | | | |
|---|---|---|---|---|---|---|---|---|---|
| Ai | ● | ● | ● | ● | ● | ● | ● | ● | A'i |
| Weighting | 7.5 | 6.5 | 5.5 | 4.5 | 3.5 | 2.5 | 1.5 | 0.5 | |
| i | 3 | 2 | 1 | 0 | 0 | 1 | 2 | 3 | |

FIG. 36

| | i | $A_i$ | Weighting | | i | $A'_i$ | Weighting |
|---|---|---|---|---|---|---|---|
| Pixels in faces | 3 | $A_3$ | 7.5 | Padding pixels | 3 | $A'_3$ | 0.5 |
| | 2 | $A_2$ | 6.5 | | 2 | $A'_2$ | 1.5 |
| | 1 | $A_1$ | 5.5 | | 1 | $A'_1$ | 2.5 |
| | 0 | $A_0$ | 4.5 | | 0 | $A'_0$ | 3.5 |
| Boundary | | | | Boundary | | | |
| | -1 | $A_{-1}$ | 3.5 | Pixels in faces | -1 | $A'_{-1}$ | 4.5 |
| | -2 | $A_{-2}$ | 2.5 | | -2 | $A'_{-2}$ | 5.5 |
| Padding pixels | -3 | $A_{-3}$ | 1.5 | | -3 | $A'_{-3}$ | 6.5 |
| | -4 | $A_{-4}$ | 0.5 | | -4 | $A'_{-4}$ | 7.5 |

FIG. 39

| Pixels in faces | | | Padding pixels | | | |
|---|---|---|---|---|---|---|
| i | $A_i$ | Weighting | | i | $A'_i$ | Weighting |
| 3 | $A_3$ | 8 | | 3 | $A'_3$ | 0 |
| 2 | $A_2$ | 7 | | 2 | $A'_2$ | 1 |
| 1 | $A_1$ | 6 | | 1 | $A'_1$ | 2 |
| 0 | $A_0$ | 5 | | 0 | $A'_0$ | 3 |
| Boundary | | | | Boundary | | |
| -1 | $A_{-1}$ | 4 | | -1 | $A'_{-1}$ | 4 |
| -2 | $A_{-2}$ | 3 | | -2 | $A'_{-2}$ | 5 |
| -3 | $A_{-3}$ | 2 | | -3 | $A'_{-3}$ | 6 |
| -4 | $A_{-4}$ | 1 | | -4 | $A'_{-4}$ | 7 |
| Padding pixels | | | | Pixels in faces | | |

FIG. 40

METHOD FOR PROCESSING PROJECTION-BASED FRAME THAT INCLUDES AT LEAST ONE PROJECTION FACE PACKED IN 360-DEGREE VIRTUAL REALITY PROJECTION LAYOUT

CROSS REFERENCE TO RELATED APPLICATION

This application is a continuation-in-part of U.S. patent application Ser. No. 15/917,844 filed Mar. 12, 2018, and claims the benefit of U.S. provisional application No. 62/563,787 filed Sep. 27, 2017, U.S. provisional application No. 62/583,078 filed Nov. 8, 2017, and U.S. provisional application No. 62/583,573 filed Nov. 9, 2017, wherein the U.S. patent application Ser. No. 15/917,844 claims the benefit of U.S. provisional application No. 62/470,425 filed Mar. 13, 2017.

The entire contents of related applications, including U.S. patent application Ser. No. 15/917,844, U.S. provisional application No. 62/563,787, U.S. provisional application No. 62/583,078, U.S. provisional application No. 62/583,573, and U.S. provisional application No. 62/470,425, are incorporated herein by reference.

BACKGROUND

The present invention relates to processing omnidirectional image/video content, and more particularly, to a method for processing a projection-based frame that includes at least one projection face packed in a 360-degree virtual reality (360 VR) projection layout.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional image/video content corresponding to a sphere. With advances in camera rigs and HMDs, the delivery of VR content may soon become the bottleneck due to the high bitrate required for representing such a 360-degree image/video content. When the resolution of the omnidirectional video is 4K or higher, data compression/encoding is critical to bitrate reduction.

In general, the omnidirectional image/video content corresponding to the sphere is transformed into a sequence of images, each of which is a projection-based frame with a 360-degree image/video content represented by one or more projection faces arranged in a 360-degree Virtual Reality (360 VR) projection layout, and then the sequence of the projection-based frames is encoded into a bitstream for transmission. The projection-based frame may have image content discontinuity at layout boundaries and/or face edges. As a result, the image quality around layout boundaries and/or face edges after compression may be poor. Moreover, artifacts may be introduced by projection layout conversion of a decoded projection-based frame, thus leading to image quality degradation of a converted projection-based frame.

SUMMARY

One of the objectives of the claimed invention is to provide a method for processing a projection-based frame that includes at least one projection face packed in a 360-degree virtual reality (360 VR) projection layout.

According to a first aspect of the present invention, an exemplary video processing method is disclosed. The exemplary video processing method includes: obtaining a plurality of projection faces from an omnidirectional content of a sphere, wherein the omnidirectional content of the sphere is mapped onto the projection faces via cubemap projection, and the projection faces comprise a first projection face; obtaining, by a re-sampling circuit, a first re-sampled projection face by re-sampling at least a portion of the first projection face through non-uniform mapping, wherein the first projection face has a first source region and a second source region, the first re-sampled projection face has a first re-sampled region and a second re-sampled region, the first re-sampled region is derived from re-sampling the first source region with a first sampling density, and the second re-sampled region is derived from re-sampling the second source region with a second sampling density that is different from the first sampling density; generating a projection-based frame according to a projection layout of the cubemap projection, wherein the projection-based frame comprises the first re-sampled projection face packed in the projection layout; and encoding the projection-based frame to generate a part of a bitstream.

According to a second aspect of the present invention, an exemplary video processing method is disclosed. The exemplary video processing method includes: obtaining a plurality of projection faces from an omnidirectional content of a sphere according to a cubemap projection; creating, by a padding circuit, at least one padding region; generating a projection-based frame by packing the projection faces and said at least one padding region in a projection layout of the cubemap projection, wherein the projection faces packed in the projection layout comprise a first projection face; said at least one padding region packed in the projection layout comprises a first padding region; the first padding region connects with at least the first projection face, and forms at least a portion of one boundary of the projection layout; and encoding the projection-based frame to generate a part of a bitstream.

According to a third aspect of the present invention, an exemplary video processing method is disclosed. The exemplary video processing method includes: receiving a part of a bitstream, and decoding the part of the bitstream to generate a decoded one padding region packed in a projection layout of a 360-degree projection-based frame with at least one projection face and at least Virtual Reality (360 VR) projection. The step of decoding the part of the bitstream to generate a decoded projection-based frame comprises: reconstructing a first pixel included in said at least one padding region by blending a decoded pixel value obtained for the first pixel and a decoded pixel value obtained for a second pixel included in said at least one projection face.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 35 is a diagram illustrating the relationship between the weighting values of pixels and the index values of pixels that are involved in updating pixel values of pixels in a projection face according to an embodiment of the present invention.

FIG. 36 is a diagram illustrating another relationship between the weighting values of pixels and the index values of pixels that are involved in updating pixel values of pixels in a projection face according to an embodiment of the present invention.

FIG. 39 is a diagram illustrating the relationship between the weighting values of pixels and the index values of pixels that are involved in updating pixel values of pixels in a projection face and pixels values of padding pixels in a padding region according to an embodiment of the present invention.

FIG. 40 is a diagram illustrating another relationship between the weighting values of pixels and the index values of pixels that are involved in updating pixel values of pixels in a projection face and pixels values of padding pixels in a padding region according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
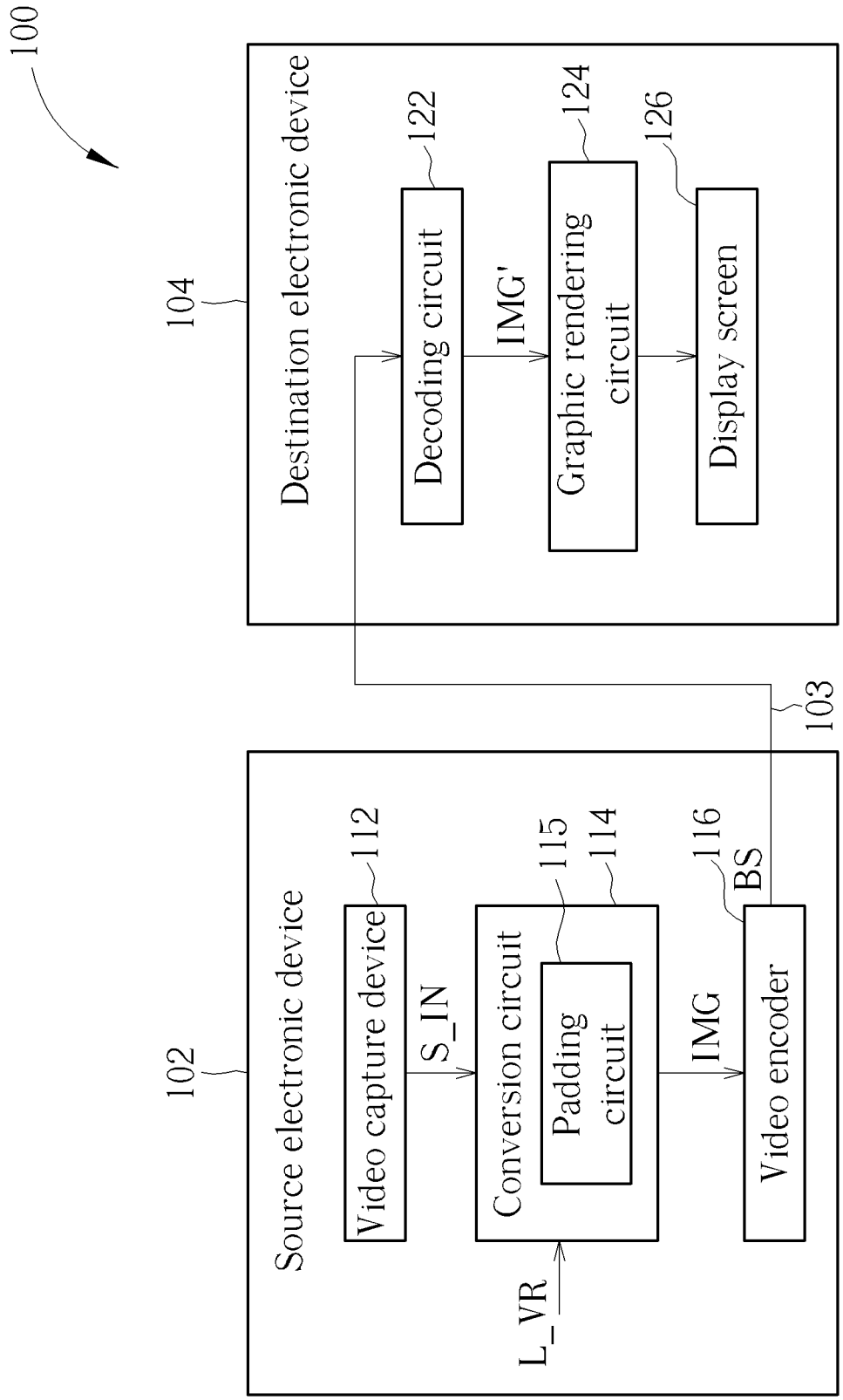
FIG. 1 is a diagram illustrating a first 360-degree Virtual Reality (360 VR) system according to an embodiment of the present invention.

FIG. 1 is a diagram illustrating a first 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be a set of cameras used to provide an omnidirectional image/video content (e.g., multiple images that cover the whole surroundings) S_IN corresponding to a sphere. The conversion circuit 114 is coupled between the video capture device 112 and the video encoder 116. The conversion circuit 114 generates a projection-based frame IMG with a 360-degree Virtual Reality (360 VR) projection layout L_VR according to the omnidirectional image/video content S_IN. For example, the projection-based frame IMG may be one frame included in a sequence of projection-based frames generated from the conversion circuit 114. The video encoder 116 is an encoding circuit used to encode/compress the projection-based frames IMG to generate a part of a bitstream BS. Further, the video encoder 116 outputs the bitstream BS to the destination electronic device 104 via a transmission means 103. For example, the sequence of projection-based frames may be encoded into the bitstream BS, and the transmission means 103 may be a wired/wireless communication link or a storage medium.

The destination electronic device 104 may be a head-mounted display (HMD) device. As shown in FIG. 1, the destination electronic device 104 includes a decoding circuit 122, a graphic rendering circuit 124, and a display screen 126. The decoding circuit 122 receives the bitstream BS from the transmission means 103 (e.g., a wired/wireless communication link or a storage medium), and performs a video decoder function for decoding a part of the received bitstream BS to generate a decoded frame IMG'. For example, the decoding circuit 122 generates a sequence of decoded frames by decoding the received bitstream BS, where the decoded frame IMG' is one frame included in the sequence of decoded frames. In this embodiment, the projection-based frame IMG to be encoded by the video encoder 116 at the encoder side has a 360 VR projection format with a projection layout. Hence, after the bitstream BS is decoded by the decoding circuit 122 at the decoder side, the decoded frame IMG' is a decoded projection-based frame having the same 360 VR projection format and the same projection layout. The graphic rendering circuit 124 is coupled between the decoding circuit 122 and the display screen 126. The graphic rendering circuit 124 renders and displays an output image data on the display screen 126 according to the decoded frame IMG'. For example, a viewport area associated with a portion of the 360-degree image/video content carried by the decoded frame IMG' may be displayed on the display screen 126 via the graphic rendering circuit 124.

As mentioned above, the conversion circuit 114 generates the projection-based frame IMG according to the 360 VR projection layout L_VR and the omnidirectional image/video content S_IN. If the 360 VR projection layout L_VR is a compact projection layout without padding, it is possible that packing of projection faces may result in image content discontinuity edges between adjacent projection faces.

Figure 2:
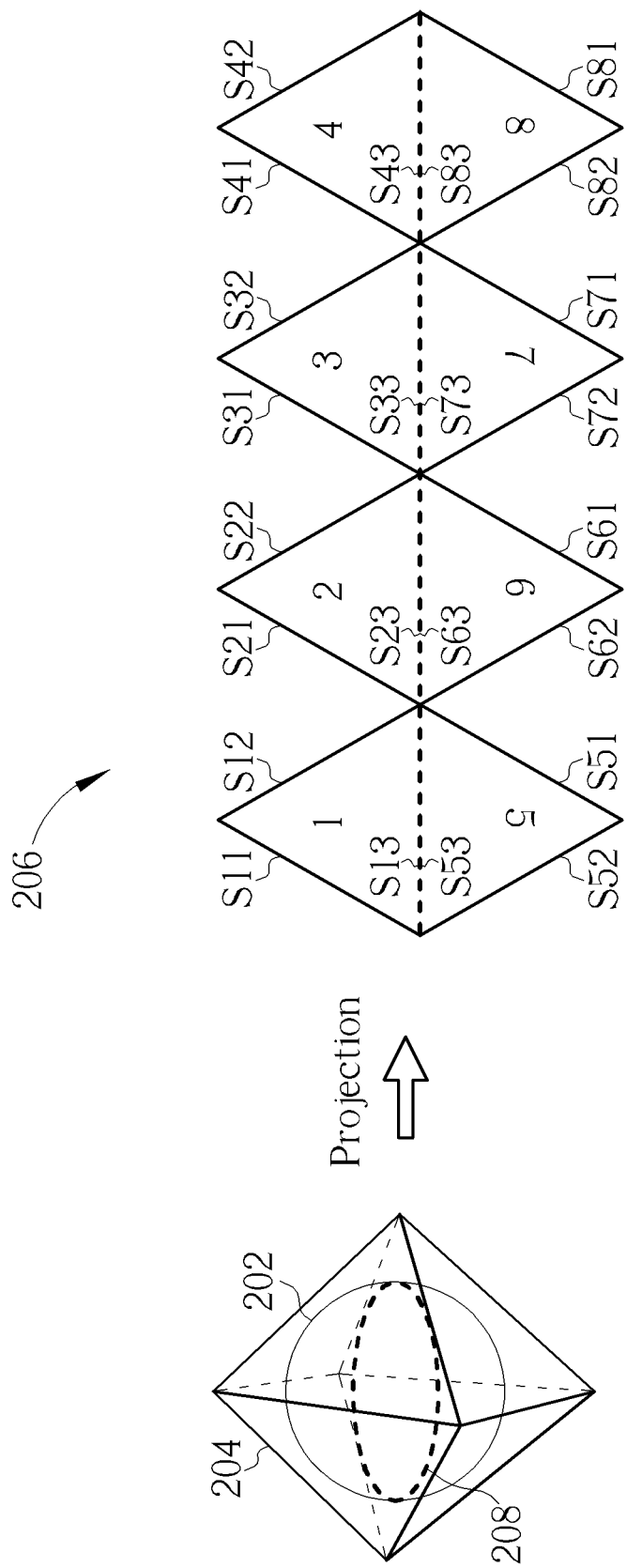
FIG. 2 is a diagram illustrating triangular projection faces of an octahedron projection format that are obtained from an octahedron projection of a sphere according to an unrotated octahedron.

FIG. 2 is a diagram illustrating triangular projection faces of an octahedron projection format that are obtained from an octahedron projection of a sphere according to an unrotated octahedron. An omnidirectional image/video content of a sphere 202 is mapped onto eight triangular projection faces (labeled by reference numbers "1", "2", "3", "4", "5", "6", "7" and "8") of an unrotated octahedron 204. As shown in FIG. 2, the triangular projection faces "1"-"8" are arranged in an octahedron projection layout 206. A shape of each of the triangular projection faces "1"-"8" is an equilateral triangle. For a triangular projection face "K" (K=1–8), this face has three sides, denoted as SK1, SK2, and SK3. The sphere 202 is composed of a top hemisphere (e.g., a northern hemisphere) and a bottom hemisphere (e.g., a southern hemisphere). Due to an octahedron projection based on the unrotated octahedron 204, the triangular projection faces "1", "2", "3", and "4" are all derived from the top hemisphere, the triangular projection faces "5", "6", "7", and "8" are all derived from the bottom hemisphere, and an equator 208 of the sphere 202 is mapped along sides S13, S23, S33, S43, S53, S63, S73 and S83 of the triangular projection faces "1"-"8", as indicated by dotted lines in FIG. 2.

The projection-based frame IMG to be encoded is required to be rectangular. If the octahedron projection layout 206 is directly used for creating the projection-based frame IMG, the projection-based frame IMG is unable to have a compact frame layout due to many dummy areas (e.g., black areas, gray areas, or white areas) filled in the projection-based frame IMG. Thus, there is a need for a compact octahedron projection layout that can avoid using dummy areas (e.g., black areas, gray areas, or white areas).

Figure 3:
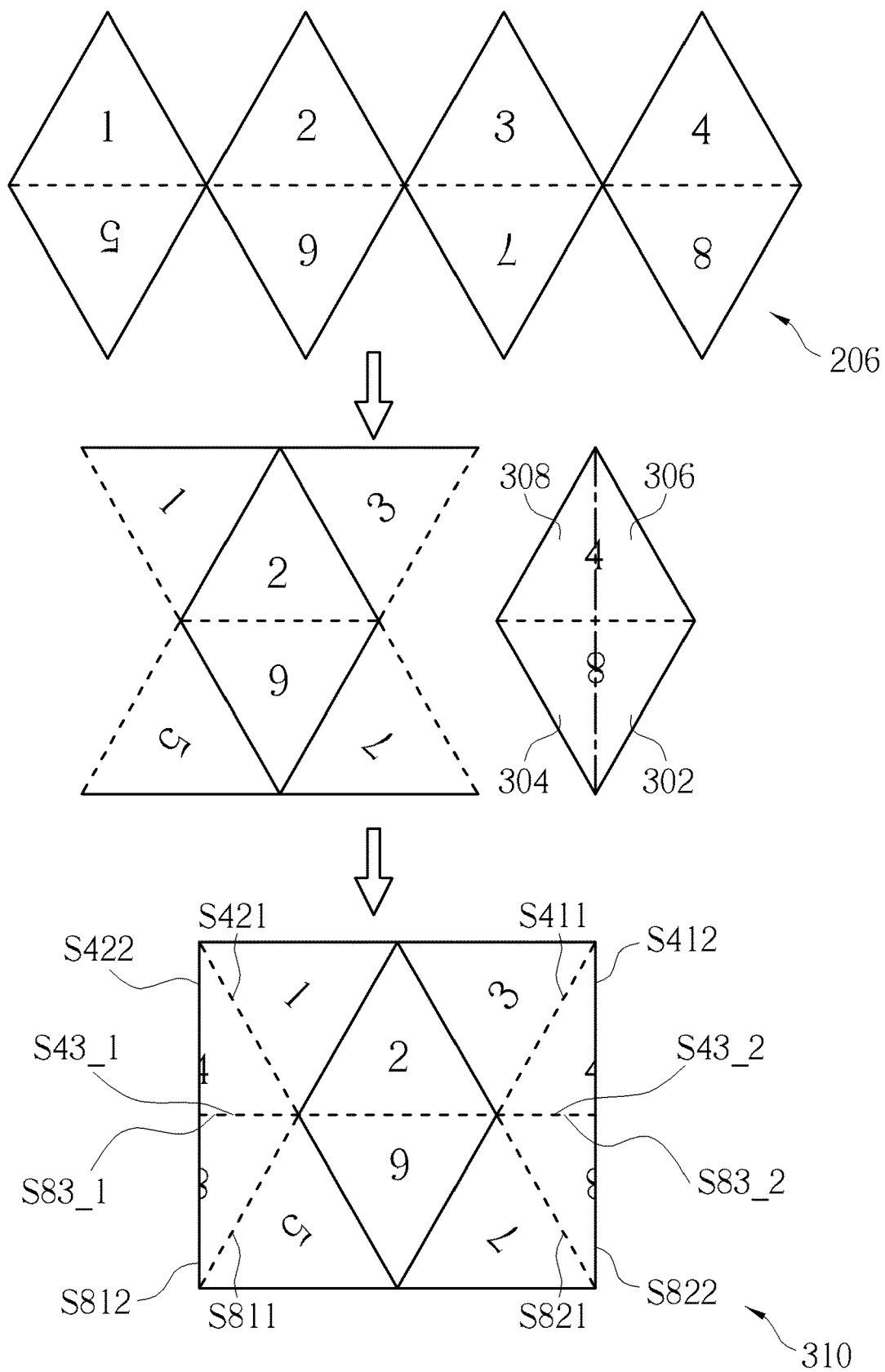
FIG. 3 is a diagram illustrating a first compact octahedron projection layout according to an embodiment of the present invention.

Please refer to FIG. 2 in conjunction with FIG. 3. FIG. 3 is a diagram illustrating a first compact octahedron projection layout according to an embodiment of the present invention. The equator 208 of the sphere 202 is mapped along sides of the triangular projection faces "1"-"8", as indicated by dotted lines in FIG. 3. The compact octahedron projection layout 310 is derived from the octahedron projection layout 206 with triangular projection face rotation and triangular projection face splitting. As shown in the middle part of FIG. 3, the triangular projection face "1" in the octahedron projection layout 206 is rotated by 60° clockwise, the triangular projection face "3" in the octahedron projection layout 206 is rotated by 60° counterclockwise, the triangular projection face "5" in the octahedron projection layout 206 is rotated by 60° counterclockwise, and the triangular projection face "7" in the octahedron projection layout 206 is rotated by 60° clockwise. Hence, the side S21 of the triangular projection face "2" connects with the side S12 of the triangular projection face "1", the side S22 of the triangular projection face "2" connects with the side S31 of the triangular projection face "3", the side S62 of the triangular projection face "6" connects with the side S51 of the triangular projection face "5", and the side S61 of the triangular projection face "6" connects with the side S72 of the triangular projection face "7".

As shown in the middle part of FIG. 3, an image content continuity boundary exists between the side S21 of the triangular projection face "2" and the side S12 of the triangular projection face "1" (i.e., content is continuously represented in the triangular projection faces "1" and "2"), an image content continuity boundary exists between the side S22 of the triangular projection face "2" and the side S31 of the triangular projection face "3" (i.e., content is continuously represented in the triangular projection faces "2" and "3"), an image content continuity boundary exists between the side S23 of the triangular projection face "2"

and the side S63 of the triangular projection face "6" (i.e., content is continuously represented in the triangular projection faces "2" and "6"), an image content continuity boundary exists between the side S62 of the triangular projection face "6" and the side S51 of the triangular projection face "5" (i.e., content is continuously represented in the triangular projection faces "5" and "6"), and an image content continuity boundary exists between the side S61 of the triangular projection face "6" and the side S72 of the triangular projection face "7" (i.e., content is continuously represented in the triangular projection faces "6" and "7").

In addition, the triangular projection face "8" in the octahedron projection layout 206 is split into two right-triangle-shaped parts 302 and 304, and the triangular projection face "4" in the octahedron projection layout 206 is split into two right-triangle-shaped parts 306 and 308. As shown in the bottom part of FIG. 3, the right-triangle-shaped part 304 of the triangular projection face "8" and the right-triangle-shaped part 308 of the triangular projection face "4" are connected to the triangular projection faces and respectively; and the right-triangle-shaped part 302 of the triangular projection face "8" and the right-triangle-shaped part 306 of the triangular projection face "4" are relocated and connected to the triangular projection faces "5" and "1", respectively.

The right-triangle-shaped part 302 of the triangular projection face "8" has three sides S811, S812, and S83_1, where the side S811 is the side S81 of the triangular projection face "8", and the side S83_1 is a first part of the side S83 of the triangular projection face "8". The right-triangle-shaped part 304 of the triangular projection face "8" has three sides S821, S822, and S83_2, where the side S821 is the side S82 of the triangular projection face "8", and the side S83_2 is a second part of the side S83 of the triangular projection face "8".

The right-triangle-shaped part 306 of the triangular projection face "4" has three sides S421, S422, and S43_1, where the side S421 is the side S42 of the triangular projection face "4", and the side S43_1 is a first part of the side S43 of the triangular projection face "4". The right-triangle-shaped part 308 of the triangular projection face "4" has three sides S411, S412, and S43_2, where the side S411 is the side S41 of the triangular projection face "4", and the side S43_2 is a second part of the side S43 of the triangular projection face "4".

In accordance with the compact octahedron projection layout 310, the side S821 of the right-triangle-shaped part 304 of the triangular projection face "8" connects with the side S73 of the triangular projection face the side S83_2 of the right-triangle-shaped part 304 of the triangular projection face "8" connects with the side S43_2 of the right-triangle-shaped part 308 of the triangular projection face "4", the side S411 of the right-triangle-shaped part 308 of the triangular projection face "4" connects with the side S33 of the triangular projection face "3", the side S811 of the right-triangle-shaped part 302 of the triangular projection face "8" connects with the side S53 of the triangular projection face "5", the side S83_1 of the right-triangle-shaped part 302 of the triangular projection face "8" connects with the side S43_1 of the right-triangle-shaped part 306 of the triangular projection face "4", and the side S421 of the right-triangle-shaped part 306 of the triangular projection face "4" connects with the side S13 of the triangular projection face "1".

An image content continuity boundary exists between the side S83_2 of the right-triangle-shaped part 304 of the triangular projection face "8" and the side S43_2 of the right-triangle-shaped part 308 of the triangular projection face "4". An image content continuity boundary exists between the side S83_1 of the right-triangle-shaped part 302 of the triangular projection face "8" and the side S43_1 of the right-triangle-shaped part 306 of the triangular projection face "4". That is, content is continuously represented in the triangular projection faces "4" and "8". Further, an image content discontinuity edge exists between the side S821 of the right-triangle-shaped part 304 of the triangular projection face "8" and the side S73 of the triangular projection face "7", an image content discontinuity edge exists between the side S411 of the right-triangle-shaped part 308 of the triangular projection face "4" and the side S33 of the triangular projection face "3", an image content discontinuity edge exists between the side S811 of the right-triangle-shaped part 302 of the triangular projection face "8" and the side S53 of the triangular projection face "5", and an image content discontinuity edge exists between the side S421 of the right-triangle-shaped part 306 of the triangular projection face "4" and the side S13 of the triangular projection face "1".

As shown in the bottom part of FIG. 3, the 360 VR projection layout L_VR set by the compact octahedron projection layout 310 is a rectangle without any dummy areas (e.g., black areas or white areas). In addition, a portion of the 360-degree image/video content is continuously represented in the triangular projection faces "1", "2", "3", "5", "6", "7" with no image content discontinuity. However, some image content discontinuity edges still exist in the compact octahedron projection layout 310, inevitably. Hence, if the 360 VR projection layout L_VR is set by the compact octahedron projection layout 310, the image quality near the image content discontinuity edges after compression may be poor.

When the triangular projection faces "1"-"8" shown in FIG. 2 are rearranged and packed in the compact octahedron projection layout 310, some triangular projection faces have to be split and relocated, thus resulting in image content discontinuity of the equator 208 in the projection-based frame IMG. In general, the top and bottom areas of the sphere 202 usually represent "sky" and "ground", respectively, and moving objects in the surrounding environment are mostly located at the equator 208 of the sphere 202. If the equator 208 represented in the projection-based frame IMG has image content discontinuity, the encoding efficiency and the image quality are dramatically degraded. The encoding efficiency and the image quality can be improved if the equator 208 of the sphere 202 is mapped along middles of the triangular projection faces or any positions other than sides of the triangular projection faces.

Figure 4:
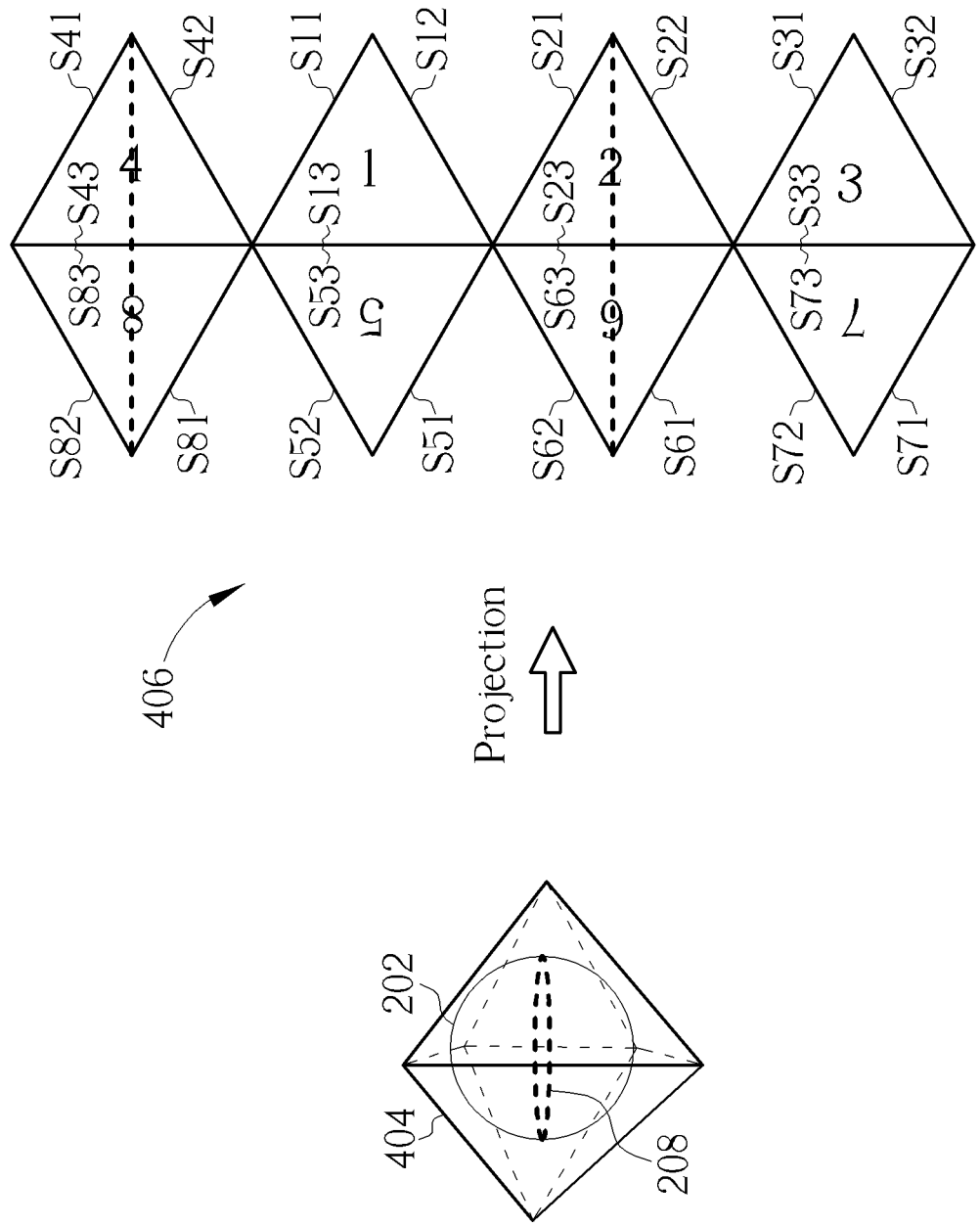
FIG. 4 is a diagram illustrating triangular projection faces of an octahedron projection format that are obtained from an octahedron projection of a sphere according to a rotated octahedron.

FIG. 4 is a diagram illustrating triangular projection faces of an octahedron projection format that are obtained from an octahedron projection of a sphere according to a rotated octahedron. The omnidirectional image/video content of the sphere 202 is mapped onto eight triangular projection faces (labeled by reference numbers "1", "2", "3", "4", "5", "6", "7" and "8") of a rotated octahedron 404. The rotated octahedron 404 shown in FIG. 4 may be obtained by applying 90-degree rotation to the octahedron 204 shown in FIG. 2. As shown in FIG. 4, the triangular projection faces "1"-"8" are packed in an octahedron projection layout 406. A shape of each of the triangular projection faces "1"-"8" is an equilateral triangle. For a triangular projection face "K" (K=1–8), this face has three sides, denoted as SK1, SK2, and SK3. The sphere 202 is composed of a left hemisphere and a right hemisphere. The triangular projection faces "1", "2", "3", and "4" are all derived from the right hemisphere, and the triangular projection faces "5", "6", "7", and "8" are all derived from the left hemisphere. Due to an octahedron projection on the rotated octahedron 404, the equator 208 of the sphere 202 is not mapped along any side of each triangular projection face. In this embodiment, the equator 208 of the sphere 202 is mapped along middles of the triangular projection faces "2", "4", "6", and "8", as indicated by dotted lines in FIG. 4. As mentioned above, the projection-based frame IMG to be encoded is required to be rectangular. Hence, a compact octahedron projection layout should be used by the projection-based frame IMG.

Figure 5:
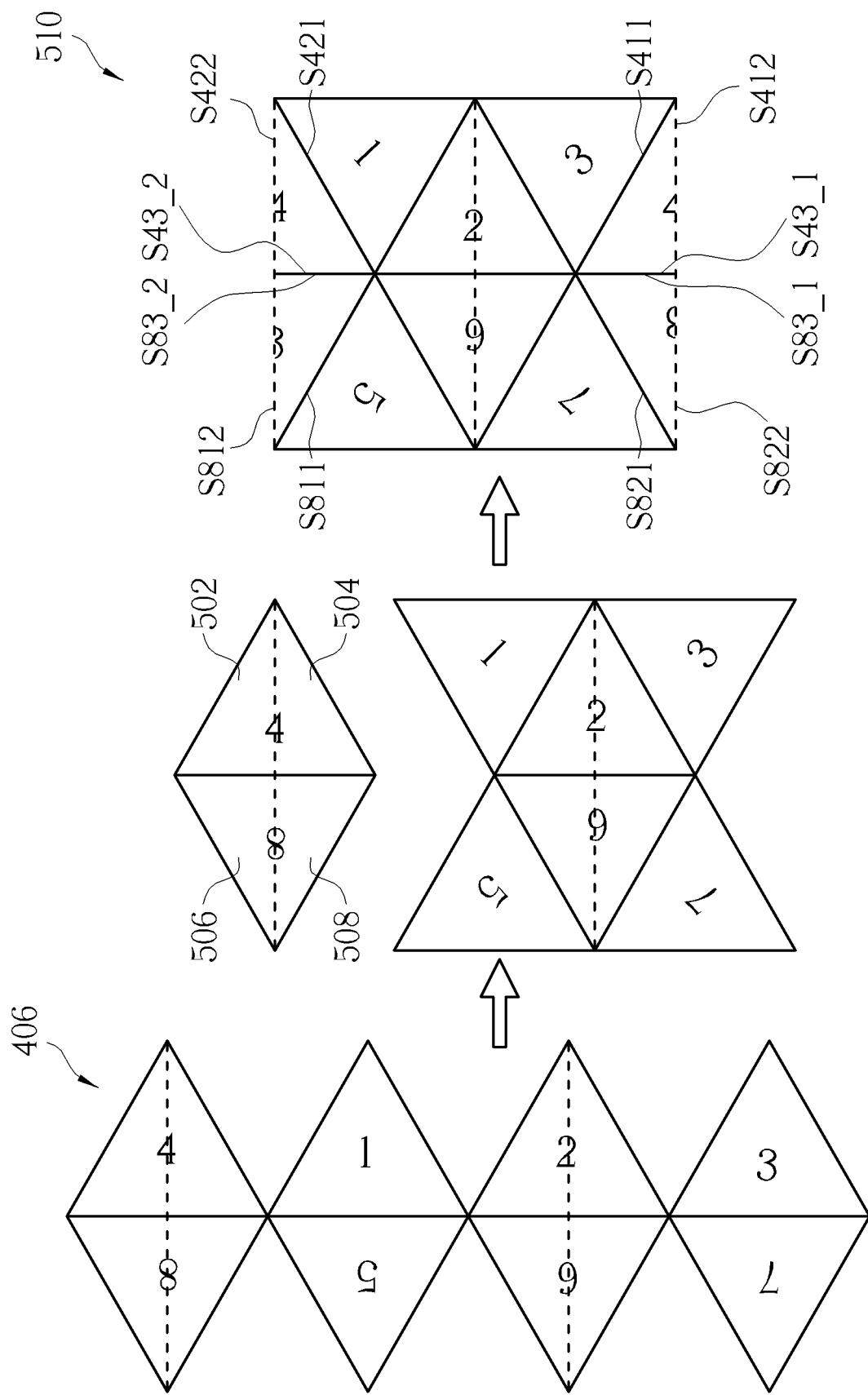
FIG. 5 is a diagram illustrating a second compact octahedron projection layout according to an embodiment of the present invention.

Please refer to FIG. 4 in conjunction with FIG. 5. FIG. 5 is a diagram illustrating a second compact octahedron projection layout according to an embodiment of the present invention. The equator 208 of the sphere 202 is mapped along middles of the triangular projection faces "2", "4", "6", and "8", as indicated by dotted lines in FIG. 5. The compact octahedron projection layout 510 is derived from the octahedron projection layout 406 with triangular projection face rotation and triangular projection face splitting. As shown in the middle part of FIG. 5, the triangular projection face "7" in the octahedron projection layout 406 is rotated by 60° clockwise, the triangular projection face "5" in the octahedron projection layout 406 is rotated by 60° counter-clockwise, the triangular projection face "3" in the octahedron projection layout 406 is rotated by 60° counterclockwise, and the triangular projection face "1" in the octahedron projection layout 406 is rotated by 60° clockwise. Hence, the side S72 of the triangular projection face "7" connects with the side S61 of the triangular projection face "6", the side S51 of the triangular projection face "5" connects with the side S62 of the triangular projection face "6", the side S31 of the triangular projection face "3" connects with the side S22 of the triangular projection face "2", and the side S12 of the triangular projection face "1" connects with the side S21 of the triangular projection face "2".

As shown in the middle part of FIG. 5, an image content continuity boundary exists between the side S72 of the triangular projection face "7" and the side S61 of the triangular projection face "6" (i.e., content is continuously represented in the triangular projection faces "6" and "7"), an image content continuity boundary exists between the side S51 of the triangular projection face "5" and the side S62 of the triangular projection face "6" (i.e., content is continuously represented in the triangular projection faces "5" and "6"), an image content continuity boundary exists between the side S31 of the triangular projection face "3" and the side S22 of the triangular projection face "2" (i.e., content is continuously represented in the triangular projection faces "2" and "3"), an image content continuity boundary exists between the side S12 of the triangular projection face "1" and the side S21 of the triangular projection face "2" (i.e., content is continuously represented in the triangular projection faces "1" and "2"), and an image content continuity boundary exists between the side S23 of the triangular projection face "2" and the side S63 of the triangular projection face "6" (i.e., content is continuously represented in the triangular projection faces "2" and "6").

In addition, the triangular projection face "4" in the octahedron projection layout 406 is split into two right-triangle-shaped parts 502 and 504, and the triangular projection face "8" in the octahedron projection layout 406 is split into two right-triangle-shaped parts 506 and 508. As shown in the right part of FIG. 5, the right-triangle-shaped part 504 of the triangular projection face "4" and the right-triangle-shaped part 508 of the triangular projection face "8" are connected to the triangular projection faces and respectively; and the right-triangle-shaped part 502 of the triangular projection face "4" and the right-triangle-shaped part 506 of the triangular projection face "8" are relocated and connected to the triangular projection faces "3" and "7", respectively.

The right-triangle-shaped part 502 of the triangular projection face "4" has three sides S411, S412, and S43_1, where the side S411 is the side S41 of the triangular projection face "4", and the side S43_1 is a first part of the side S43 of the triangular projection face "4". The right-triangle-shaped part 504 of the triangular projection face "4" has three sides S421, S422, and S43_2, where the side S421 is the side S42 of the triangular projection face "4", and the side S43_2 is a second part of the side S43 of the triangular projection face "4".

The right-triangle-shaped part 506 of the triangular projection face "8" has three sides S821, S822, and S83_1, where the side S821 is the side S82 of the triangular projection face "8", and the side S83_1 is a first part of the side S83 of the triangular projection face "8". The right-triangle-shaped part 508 of the triangular projection face "8" has three sides S811, S812, and S83_2, where the side S811 is the side S81 of the triangular projection face "8", and the side S83_2 is a second part of the side S83 of the triangular projection face "8".

In accordance with the compact octahedron projection layout 510, the side S421 of the right-triangle-shaped part 504 of the triangular projection face "4" connects with the side S13 of the triangular projection face the side S43_2 of the right-triangle-shaped part 504 of the triangular projection face "4" connects with the side S83_2 of the right-triangle-shaped part 508 of the triangular projection face "8", the side S811 of the right-triangle-shaped part 508 of the triangular projection face "8" connects with the side S53 of the triangular projection face "5", the side S411 of the right-triangle-shaped part 502 of the triangular projection face "4" connects with the side S33 of the triangular projection face "3", the side S43_1 of the right-triangle-shaped part 502 of the triangular projection face "4" connects with the side S83_1 of the right-triangle-shaped part 506 of the triangular projection face "8", and the side S821 of the right-triangle-shaped part 506 of the triangular projection face "8" connects with the side S73 of the triangular projection face "7".

An image content continuity boundary exists between the side S43_2 of the right-triangle-shaped part 504 of the triangular projection face "4" and the side S83_2 of the right-triangle-shaped part 508 of the triangular projection face "8". An image content continuity boundary exists between the side S43_1 of the right-triangle-shaped part 502 of the triangular projection face "4" and the side S83_1 of the right-triangle-shaped part 506 of the triangular projection face "8". That is, content is continuously represented in the triangular projection faces "4" and "8". Further, an image content discontinuity edge exists between the side S421 of the right-triangle-shaped part 504 of the triangular projection face "4" and the side S13 of the triangular projection face "1", an image content discontinuity edge exists between the side S811 of the right-triangle-shaped part 508 of the triangular projection face "8" and the side S53 of the triangular projection face "5", an image content discontinuity edge exists between the side S411 of the right-triangle-shaped part 502 of the triangular projection face "4" and the side S33 of the triangular projection face "3", and an image content discontinuity edge exists between the side S821 of the right-triangle-shaped part 506 of the triangular projection face "8" and the side S73 of the triangular projection face "7".

In the right part of FIG. 5, the 360 VR projection layout L_VR arranged by a shape of the compact octahedron projection layout 510 is a rectangle without any dummy areas (e.g., black areas, gray areas, or white areas). In addition, a portion of the 360-degree image/video content is continuously represented in the triangular projection faces "1", "2", "3", "5", "6", "7" with no image content discontinuity. Moreover, the equator 208 represented by the triangular projection faces "2", "4", "6", and "8" in the projection-based image IMG (which uses the compact octahedron projection layout 510) has no image content discontinuity resulting from triangular projection face splitting. However, some image content discontinuity edges still exist in the compact octahedron projection layout 510, inevitably. Hence, if the 360 VR projection layout L_VR is set by the compact octahedron projection layout 510, the image quality near the image content discontinuity edges after compression may be poor.

To address the aforementioned image quality degradation issue, the present invention proposes an innovative 360 VR projection layout design with padding that is capable of improving the image quality at edges of projection face(s) after compression. For example, the 360 VR projection layout L_VR may be set by a compact cubemap layout with padding or a compact octahedron layout with padding. Specifically, the conversion circuit 114 receives an omnidirectional mage/video content of the sphere 202 from the video capture devoice 112, and obtains a plurality of projection faces from the omnidirectional image/video content of the sphere 202, wherein the omnidirectional image/video content of the sphere 202 is mapped onto the projection faces via a selected 360 VR projection (e.g., cubemap projection or octahedron projection). As shown in FIG. 1, the conversion circuit 114 has a padding circuit 115 that is arranged to generate at least one padding region. The conversion circuit 114 creates the projection-based frame IMG by packing the projection faces and at least one padding region in the 360 VR projection layout L_VR (e.g., a compact cubemap layout with padding or a compact octahedron layout with padding).

For example, the projection faces packed in the 360 VR projection layout L_VR include a first projection face and a second projection face, where there is an image content discontinuity edge between a first side of the first projection face and a first side of the second projection face if the first side of the first projection face connects with the first side of the second projection face. The at least one padding region packed in the 360 VR projection layout L_VR includes a first padding region, where the first padding region connects with the first side of the first projection face and the first side of the second projection face for isolating the first side of the first projection face from the first side of the second projection face in the 360 VR projection layout L_VR. The first padding region is intentionally inserted to provide more information for compression procedure. In this way, the image quality of the first side of the first projection face and the first side of the second projection face after compression can be improved.

Figure 6:
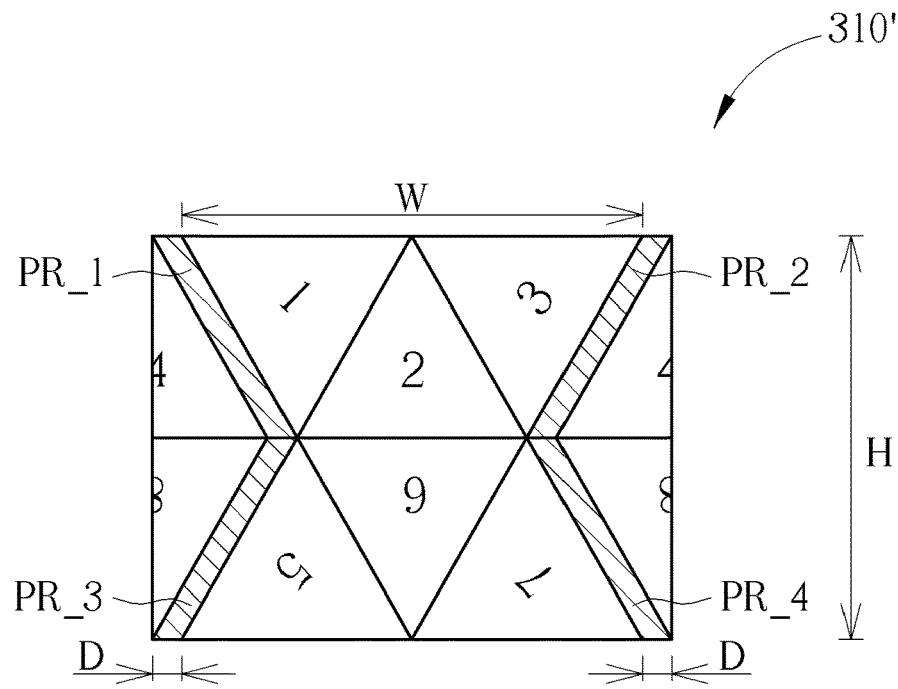
FIG. 6 is a diagram illustrating a first compact octahedron projection layout with padding according to an embodiment of the present invention.

FIG. 6 is a diagram illustrating a first compact octahedron projection layout with padding according to an embodiment of the present invention. The 360 VR projection layout L_VR employed by the conversion circuit 114 may be set by the compact octahedron projection layout 310' shown in FIG. 6. The compact octahedron projection layout 310' may be derived from the compact octahedron projection layout 310 shown in FIG. 3. Regarding the compact octahedron projection layout 310 shown in FIG. 3, an image content discontinuity edge exists between the side S821 of the right-triangle-shaped part 304 of the triangular projection face "8" and the side S73 of the triangular projection face "7", an image content discontinuity edge exists between the side S411 of the right-triangle-shaped part 308 of the triangular projection face "4" and the side S33 of the triangular projection face "3", an image content discontinuity edge exists between the side S811 of the right-triangle-shaped part 302 of the triangular projection face "8" and the side S53 of the triangular projection face "5", and an image content discontinuity edge exists between the side S421 of the right-triangle-shaped part 306 of the triangular projection face "4" and the side S13 of the triangular projection face "1". As shown in FIG. 6, a first padding region PR_1 is inserted to connect with the side S421 of the right-triangle-shaped part 306 of the triangular projection face "4" (which is also the side S42 of the projection face "4") and the side S13 of the projection face "1", a second padding region PR_2 is inserted to connect with the side S411 of the right-triangle-shaped part 308 of the triangular projection face "4" (which is also the side S41 of the projection face "4") and the side S33 of the projection face "3", a third padding region PR_3 is inserted to connect with the side S811 of the right-triangle-shaped part 302 of the triangular projection face "8" (which is also the side S81 of the projection face "8") and the side S53 of the projection face "5", and a fourth padding region PR 4 is inserted to connect with the side S821 of the right-triangle-shaped part 304 of the triangular projection face "8" (which is also the side S82 of the projection face "8") and the side S73 of the projection face "7". Supposing that the width of each padding region is D and the compact octahedron projection layout 310 shown in FIG. 3 has width W and height H, the compact octahedron projection layout 310' shown in FIG. 6 has width W+2D and height H. For example, the width of each padding region D may be 16 pixels.

Figure 7:
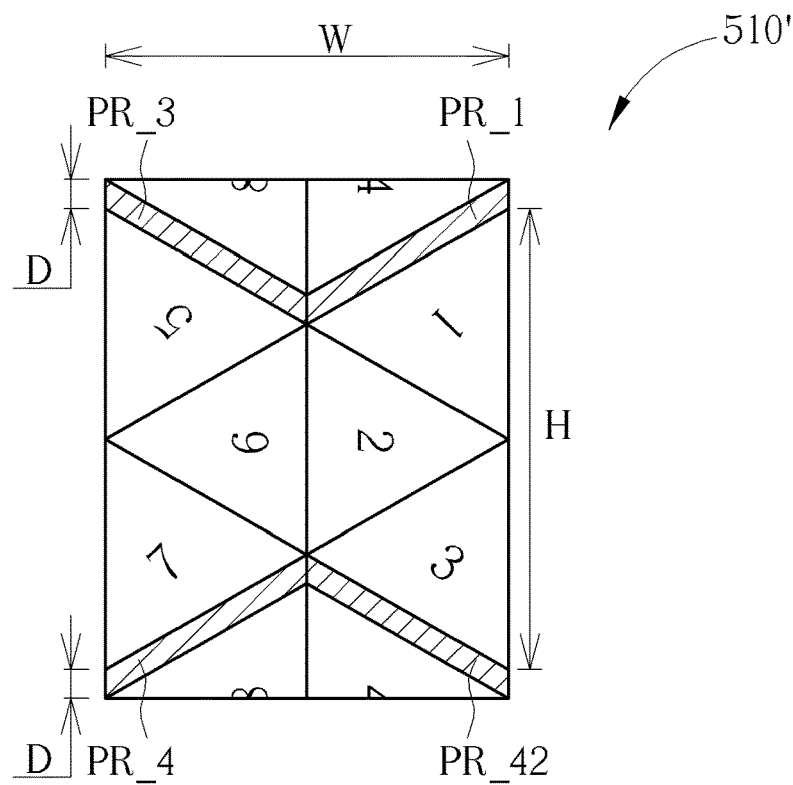
FIG. 7 is a diagram illustrating a second compact octahedron projection layout with padding according to an embodiment of the present invention.

FIG. 7 is a diagram illustrating a second compact octahedron projection layout with padding according to an embodiment of the present invention. The 360 VR projection layout L_VR employed by the conversion circuit 114 may be set by the compact octahedron projection layout 510' shown in FIG. 7. The compact octahedron projection layout 510' may be derived from the compact octahedron projection layout 510 shown in FIG. 5. Regarding the compact octahedron projection layout 510 shown in FIG. 5, an image content discontinuity edge exists between the side S821 of the right-triangle-shaped part 506 of the triangular projection face "8" and the side S73 of the triangular projection face "7", an image content discontinuity edge exists between the side S411 of the right-triangle-shaped part 502 of the triangular projection face "4" and the side S33 of the triangular projection face "3", an image content discontinuity edge exists between the side S811 of the right-triangle-shaped part 508 of the triangular projection face "8" and the side S53 of the triangular projection face "5", and an image content discontinuity edge exists between the side S421 of the right-triangle-shaped part 504 of the triangular projection face "4" and the side S13 of the triangular projection face "1". As shown in FIG. 7, a first padding region PR_1 is inserted to connect with the side S421 of the right-triangle-shaped part 504 of the triangular projection face "4" (which is also the side S42 of the projection face "4") and the side S13 of the projection face "1", a second padding region PR_2 is inserted to connect with the side S411 of the right-triangle-shaped part 502 of the triangular projection face "4" (which is also the side S41 of the projection face "4") and the side S33 of the projection face "3", a third padding region PR_3 is inserted to connect with the side S811 of the right-triangle-shaped part 508 of the triangular projection face "8" (which is also the side S81 of the projection face "8") and the side S53 of the projection face "5", and a fourth padding region PR 4 is inserted to connect with the side S821 of the right-triangle-shaped part 506 of the triangular projection face "8" (which is also the side S82 of the projection face "8") and the side S73 of the projection face "7". Supposing that the height of each padding region is D and the compact octahedron projection layout 510 shown in FIG. 5 has width W and height H, the compact octahedron projection layout 510' shown in FIG. 7 has width W and height H+2D. For example, the height of each padding region D may be 16 pixels.

In one exemplary padding implementation, the padding circuit 115 sets pixel values of pixels included in a padding region by interpolation that is based on pixel values of pixels included in adjacent projection faces connected to the padding region. Regarding each of the compact octahedron projection layout 310' shown in FIG. 6 and the compact octahedron projection layout 510' shown in FIG. 7, pixel values of pixels included in the first padding region PR_1 are acquired by interpolation that is based on pixel values of pixels included in the adjacent projection faces "1" and "4", pixel values of pixels included in the second padding region PR_2 are acquired by interpolation that is based on pixel values of pixels included in the adjacent projection faces "3" and "4", pixel values of pixels included in the third padding region PR_3 are acquired by interpolation that is based on pixel values of pixels included in the adjacent projection faces "3" and "5", and pixel values of pixels included in the fourth padding region PR 4 are acquired by interpolation that is based on pixel values of pixels included in the adjacent projection faces "7" and "8".

Figure 8:
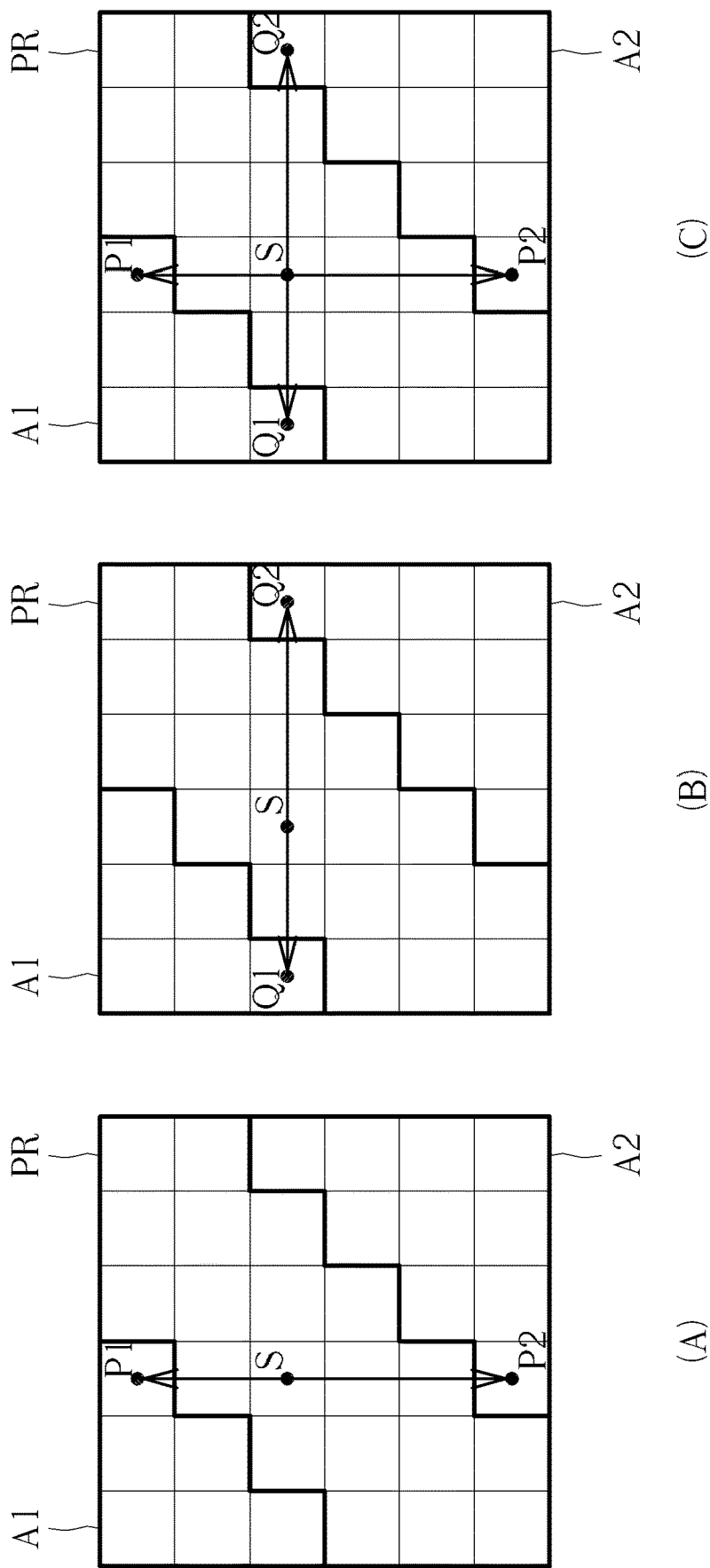
FIG. 8 is a diagram illustrating examples of interpolation performed by a padding circuit shown in FIG. 1.

The employed interpolation may be nearest neighbor interpolation, linear interpolation, bilinear interpolation, or other suitable interpolation algorithm. The sample points used by the employed interpolation may be obtained from a single direction or different directions. FIG. 8 is a diagram illustrating examples of interpolation performed by the padding circuit 115 shown in FIG. 1. A padding region PR is required to be inserted between adjacent projection faces A1 and A2 that are obtained from a selected 360 VR projection of a sphere, where an image content discontinuity edge exists between the adjacent projection faces A1 and A2 if the projection face A1 connects with the projection face A2. As shown in the sub-diagram (A) of FIG. 8, interpolation is performed upon sample points (i.e., pixels) P1 and P2 obtained from the adjacent projection faces A1 and A2 in the vertical direction. Hence, an interpolated sample point (i.e., interpolated pixel) S is determined according to sample values of the sample points P1 and P2, a distance between the sample point P1 and the interpolated sample point S, and a distance between the sample point P2 and the interpolated sample point S.

As shown in the sub-diagram (B) of FIG. 8, interpolation is performed upon sample points (i.e., pixels) Q1 and Q2 obtained from the adjacent projection faces A1 and A2 in the horizontal direction. Hence, an interpolated sample point (i.e., interpolated pixel) S is determined according to sample values of the sample points Q1 and Q2, a distance between the sample point Q1 and the interpolated sample point S, and a distance between the sample point Q2 and the interpolated sample point S.

As shown in the sub-diagram (C) of FIG. 8, interpolation is performed upon sample points (i.e., pixels) P1 and P2 obtained from the adjacent projection faces A1 and A2 in the vertical direction and sample points (i.e., pixels) Q1 and Q2 obtained from the adjacent projection faces A1 and A2 in the horizontal direction. Hence, an interpolated sample point (i.e., interpolated pixel) S is determined according to sample values of the sample points P1, P2, Q1, and Q2, a distance between the sample point P1 and the interpolated sample point S, a distance between the sample point P2 and the interpolated sample point S, a distance between the sample point Q1 and the interpolated sample point S, and a distance between the sample point Q2 and the interpolated sample point S.

Figure 9:
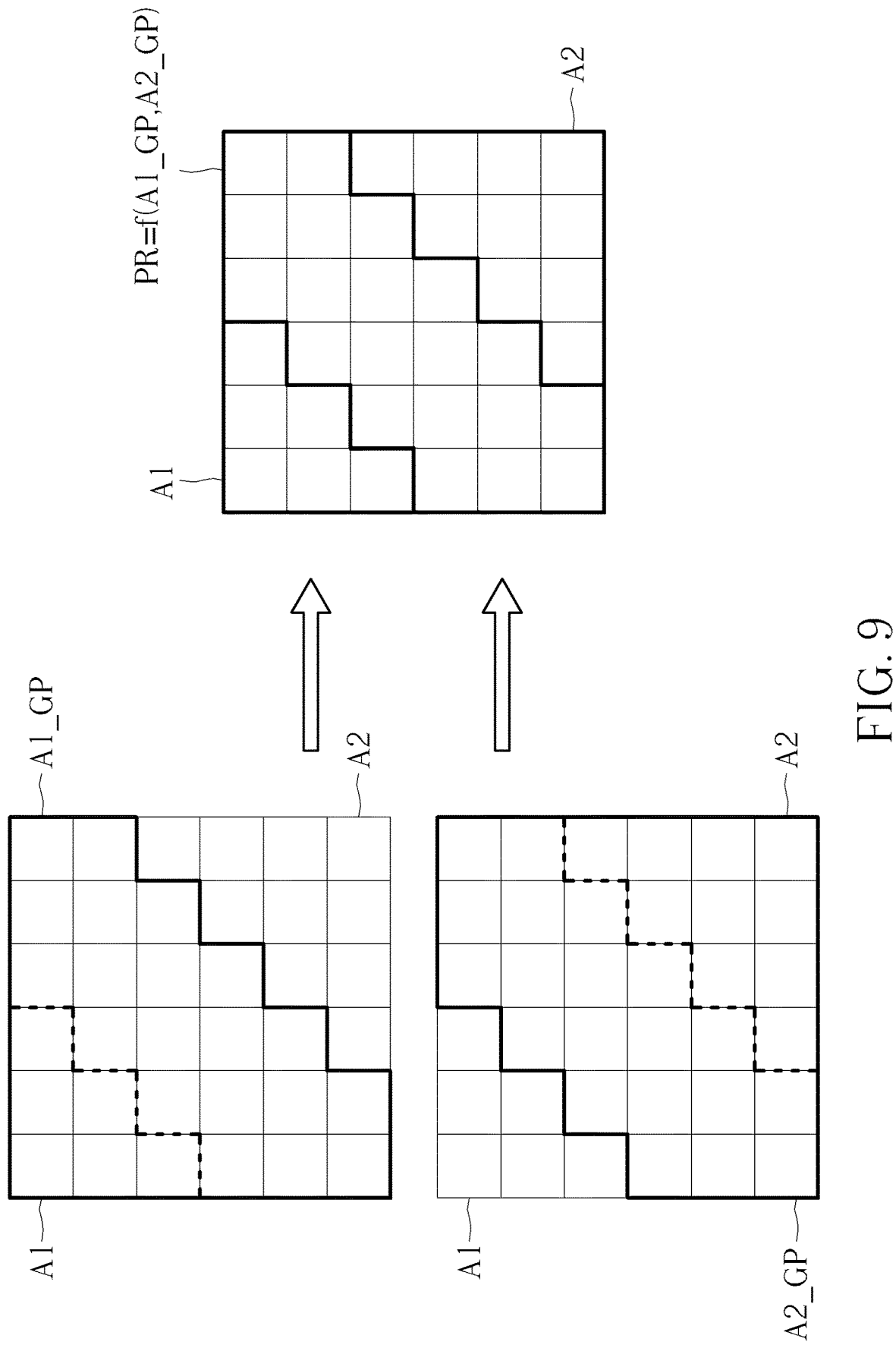
FIG. 9 is a diagram illustrating an example of geometry padding performed by the padding circuit shown in FIG. 1.

In another exemplary padding implementation, the padding circuit 115 applies first geometry padding to one of the adjacent projection faces to determine first pixel values of pixels included in a padding region, applies second geometry padding to the other of the adjacent projection faces to determine second pixel values of the pixels included in the padding region, and sets pixel values of the pixels included in the padding region by blending the first pixel values derived from the first geometry padding and the second pixel values derived from the second geometry padding. FIG. 9 is a diagram illustrating an example of geometry padding performed by the padding circuit 115 shown in FIG. 1. A padding region PR is required to be inserted between adjacent projection faces A1 and A2 that are obtained via a selected 360 VR projection of a sphere, where an image content discontinuity edge exists between the adjacent projection faces A1 and A2 if the projection face A1 connects with the projection face A2. The first geometry padding applied to the projection face A1 determines a geometry mapping region A1_GP, where the geometry mapping region A1_GP is obtained from mapping the content of a region on a sphere (e.g., sphere 202 shown in FIG. 2/FIG. 4) onto the padding region PR, wherein the region on the sphere is adjacent to a region from which the projection face A1 is obtained. Hence, there is an image content continuity boundary between the projection face A1 and the geometry mapping region A1_GP extended from the projection face A1 (i.e., content is continuously represented in the projection face A1 and the geometry mapping region A1_GP).

The second geometry padding applied to the projection face A2 determines another geometry mapping region A2_GP, where the geometry mapping result A2_GP is obtained from mapping the content of a region on a sphere (e.g., sphere 202 shown in FIG. 2/FIG. 4) onto the padding region PR, wherein the region on the sphere is adjacent to a region from which the projection face A2 is obtained. Hence, there is an image content continuity boundary between the projection face A2 and the geometry mapping region A2_GP extended from the projection face A2 (i.e., content is continuously represented in the projection face A2 and the geometry mapping region A2_GP).

After the geometry mapping regions A1_GP and A2_GP associated with the same padding region PR are obtained, the padding circuit 115 blends the geometry mapping regions A1_GP and A2_GP to determine pixel values of pixels included in the padding region PR. That is, PR=f (A1_GP, A2_GP), where f( ) is a blending function. For example, the blending function f( ) may be an average function. Regarding each pixel in the padding region PR, a pixel value of the pixel in the padding region PR is set by an average of a first pixel value of the pixel in the geometry mapping region A1_GP and a second pixel value of the pixel in the geometry mapping region A2_GP.

In yet another exemplary padding implementation, the padding circuit 115 sets pixel values of pixels included in a padding region by duplicating pixel values of pixels included in adjacent projection faces that are obtained from a selected 360 VR projection of a sphere. For example, boundary pixels at a side of the projection face A1 are duplicated to create padding pixels extended from the side of the projection face A1, and boundary pixels at a side of the projection face A2 are duplicated to create padding pixels extended from the side of the projection face A2. In other words, a first part of the padding region PR includes padding pixels each being a duplicate of one boundary pixel of the projection face A1, and a second part of the padding region PR includes padding pixels each being a duplicate of one boundary pixel of the projection face A2.

With the help of one padding region inserted between a first projection face and a second projection face which have an image content discontinuity edge between a first side of the first projection face and a first side of the second projection face if the first side of the first projection face connects with the first side of the second projection face, the image quality of the first side of the first projection face after compression and the image quality of the first side of the second projection face after compression can be improved. The projection faces included in the decoded frame IMG' generated by the decoding circuit 122 can have better image quality. As mentioned above, the graphic rendering circuit 124 renders and displays an output image data on the display screen 126 according to the decoded frame IMG'. Since the padding region(s) in the decoded frame IMG' are additionally added and may not be displayable, the padding region(s) in the decoded frame IMG' may be discarded/ignored by the graphic rendering circuit 124 after the decoded frame IMG' is generated from the decoding circuit 122.

As shown in FIG. 6 and FIG. 7, padding is added to compact octahedron projection layouts for image quality improvement of compression at image content discontinuity edges. However, these are for illustrative purposes only, and are not meant to be limitations of the present invention. In practice, padding can be added to other 360 VR projection layouts for image quality improvement of compression at image content discontinuity edges. These alternative projection designs with padding all fall within the scope of the present invention.

Figure 10:
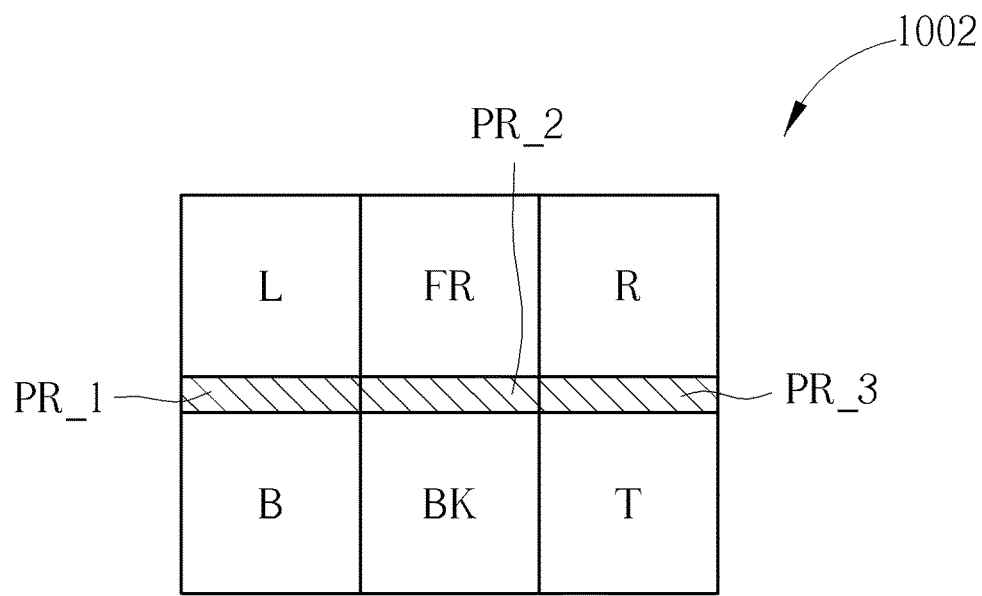
FIG. 10 is a diagram illustrating a compact cubemap projection layout with padding according to an embodiment of the present invention.

FIG. 10 is a diagram illustrating a compact cubemap projection layout with padding according to an embodiment of the present invention. The omnidirectional image/video content of a sphere is mapped onto six square projection faces via cubemap projection, where the square projection faces include a left projection face labeled by "L", a front projection face labeled by "FR", a right projection face labeled by "R", a top projection face labeled by "T", a back projection face labeled by "BK", and a bottom projection face labeled by "B". An image content discontinuity edge exists between the left projection face "L" and the bottom projection face "B" if the bottom side of the left projection face "L" connects with the top side of the bottom projection face "B" in a compact cubemap projection layout without padding. An image content discontinuity edge exists between the front projection face FR and the back projection face BK if the bottom side of the front projection face FR connects with the top side of the back projection face BK in the compact cubemap projection layout without padding. An image content discontinuity edge exists between the right projection face R and the top projection face T if the bottom side of the right projection face R connects with the top side of the top projection face T in the compact cubemap projection layout without padding. In accordance with the compact cubemap projection layout 1002 shown in FIG. 10, a first padding region PR_1 is inserted between the left projection face L and the top projection face T, a second padding region PR_2 is inserted between the front projection face FR and the back projection face BK, and a third padding region PR_3 is inserted between the right projection face R and the bottom projection face B. Each of the padding regions PR_1-PR_3 may be generated by using one of the aforementioned interpolation manner, geometry padding manner, and duplication manner.

For example, the duplication manner used by the proposed padding technique may spread boundary pixels of a projection face. Hence, a first part of a padding region inserted between a first projection face and a second projection face includes padding pixels each being a duplicate of one boundary pixel of the first projection face, and a second part of the padding region inserted between the first projection face and the second projection face includes padding pixels each being a duplicate of one boundary pixel of the second projection face.

For another example, the duplication manner used by the proposed padding technique may set pixel values of pixels included in the padding region by duplicating pixel values of pixels that are included in the first projection face and the second projection face but do not connect with the padding region inserted between the first projection face and the second projection face. In a case where the duplication manner used by the proposed padding technique obtains a duplicate of a partial region in a projection face. A first part of the padding region inserted between the first projection face and the second projection face is a duplicate of a partial region of the first projection face, and a second part of the padding region inserted between the first projection face and the second projection face is a duplicate of a partial region of the second projection face, where none of the partial region of the first projection face and the partial region of the second projection face connects with the padding region inserted between the first projection face and the second projection face.

For yet another example, the duplication manner used by the proposed padding technique may set pixel values of pixels included in the padding region inserted between the first projection face and the second projection face by duplicating pixel values of pixels included in at least one projection face distinct from the first projection face and the second projection face. Taking the compact cubemap projection layout 1002 shown in FIG. 10 for example, the first padding region PR_1 inserted between the left projection face L and the bottom projection face B may be set by duplicating pixels (e.g., pixels of a partial region) in at least one projection face (e.g., FR, BK, R, and/or T) that is not any of the left projection face L and the bottom projection face B, the second padding region PR_2 inserted between the front projection face FR and the back projection face BK may be set by duplicating pixels (e.g., pixels of a partial region) in at least one projection face (e.g., L, B, R, and/or T) that is not any of the front projection face FR and the back projection face BK, and/or the third padding region PR_3 inserted between the right projection face R and the top projection face T may be set by duplicating pixels (e.g., pixels of a partial region) in at least one projection face (e.g., L, B, FR, and/or BK) that is not any of the right projection face R and the top projection face T.

Figure 11:
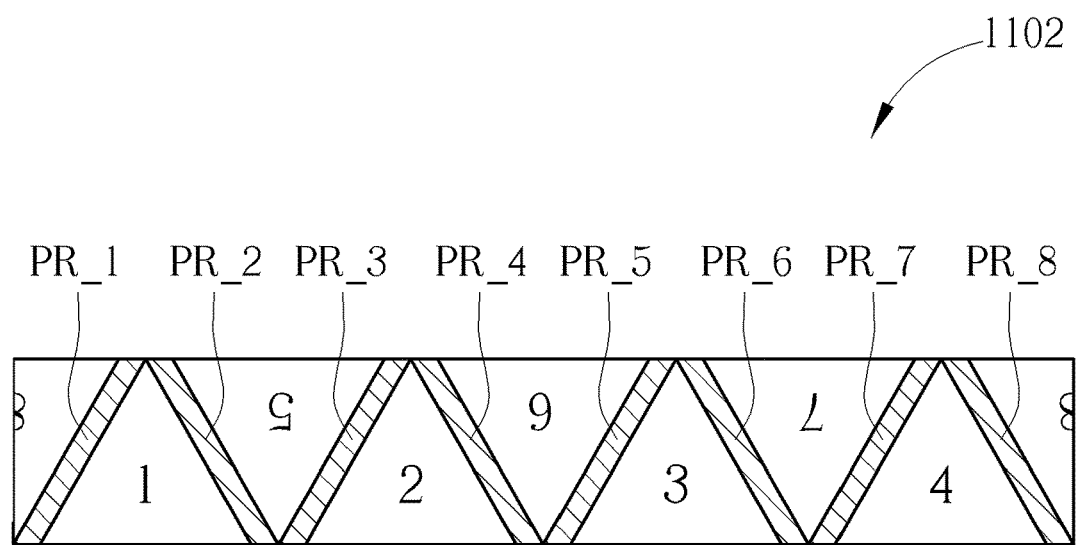
FIG. 11 is a diagram illustrating a third compact octahedron projection layout with padding according to an embodiment of the present invention.

FIG. 11 is a diagram illustrating a third compact octahedron projection layout with padding according to an embodiment of the present invention. The omnidirectional image/ video content of a sphere is mapped onto eight triangular projection faces (labeled by reference numbers "1", "2", "3", "4", "5", "6", "7" and "8") via an octahedron projection. The triangular projection face "8" is split into two right-triangle-shaped parts. An image content discontinuity edge exists between one right-triangle-shaped part of the triangular projection face "8" and the triangular projection face "1" if one side of the right-triangle-shaped part connects with one side of the triangular projection face "1" in a compact octahedron projection layout without padding. An image content discontinuity edge exists between the triangular projection faces "1" and "5" if another side of the projection face "1" connects with one side of the triangular projection face "5" in the compact octahedron projection layout without padding. An image content discontinuity edge exists between the triangular projection faces "5" and "2" if another side of the triangular projection face "5" connects with one side of the triangular projection face "2" in the compact octahedron projection layout without padding. An image content discontinuity edge exists between the triangular projection faces "2" and "6" if another side of the triangular projection face "2" connects with one side of the triangular projection face "6" in the compact octahedron projection layout without padding. An image content discontinuity edge exists between the triangular projection faces "6" and "3" if another side of the projection face "6" connects with one side of the triangular projection face "3" in the compact octahedron projection layout without padding. An image content discontinuity edge exists between the triangular projection faces "3" and "7" if another side of the triangular projection face "3" connects with one side of the triangular projection face "7" in the compact octahedron projection layout without padding. An image content discontinuity edge exists between the triangular projection faces "7" and "4" if another side of the projection face "7" connects with one side of the triangular projection face "4" in the compact octahedron projection layout without padding. An image content discontinuity edge exists between the other right-triangle-shaped part of the triangular projection face "8" and the triangular projection face if one side of the right-triangle-shaped part connects with another side of the triangular projection face "4" in the compact octahedron projection layout without padding.

In accordance with the compact octahedron projection layout 1102 shown in FIG. 11, a first padding region PR_1 is inserted between the triangular projection face "1" and one right-triangle-shaped part of the triangular projection face "8", a second padding region PR_2 is inserted between the triangular projection faces "1" and "5", a third padding region PR_3 is inserted between the triangular projection faces "5" and "2", a fourth padding region PR 4 is inserted between the triangular projection faces "2" and "6", a fifth padding region PR 5 is inserted between the triangular projection faces "6" and "3", a sixth padding region PR 6 is inserted between the triangular projection faces "3" and "7", a seventh padding region PR 7 is inserted between the triangular projection faces "7" and "4", and an eighth padding region PR 8 is inserted between the triangular projection face "4" and the other right-triangle-shaped part of the triangular projection face "8". Each of the padding regions PR_1-PR 8 may be generated by using one of the aforementioned interpolation manner, geometry padding manner, and duplication manner.

In addition to the image quality of image content discontinuity edges after compression, the image quality of layout boundaries after compression can be improved by the proposed padding technique. For example, when the omnidirectional image/video content of a sphere is mapped via an equirectangular projection (ERP) or an equal-area projection (EAP), only a single projection face is generated and arranged in an ERP/EAP layout. If a viewing angle of a viewport is 180 degrees, a decoded partial region located at the left boundary of the ERP/EAP layout and a decoded partial region located at the right boundary of the ERP/EAP layout are selected and combined to form a viewport area to be displayed. Since blocks at the left boundary and blocks at the right boundary of the typical ERP/EAP layout are encoded independently, it is possible that the viewport area has artifacts along an edge resulting from combination of the decoded partial region located at the left boundary of the ERP/EAP layout and the decoded partial region located at the right boundary of the ERP/EAP layout. To address this issue, the present invention further proposes adding padding regions to layout boundaries to provide more information for compression process.

Figure 12:
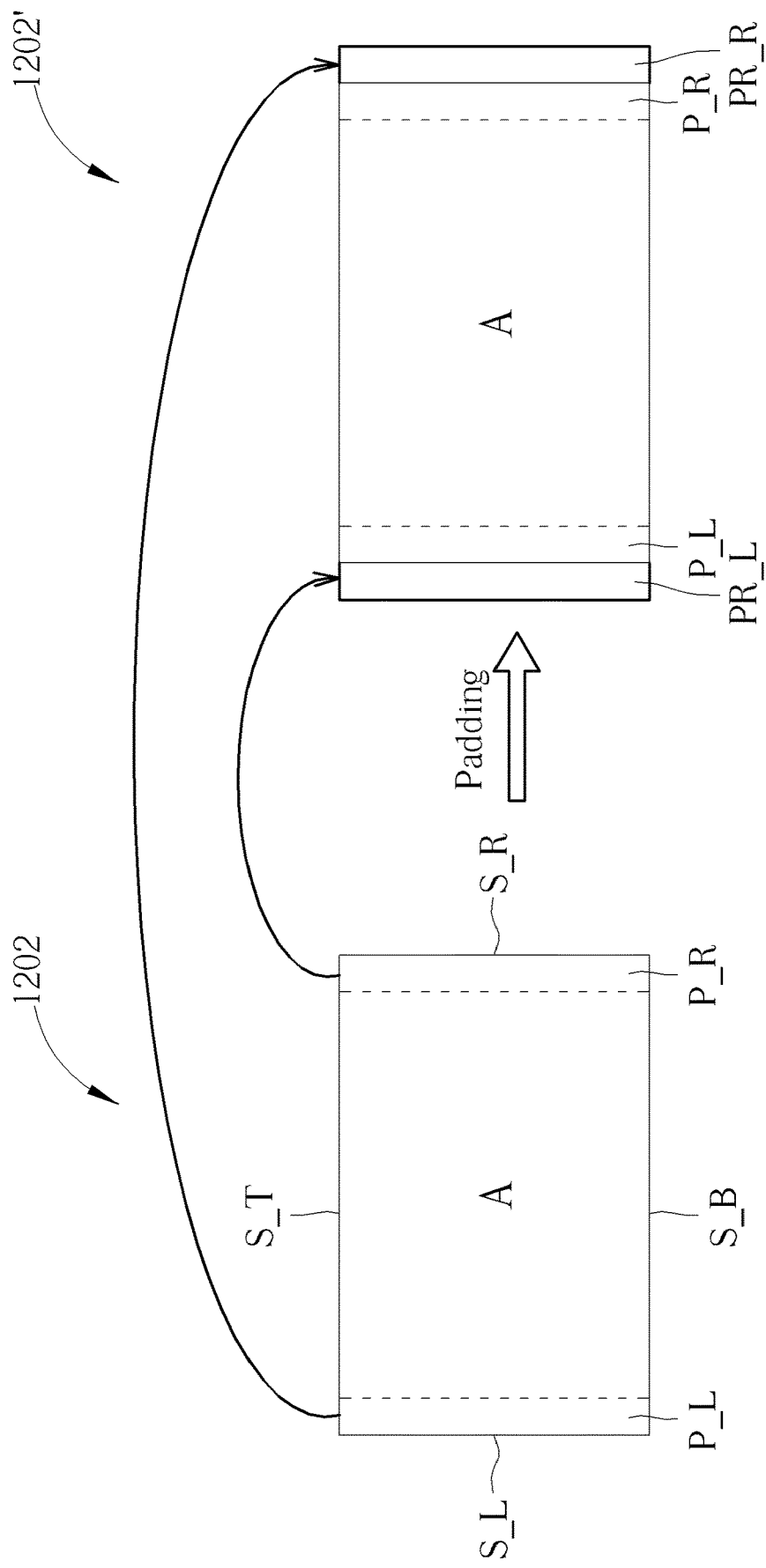
FIG. 12 is a diagram illustrating a first ERP/EAP layout with padding according to an embodiment of the present invention.

FIG. 12 is a diagram illustrating a first ERP/EAP layout with padding according to an embodiment of the present invention. A single projection face A with a top side S_T, a bottom side S_B, a left side S_L and a right side S_R is arranged in an ERP/EAP layout 1202 without padding. The top side S_T, bottom side S_B, left side S_L and right side S_R are four boundaries of the ERP/EAP layout 1202. In addition, the projection face A in the ERP/EAP layout 1202 has a first partial region P_L and a second partial region P_R, where the first partial region P_L includes boundary pixels at the left side S_L, and the second partial region P_R includes boundary pixels at the right side S_R. The 360 VR projection layout L_VR employed by the conversion circuit 114 may be set by the ERP/EAP layout 1202' shown in FIG. 12. The ERP/EAP layout 1202' may be derived from the ERP/EAP layout 1202. The projection face A is obtained via equirectangular projection/equal-area projection of a sphere. The projection face A, a first padding region PR_L and a second padding region PR_R are packed in the ERP/EAP layout 1202'. As shown in FIG. 12, the first padding region PR_L connects with the left side S_L of the projection face A, and forms a left boundary of the ERP/EAP layout 1202', and the second padding region PR_R connects with the right side S_R of the projection face A, and forms a right boundary of the ERP/EAP layout 1202'. For example, the width of the first padding region PR_L may be 8 pixels, and the width of the second padding region PR_R may be 8 pixels. Since left side S_L and right side S_R of the projection face A are opposite sides, the first padding region PR_L does not connect with the right side S_R of the projection face A, and the second padding region PR_R does not connect with the left side S_L of the projection face A.

In this embodiment, the first padding region PR_L is a duplicate of the second partial region P_R of the projection face A, and the second padding region PR_R is a duplicate of the first partial region P_L of the projection face A. Hence, pixels of the first padding region PR_L include boundary pixels at the right side S_R of the projection face A, but do not include boundary pixels at the left side S_L of the projection face A; and pixels of the second padding region PR_R include boundary pixels at the left side S_L of the projection face A, but do not include boundary pixels at the right side S_R of the projection face A. Due to inherent characteristics of the equirectangular projection/equal-area projection, there is an image content continuity boundary between the first padding region PR_L and the projection face A packed in the ERP/EAP layout 1202' (i.e., content is continuously represented in the projection face A and the first padding region PR_L), and there is an image content continuity boundary between the second padding region PR_R and the projection face A packed in the ERP/EAP layout 1202' (i.e., content is continuously represented in the projection face A and the second padding region PR_R).

In addition to padding regions that are added to a left side and a right side of a projection face obtained via equirectangular projection/equal-area projection, padding regions may be added to a top side and a bottom side of the projection face to provide more information for compression process.

Figure 13:
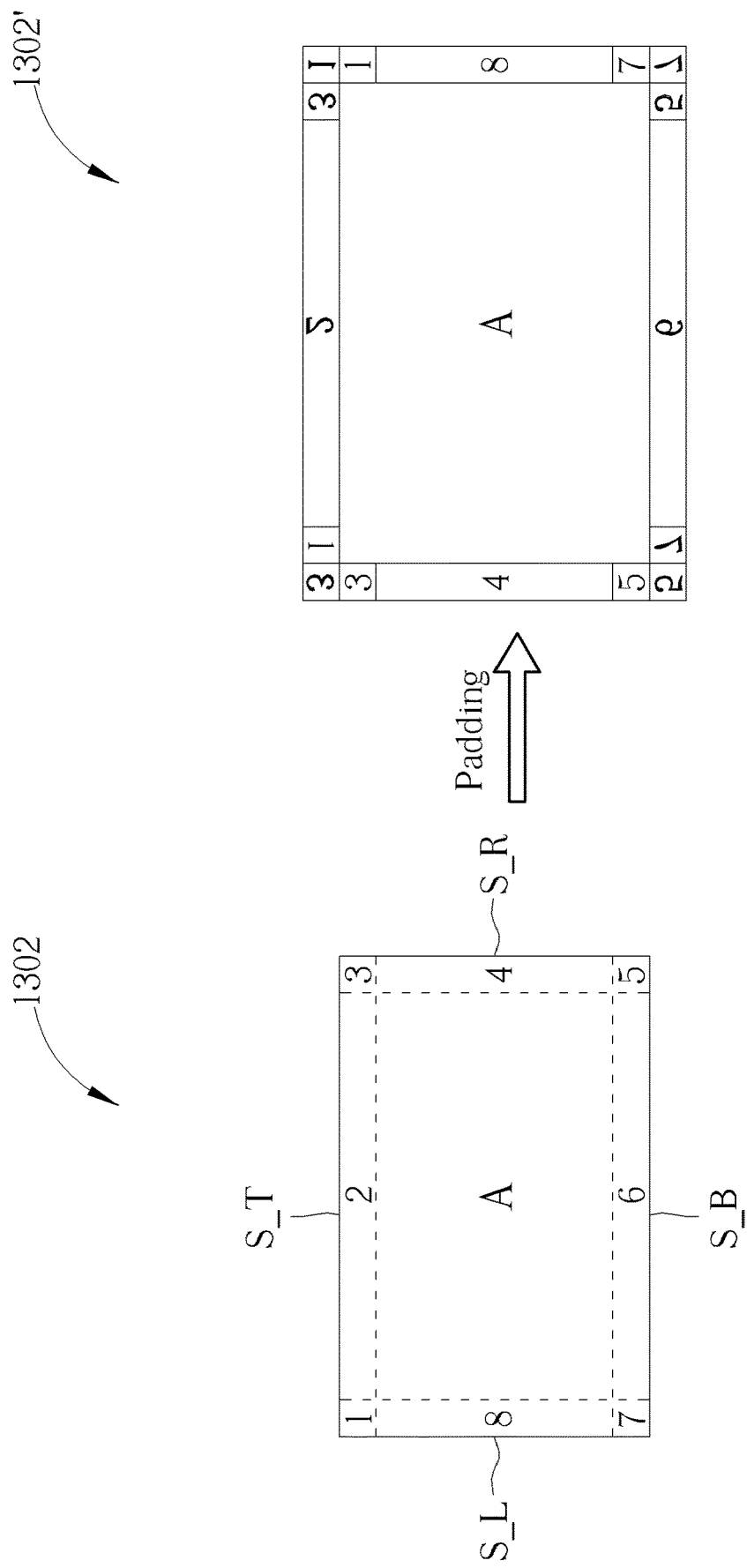
FIG. 13 is a diagram illustrating a second ERP/EAP layout with padding according to an embodiment of the present invention.

FIG. 13 is a diagram illustrating a second ERP/EAP layout with padding according to an embodiment of the present invention. A single projection face A with a top side S_T, a bottom side S_B, a left side S_L and a right side S_R is arranged in an ERP/EAP layout 1302 without padding. The top side S_T, bottom side S_B, left side S_L and right side S_R are four boundaries of the ERP/EAP layout 1302. In addition, the projection face A in the ERP/EAP layout 1302 has a plurality of image areas (labeled by reference numbers "1", "2", "3", "4", "5", "6", "7", and "8"). The image areas "1"-"3" form one partial region, and include boundary pixels at the top side S_T. The image areas "3"-"5" form one partial region, and include boundary pixels at the right side S_R. The image areas "5"-"7" form one partial region, and include boundary pixels at the bottom side S_B. The image areas "1", "8" and "7" form one partial region, and include boundary pixels at the left side S_L.

The 360 VR projection layout L_VR employed by the conversion circuit 114 may be set by the ERP/EAP layout 1302' shown in FIG. 13. The ERP/EAP layout 1302' may be derived from the ERP/EAP layout 1302. The projection face A is obtained via equirectangular projection/equal-area projection of a sphere. As shown in FIG. 13, a first padding region connected with the left side S_L of the projection face A is generated by duplicating the image areas "3"-"5" of the projection face A, a second padding region connected with the right side S_R of the projection face A is generated by duplicating the image areas "1", "8" and "7" of the projection face A, a third padding region connected with the top side S_T of the projection face A is generated by duplicating the image areas "1"-"3" of the projection face A to obtain a duplicated partial region and then flipping the duplicated partial region, and a fourth padding region connected with the bottom side S_B of the projection face A is generated by duplicating the image areas "5"-"7" of the projection face A to obtain a duplicated partial region and then flipping the duplicated partial region.

To make a shape of the ERP/EAP layout 1302' become a rectangle, a top-left corner padding region is generated by duplicating the image area "3" to obtain a duplicated padding region and then flipping the duplicated padding region, a top-right corner padding region is generated by duplicating the image area "1" to obtain a duplicated padding region and then flipping the duplicated padding region, a bottom-left corner padding region is generated by duplicating the image area "5" to obtain a duplicated padding region and then flipping the duplicated padding region, and a bottom-right corner padding region is generated by duplicating the image area "7" to obtain a duplicated padding region and then flipping the duplicated padding region.

Due to inherent characteristics of the equirectangular projection/equal-area projection, an image content continuity boundary exists between the top-left corner padding region and the first padding region, an image content continuity boundary exists between the top-left corner padding region and the third padding region, an image content continuity boundary exists between the top-right corner padding region and the second padding region, an image content continuity boundary exists between the top-right corner padding region and the third padding region, an image content continuity boundary exists between the bottom-left corner padding region and the first padding region, an image content continuity boundary exists between the bottom-left corner padding region and the fourth padding region, an image content continuity boundary exists between the bottom-right corner padding region and the second padding region, and an image content continuity boundary exists between the bottom-right corner padding region and the fourth padding region.

As shown in FIG. 13, the first padding region connected with the left side S_L of the projection face A forms a part of a left boundary of the ERP/EAP layout 1302', the second padding region connected with the right side S_R of the projection face A forms a part of a right boundary of the ERP/EAP layout 1302', the third padding region connected with the top side S_T of the projection face A forms a part of a top boundary of the ERP/EAP layout 1302', and the fourth padding region connected with the bottom side S_B of the projection face A forms a part of a bottom boundary of the ERP/EAP layout 1302'. Due to inherent characteristics of the equirectangular projection/equal-area projection, there is an image content continuity boundary between the first padding region and the projection face A packed in the ERP/EAP layout 1302' (i.e., content is continuously represented in the first padding region and the projection face A), there is an image content continuity boundary between the second padding region and the projection face A packed in the ERP/EAP layout 1302' (i.e., content is continuously represented in the second padding region and the projection face A), there is an image content continuity boundary between the third padding region and the projection face A packed in the ERP/EAP layout 1302' (i.e., content is continuously represented in the third padding region and the projection face A), and there is an image content continuity boundary between the fourth padding region and the projection face A packed in the ERP/EAP layout 1302' (i.e., content is continuously represented in the fourth padding region and the projection face A).

Figure 14:
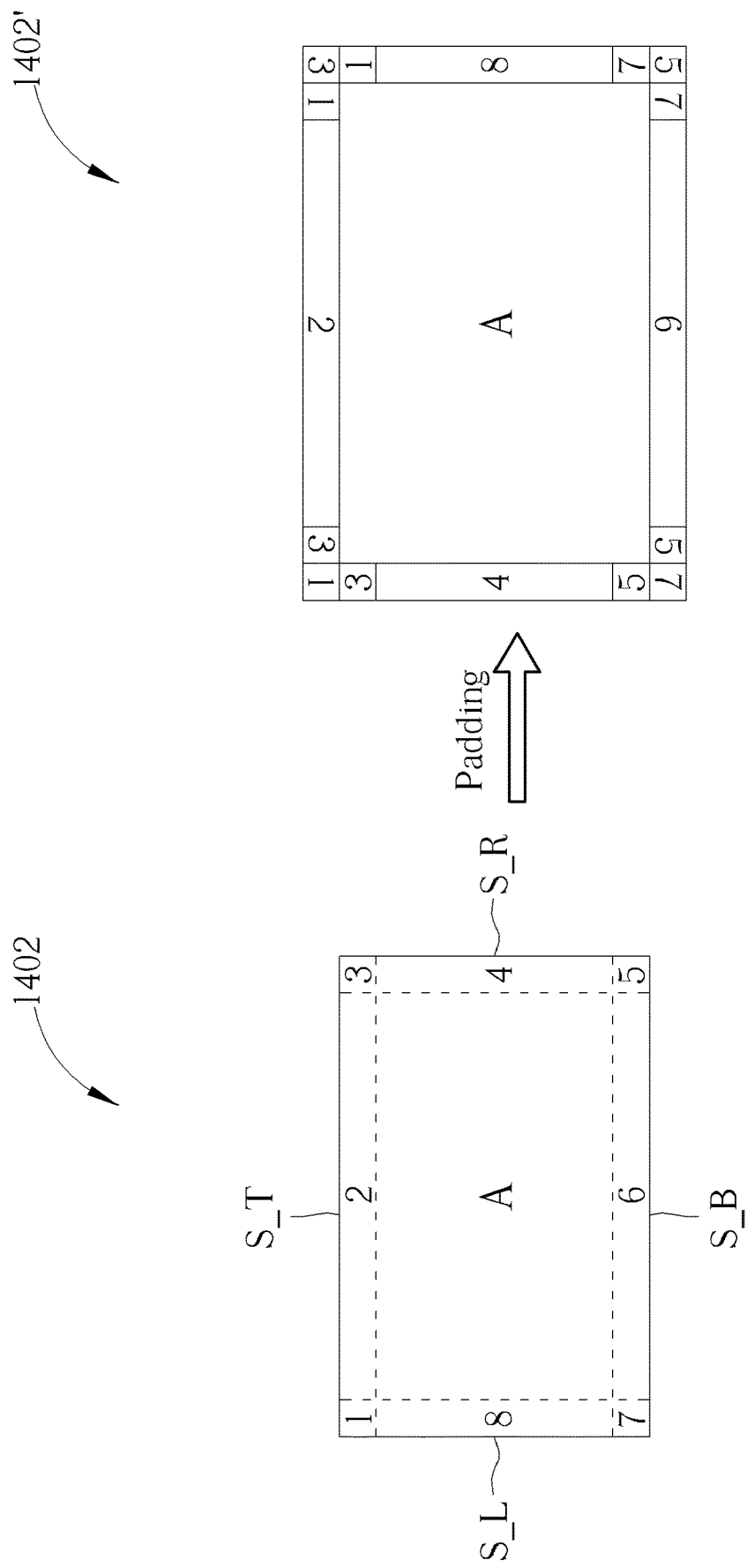
FIG. 14 is a diagram illustrating a third ERP/EAP layout with padding according to an embodiment of the present invention.

FIG. 14 is a diagram illustrating a third ERP/EAP layout with padding according to an embodiment of the present invention. A single projection face A with a top side S_T, a bottom side S_B, a left side S_L and a right side S_R is arranged in an ERP/EAP layout 1402 without padding. The top side S_T, bottom side S_B, left side S_L and right side S_R are four boundaries of the ERP/EAP layout 1402. In addition, the projection face A in the ERP/EAP layout 1402 has a plurality of image areas (labeled by reference numbers "1", "2", "3", "4", "5", "6", "7", and "8"). The image areas "1"-"3" form one partial region, and include boundary pixels at the top side S_T. The image areas "3"-"5" form one partial region, and include boundary pixels at the right side S_R. The image areas "5"-"7" form one partial region, and include boundary pixels at the bottom side S_B. The image areas "7"-"8" and "1" form one partial region, and include boundary pixels at the left side S_L.

The 360 VR projection layout L_VR employed by the conversion circuit 114 may be set by the ERP/EAP layout 1402' shown in FIG. 14. The ERP/EAP layout 1402' may be derived from the typical ERP/EAP layout 1402. The projection face A is obtained via equirectangular projection/equal-area projection of a sphere. As shown in FIG. 14, a first padding region connected with the left side S_L of the projection face A is generated by duplicating the image areas "3"-"5" of the projection face A, a second padding region connected with the right side S_R of the projection face A is generated by duplicating the image areas "1", "8" and "7" of the projection face A, a third padding region connected with the top side S_T of the projection face A is generated by duplicating the image areas "1"-"3" of the projection face A to obtain a duplicated partial region and then rotating the duplicated partial region by 180% and a fourth padding region connected with the bottom side S_B of the projection face A is generated by duplicating the image areas "5"-"7" of the projection face A to obtain a duplicated partial region and then rotating the duplicated partial region by 180°.

To make a shape of the ERP/EAP layout 1402' become a rectangle, a top-left corner padding region is generated by duplicating the image area "1" to obtain a duplicated padding region and then rotating the duplicated padding region by 180% a top-right corner padding region is generated by duplicating the image area "3" to obtain a duplicated padding region and then rotating the duplicated padding region by 180% a bottom-left corner padding region is generated by duplicating the image area "7" to obtain a duplicated padding region and then rotating the duplicated padding region by 180% and a bottom-right corner padding region is generated by duplicating the image area "5" to obtain a duplicated padding region and then rotating the duplicated padding region by 180°.

Due to inherent characteristics of the equirectangular projection/equal-area projection, an image content continuity boundary exists between the top-left corner padding region and the first padding region, an image content continuity boundary exists between the top-left corner padding region and the third padding region, an image content continuity boundary exists between the top-right corner padding region and the second padding region, an image content continuity boundary exists between the top-right corner padding region and the third padding region, an image content continuity boundary exists between the bottom-left corner padding region and the first padding region, an image content continuity boundary exists between the bottom-left corner padding region and the fourth padding region, an image content continuity boundary exists between the bottom-right corner padding region and the second padding region, and an image content continuity boundary exists between the bottom-right corner padding region and the fourth padding region.

As shown in FIG. 14, the first padding region connected with the left side S_L of the projection face A forms a part of a left boundary of the ERP/EAP layout 1402', the second padding region connected with the right side S_R of the projection face A forms a part of a right boundary of the ERP/EAP layout 1402', the third padding region connected with the top side S_T of the projection face A forms a part of a top boundary of the ERP/EAP layout 1402', and the fourth padding region connected with the bottom side S_B of the projection face A forms a part of a bottom boundary of the ERP/EAP layout 1402'. Due to inherent characteristics of the equirectangular projection/equal-area projection, there is an image content continuity boundary between the first padding region and the projection face A packed in the ERP/EAP layout 1402' (i.e., content is continuously represented in the first padding region and the projection face A), there is an image content continuity boundary between the second padding region and the projection face A packed in the ERP/EAP layout 1402' (i.e., content is continuously represented in the second padding region and the projection face A), there is an image content continuity boundary between the third padding region and the projection face A packed in the ERP/EAP layout 1402' (i.e., content is continuously represented in the third padding region and the projection face A), and there is an image content continuity boundary between the fourth padding region and the projection face A packed in the ERP/EAP layout 1402' (i.e., content is continuously represented in the fourth padding region and the projection face A).

As shown in FIGS. 12-14, padding is added to ERP/EAP layouts for image quality improvement of compression at layout boundaries. However, these are for illustrative purposes only, and are not meant to be limitations of the present invention. In practice, padding can be added to other 360 VR projection layouts for image quality improvement of compression at layout boundaries. These alternative projection designs with padding all fall within the scope of the present invention.

Figure 15:
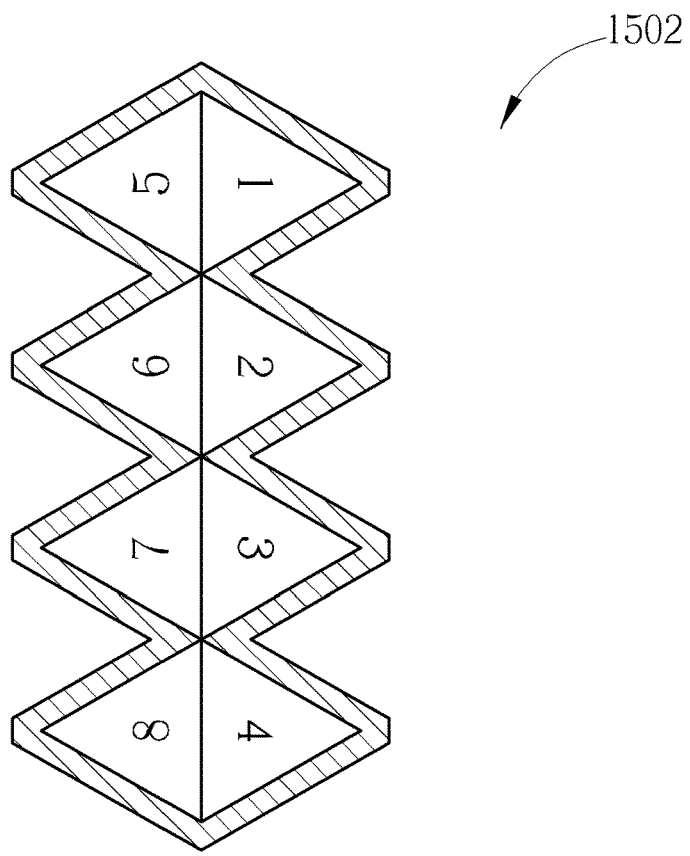
FIG. 15 is a diagram illustrating an octahedron projection layout with padding according to an embodiment of the present invention.
Figure 16:
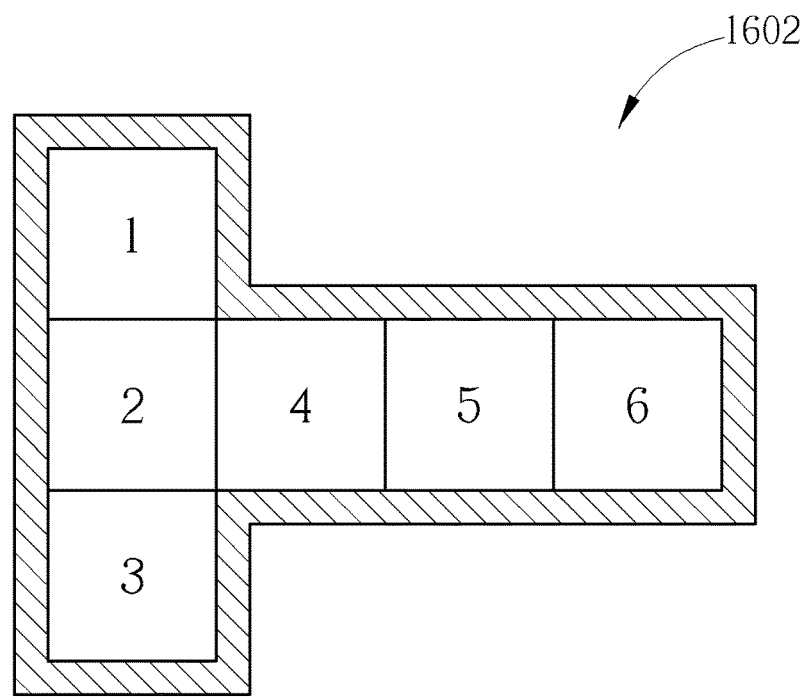
FIG. 16 is a diagram illustrating a cubemap projection layout with padding according to an embodiment of the present invention.
Figure 17:
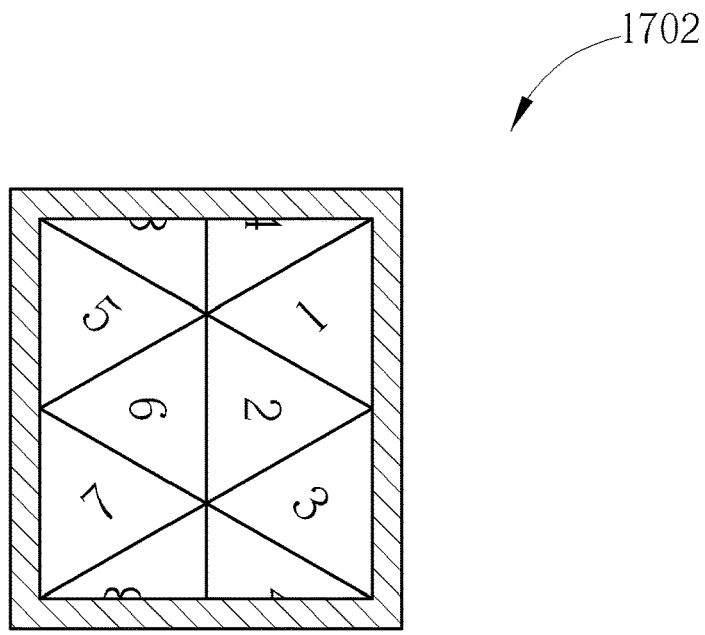
FIG. 17 is a diagram illustrating a fourth compact octahedron projection layout with padding according to an embodiment of the present invention.
Figure 18:
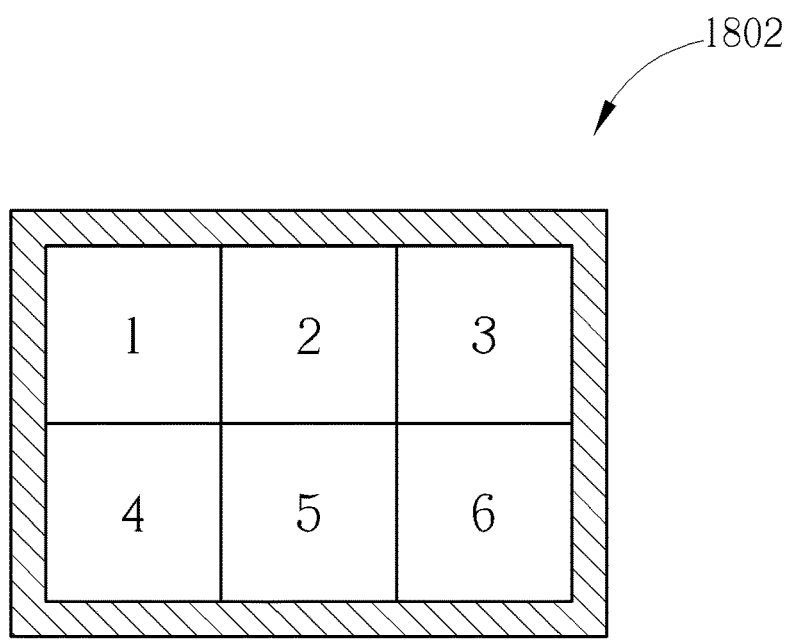
FIG. 18 is a diagram illustrating a compact cubemap projection layout with padding according to an embodiment of the present invention.

FIG. 15 is a diagram illustrating an octahedron projection layout with padding according to an embodiment of the present invention. FIG. 16 is a diagram illustrating a cubemap projection layout with padding according to an embodiment of the present invention. FIG. 17 is a diagram illustrating a fourth compact octahedron projection layout with padding according to an embodiment of the present invention. FIG. 18 is a diagram illustrating a compact cubemap projection layout with padding according to an embodiment of the present invention. The padding regions packed in the projection layout 1502/1602/1702/1802 may be generated by the aforementioned geometry padding manner that applies geometry padding to a projection face to determine pixel values of pixels included in a padding region connected with the projection face, or may be generated by the aforementioned duplication manner which sets pixel values of pixels included in a padding region connected with a projection face by duplicating pixel values of boundary pixels of the projection face, or by duplicating pixel values of pixels that are included in the projection face but do not connect with the padding region, or by duplicating pixel values of pixels that are not included in the projection face.

It should be noted that the aforementioned layout examples are for illustrative purposes only, and are not meant to be limitations of the present invention. In other embodiments of the present invention, a 360 VR projection layout with padding may be obtained by adding padding regions to a layout of other projection format, such as a pyramid projection layout, a tetrahedron projection layout, a tetragon quartz-based projection layout, an icosahedron projection layout, or a hexagon quartz-based projection layout.

With the help of padding regions added to boundaries of a projection layout, the image quality of boundaries after compression can be improved. As mentioned above, the graphic rendering circuit 124 renders and displays an output image data on the display screen 126 according to the decoded frame IMG'. Since the padding regions in the decoded frame IMG' are additionally added and may not be displayable, the padding regions in the decoded frame IMG' may be discarded/ignored by the graphic rendering circuit 124 after the decoded frame IMG' is generated from the decoding circuit 122.

Figure 19:
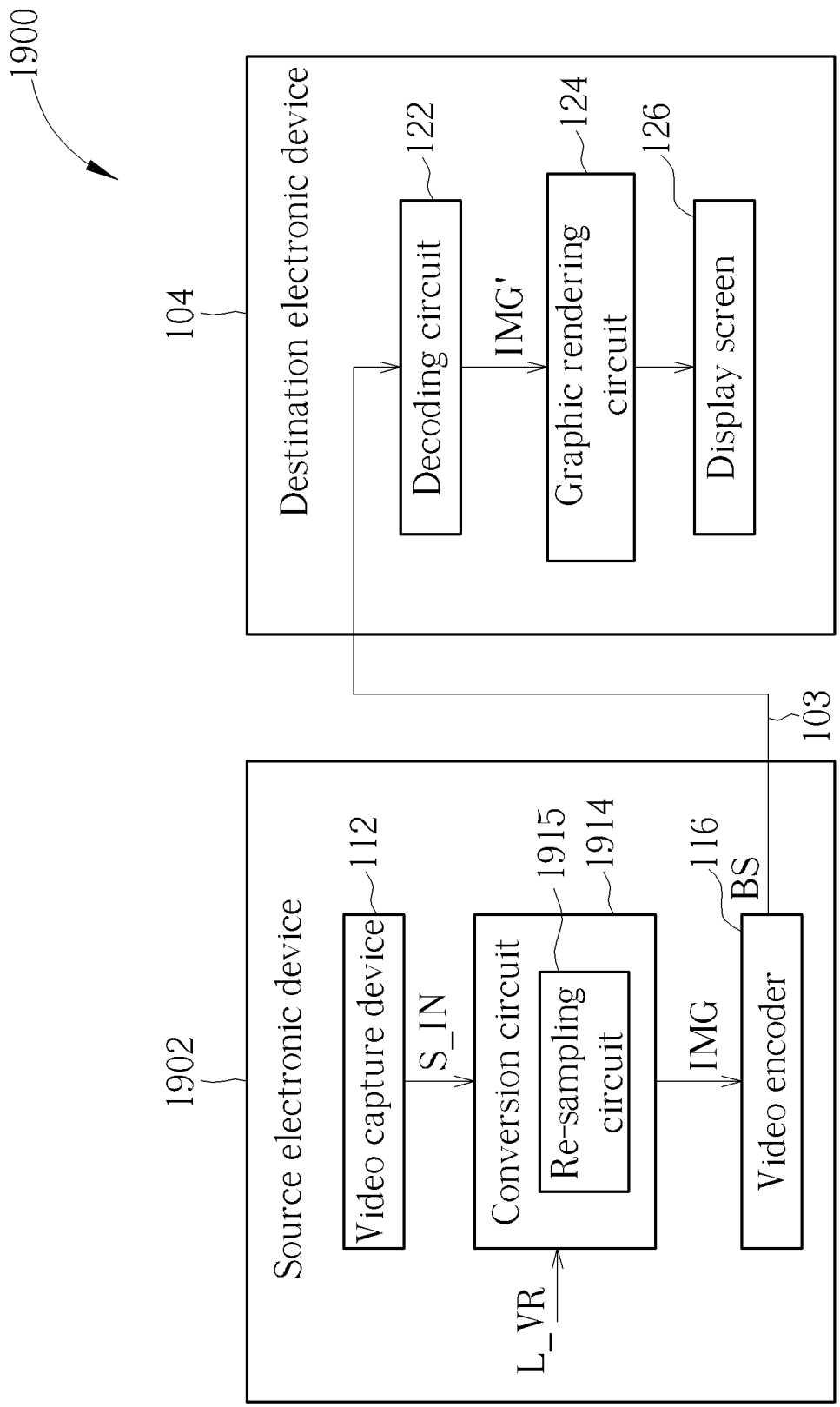
FIG. 19 is a diagram illustrating a second 360 VR system according to an embodiment of the present invention.

FIG. 19 is a diagram illustrating a second 360 VR system according to an embodiment of the present invention. The major difference between the 360 VR systems 100 and 1900 is that a conversion circuit 1914 of a source electronic device 1902 has a re-sampling circuit 1915 arranged to perform a proposed encoder-side projection face re-sampling function to regulate the sampling density (or sampling rate). For example, the encoder-side projection face re-sampling function may apply down-sampling to a projection face before coding. For another example, the encoder-side projection face re-sampling function may apply up-sampling to a projection face before coding. For yet another example, the encoder-side projection face re-sampling function may apply re-sampling with no size change to a projection face before coding.

Figure 20:
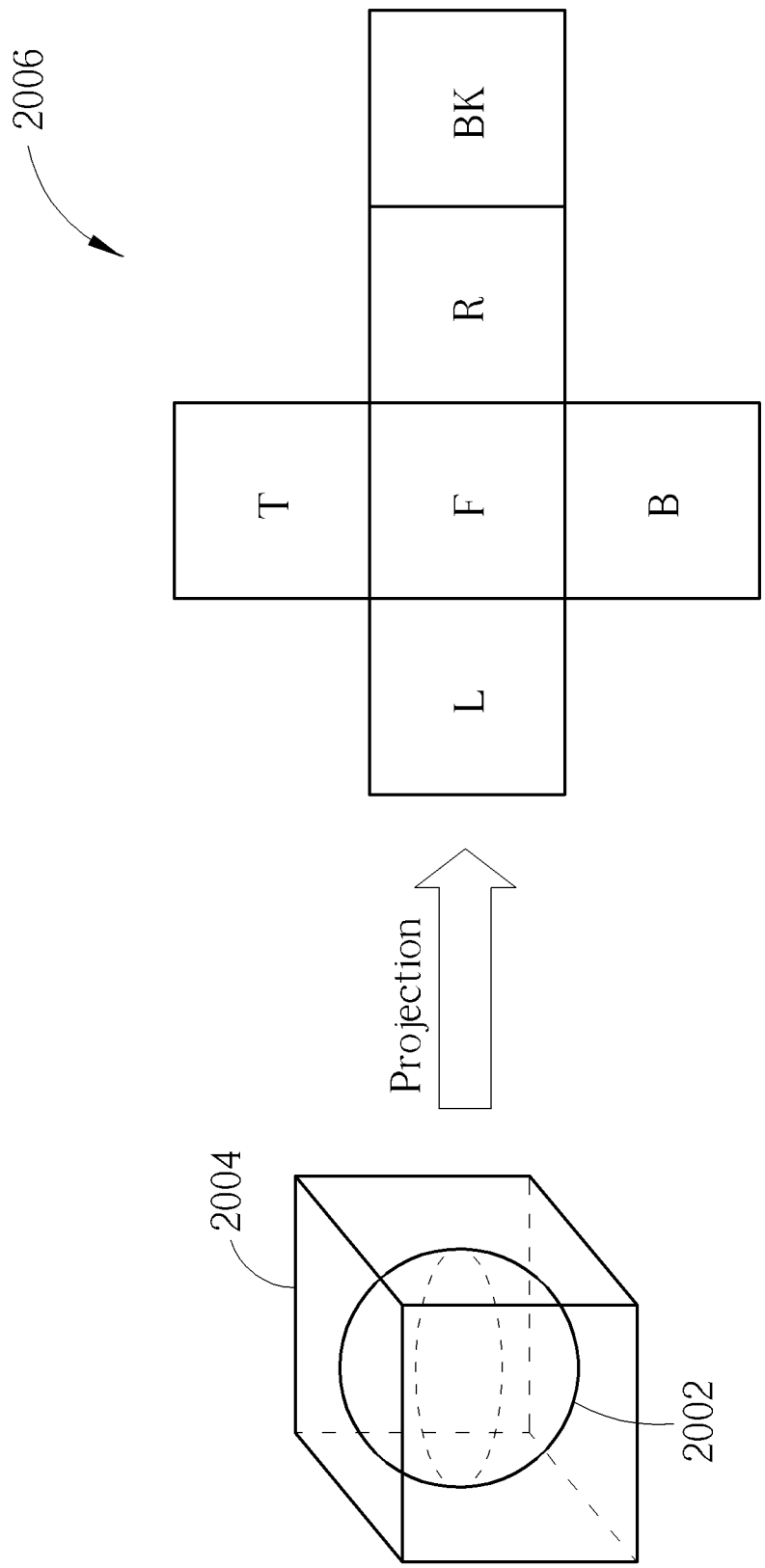
FIG. 20 is a diagram illustrating six square projection faces of a cubemap projection (CMP) layout, obtained from cubemap projection of a sphere.

In some embodiments of the present invention, the 360 VR projection layout L_VR is a cubemap projection layout that is a non-viewport based projection layout. Hence, the conversion circuit 1914 obtains square projection faces from an omnidirectional image/video content of a sphere, wherein the omnidirectional image/video content of the sphere is mapped onto the square projection faces via cubemap projection (CMP). FIG. 20 is a diagram illustrating six square projection faces of a cubemap projection (CMP) layout, obtained from cubemap projection of a sphere. An omnidirectional image/video content of a sphere 2002 is mapped onto six square projection faces (labeled by "K", "F", "R", "BK", "T", and "B") of a cube 2004. The square projection face "L" means a left face of the cube 2004. The square projection face "F" means a front face of the cube 2004. The square projection face "R" means a right face of the cube 2004. The square projection face "BK" means a back face of the cube 2004. The square projection face "T" means a top face of the cube 2004. The square projection face "B" means a bottom face of the cube 2004. As shown in FIG. 20, the square projection faces "L", "F", "R", "BK", "T", and "B" are arranged in a CMP layout 2006 corresponding to an unfolded cube. The projection-based frame IMG to be encoded is required to be rectangular. If the CMP layout 2006 is directly used for creating the projection-based frame IMG, the projection-based frame IMG has to be filled with dummy areas (e.g., black areas, gray areas, or white areas) to forma rectangular frame for encoding. Hence, the square projection faces "L", "F", "R", "BK", "T", and "B" may be packed in another CMP layout such as a 1×6 cube layout, a 6×1 cube layout, a 3×2 cube layout, or a 2×3 cube layout. In this way, the coding efficiency can be improved.

One or more of the square projection faces "L", "F", "R", "BK", "T", and "B" may be processed by the re-sampling circuit 1915 before being packed in the 360 VR projection layout L_VR that is a CMP layout (e.g., 1×6 cube layout, 6×1 cube layout, 3×2 cube layout, or 2×3 cube layout). For example, the re-sampling circuit 1915 obtains one re-sampled projection face by re-sampling at least a portion (i.e., part or all) of one square projection face through the proposed encoder-side projection face re-sampling function. The conversion circuit 1914 generates the projection-based frame IMG according to the employed CMP layout (e.g., 1×6 cube layout, 6×1 cube layout, 3×2 cube layout, or 2×3 cube layout), wherein the projection-based frame IMG has one or more re-sampled projection faces packed in the employed CMP layout. The encoder-side projection face re-sampling function may be a re-sampling function with non-uniform mapping or a re-sampling function with uniform mapping, depending upon the actual design considerations. Further details of uniform mapping and non-uniform mapping are described as below.

Figure 21:
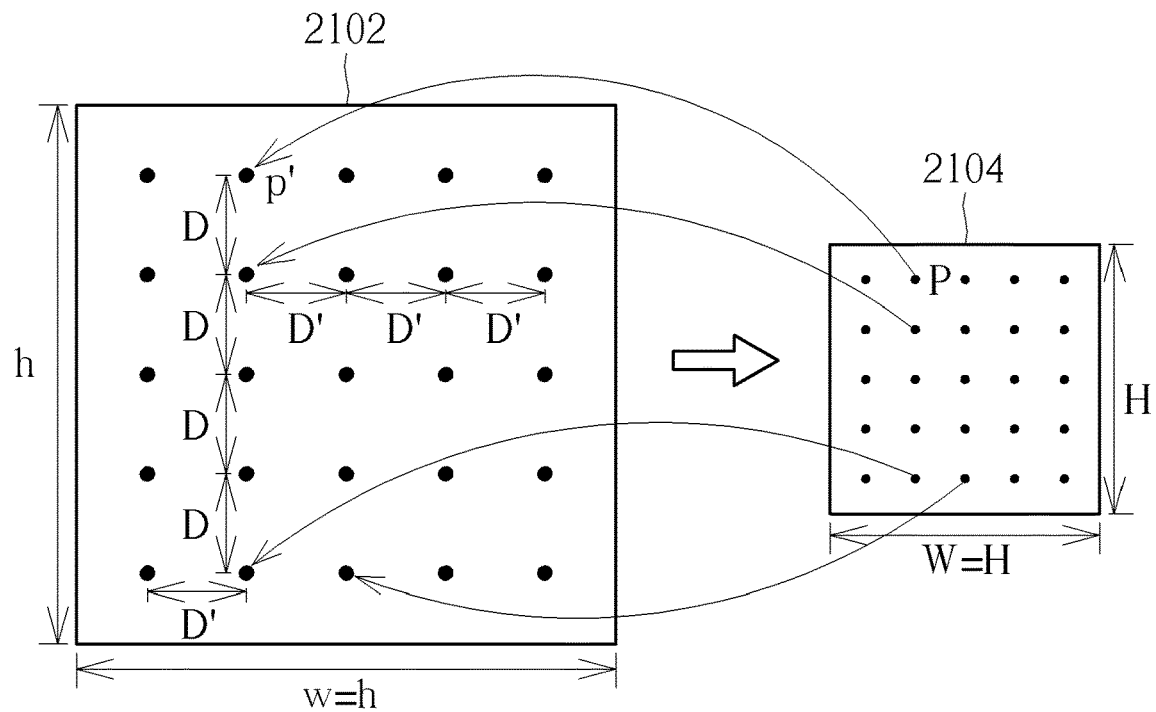
FIG. 21 is a diagram illustrating an example of re-sampling a square projection face obtained by the cubemap projection through uniform mapping according to an embodiment of the present invention.
Figure 22:
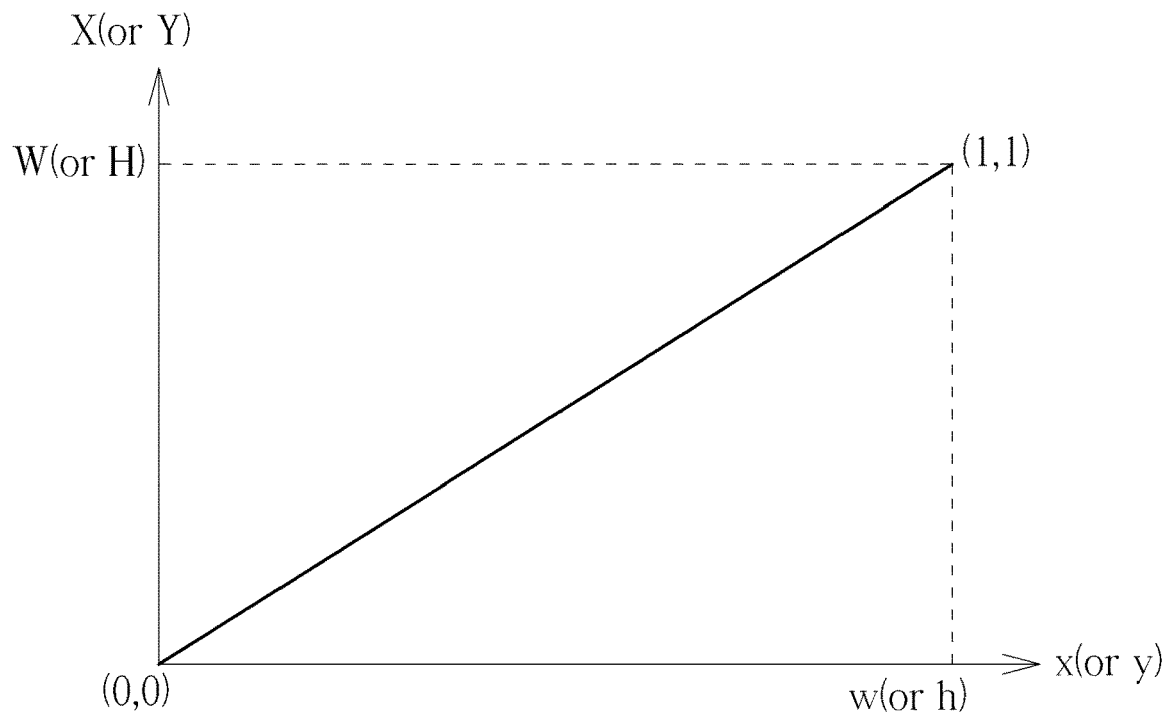
FIG. 22 is a diagram illustrating a curve of a uniform mapping function according to an embodiment of the present invention.

Please refer to FIG. 21 in conjunction with FIG. 22. FIG. 21 is a diagram illustrating an example of re-sampling a square projection face obtained by the cubemap projection through uniform mapping according to an embodiment of the present invention. FIG. 22 is a diagram illustrating a curve of a uniform mapping function according to an embodiment of the present invention. A square projection face 2102 to be re-sampled may be any of the square projection faces "L", "F", "R", "BK", "T", "B" shown in FIG. 20. In this example, a square projection face 2104 is derived from down-sampling the square projection face 2102 in its height direction and width direction, where the square projection face 2102 has width w and height h (h=w), and the square projection face 2104 has width W and height H (W=H<h). That is, down-sampling from height h to height H is performed by uniform mapping, and down-sampling from width w to width W is also performed by uniform mapping. By way of example, but not limitation, the same uniform mapping function is applied to the width direction (i.e., x-axis direction) and the height direction (i.e., y-axis direction). For example, the uniform mapping functions in different directions may be expressed using the following formulas.

$$Y = f(y) = \frac{H}{h} * y \tag{1}$$

$$X = f(x) = \frac{W}{w} * x \tag{2}$$

Hence, regarding an integer pixel position located at a coordinate Y of y-axis in the square projection face 2104, a corresponding sampling point located at a coordinate y of y-axis in the square projection face 2102 can be determined from the uniform mapping function expressed in formula (1). Due to the uniform mapping in the height direction, two vertically adjacent sampling points in the square projection face 2102 are uniformly distributed with a constant distance D. Similarly, regarding an integer pixel position located at a coordinate X of x-axis in the square projection face 2104, a corresponding sampling point located at a coordinate x of x-axis in the square projection face 2102 can be determined from the uniform mapping function expressed in formula (2). Due to the uniform mapping in the width direction, two horizontally adjacent sampling points in the rectangular projection face 2102 are uniformly distributed with a constant distance D'. The pixel value of a position P in the square projection face 2104 is derived from using the pixel value of the corresponding sampling position p' found in the square projection face 2102 according to the formulas (1) and (2).

A sampling point (i.e., the obtained pixel position p') in the square projection face 2102 may not be at an integer position. If at least one of an x-axis coordinate x and a y-axis coordinate y of a sampling point in the square projection face 2102 is a non-integer position, an interpolation filter (not shown) in the conversion circuit 1914 (particularly, re-sampling circuit 1915) may be applied to integer pixels around the sampling point in the square projection face 2102 to derive the pixel value of the sampling point.

Figure 23:
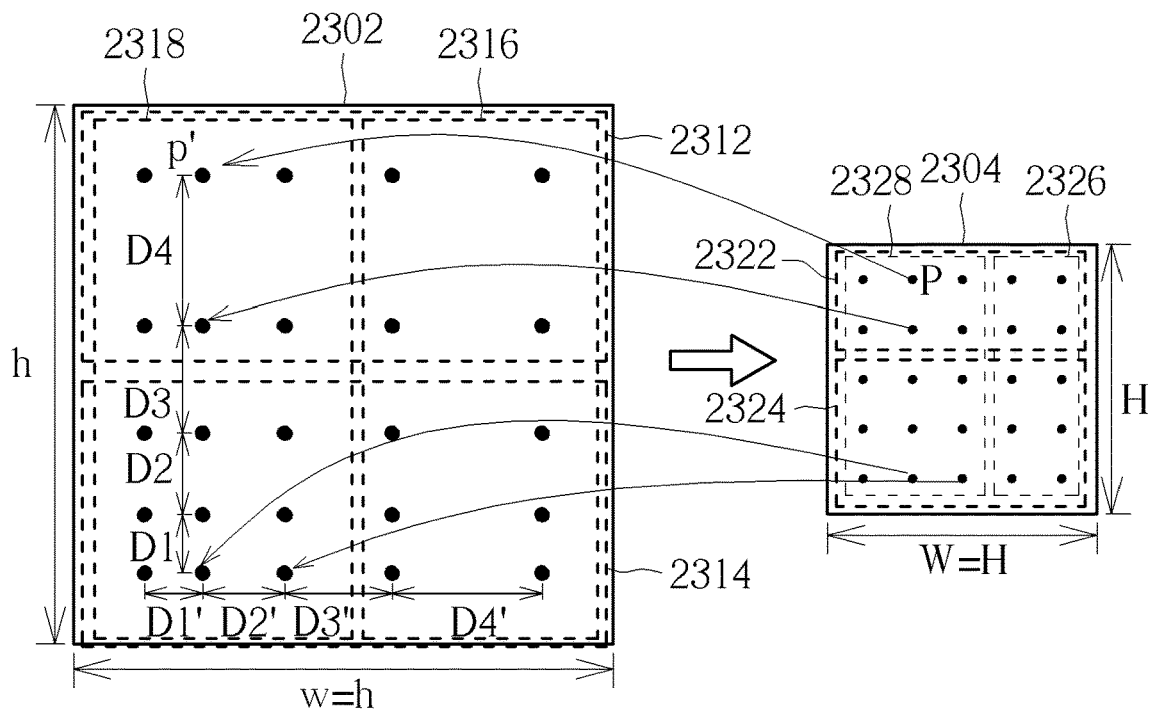
FIG. 23 is a diagram illustrating a first example of re-sampling a square projection face obtained by the cubemap projection through non-uniform mapping according to an embodiment of the present invention.

To preserve more details for a particular area within a projection face, the present invention further proposes re-sampling a square projection face obtained by cubemap projection through non-uniform mapping. FIG. 23 is a diagram illustrating a first example of re-sampling a square projection face obtained by the cubemap projection through non-uniform mapping according to an embodiment of the present invention. A square projection face 2302 to be re-sampled may be any of the square projection faces "L", "F", "R", "BK", "T", "B" shown in FIG. 20. In this example, a square projection face 2304 is derived from down-sampling the square projection face 2302 in its height direction (i.e., y-axis direction) and width direction (i.e., x-axis direction), where the square projection face 2302 has width w and height h (h=w), and the square projection face 2304 has width W and height H (W=H<h).

Regarding an integer pixel position located at a coordinate of y-axis in the square rectangular projection face 2304, a corresponding sampling point located at a coordinate of y-axis in the square projection face 2302 can be determined from a non-uniform mapping function. As shown in FIG. 23, the interval between two vertically adjacent sampling points is not a constant. For example, the interval between two vertically adjacent sampling points may be one of D1, D2, D3 and D4, where D4>D3>D2>D1. Specifically, the sampling points are non-uniformly distributed in the height direction of the square projection face 2302. For example, pixels in a first re-sampled region 2322 of the square projection face 2304 are obtained by re-sampling a first source region 2312 of the square projection face 2302, and pixels in a second re-sampled region 2324 of the square projection face 2304 are obtained by re-sampling the second source region 2314 of the square projection face 2302. Due to the non-uniform mapping in the height direction, the density of sampling points obtained from the first source region 2312 is different from the density of sampling points obtained from the second source region 2314. In other words, different sampling rates are used in the height direction of the square projection face 2302. The first re-sampled region 2322 is derived from re-sampling the first source region 2312 with a first sampling rate (or first sampling density) in the height direction, and the second re-sampled region 2324 is derived from re-sampling the second source region 2314 with a second sampling rate (or second sampling density) in the height direction, wherein the second sampling rate (or second sampling density) is different from the first sampling rate (or first sampling density).

Similarly, regarding an integer pixel position located at a coordinate of x-axis in the square rectangular projection face 2304, a corresponding sampling point located at a coordinate of x-axis in the square projection face 2302 can be determined from a non-uniform mapping function. As shown in FIG. 23, the interval between two horizontally adjacent sampling points is not a constant. For example, the interval between two horizontally adjacent sampling points may be one of D1', D2', D3' and D4', where D4'>D3'>D2'>D1'. Specifically, the sampling points are non-uniformly distributed in the width direction of the square projection face 2302. For example, pixels in a first re-sampled region 2326 of the square projection face 2304 are obtained by re-sampling a first source region 2316 of the square projection face 2302, and pixels in a second re-sampled region 2328 of the square projection face 2304 are obtained by re-sampling the second source region 2318 of the square projection face 2302. Due to the non-uniform mapping in the width direction, the density of sampling points obtained from the first source region 2316 is different from the density of sampling points obtained from the second source region 2318. In other words, different sampling rates are used in the width direction of the square projection face 2302. The first re-sampled region 2326 is derived from re-sampling the first source region 2316 with a first sampling rate (or first sampling density) in the width direction, and the second re-sampled region 2328 is derived from re-sampling the second source region 2318 with a second sampling rate (or second sampling density) in the width direction, wherein the second sampling rate (or second sampling density) is different from the first sampling rate (or first sampling density).

The pixel value of a position P in the square projection face 2304 is derived from using the pixel value of the corresponding sampling position p' found in the square projection face 2302 according to non-uniform mapping functions used in the x-axis direction and the y-axis direction. A sampling point (i.e., the obtained pixel position p') in the square projection face 2302 may not be at an integer position. If at least one of an x-axis coordinate x and a y-axis coordinate y of a sampling point in the square projection face 2302 is a non-integer position, an interpolation filter (not shown) in the conversion circuit 1914 (particularly, re-sampling circuit 1915) may be applied to integer pixels around the sampling point in the square projection face 2302 to derive the pixel value of the sampling point.

In this example, the non-uniform mapping applied to the square projection face 2302 includes a first non-uniform mapping function employed for re-sampling at least a portion (i.e., part or all) of the square projection face 2302 in a first direction (e.g., one of width direction and height direction) and a second non-uniform mapping function employed for re-sampling at least a portion (i.e., part or all) of the square projection face 2302 in a second direction (e.g., the other of width direction and height direction). In one exemplary design, the first non-uniform mapping function may be the same as the second non-uniform mapping function. That is, the first direction and the second direction (e.g., width direction and height direction) can use the same non-uniform mapping curve. In another exemplary design, the first non-uniform mapping function may be different from the second non-uniform mapping function. That is, the first direction and the second direction (e.g., width direction and height direction) can use different non-uniform mapping curves.

Figure 24:
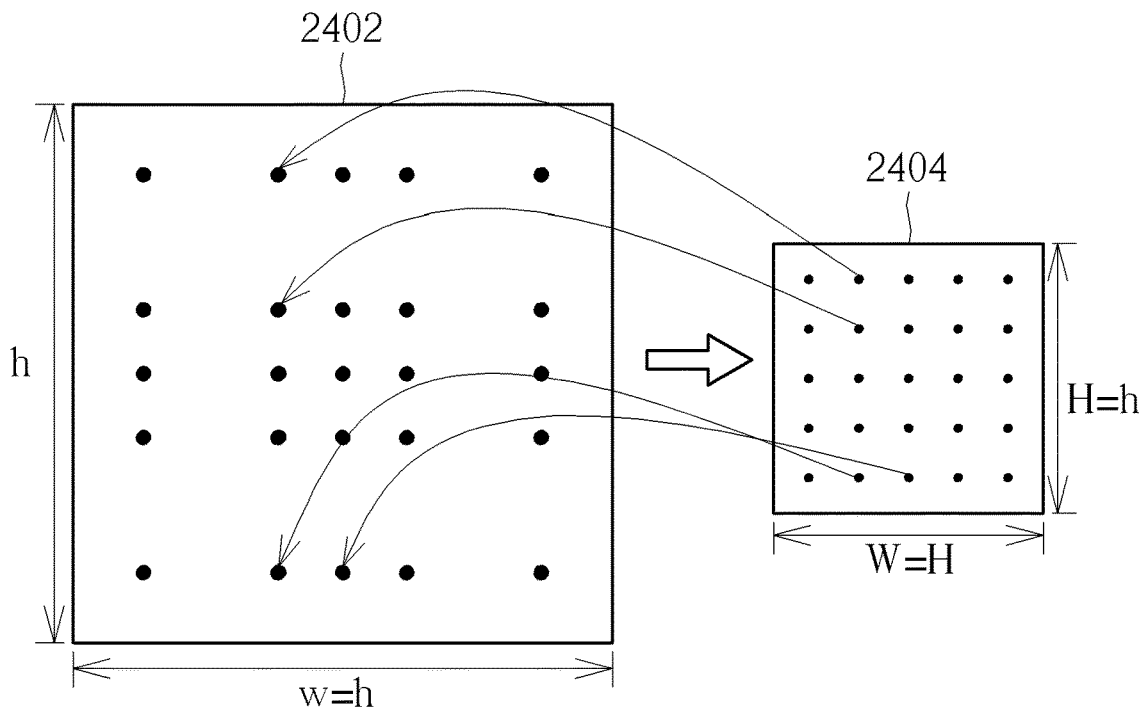
FIG. 24 is a diagram illustrating a second example of re-sampling a square projection face obtained by the cubemap projection through non-uniform mapping according to an embodiment of the present invention.

In the example shown in FIG. 23, a re-sampled square projection face is derived from applying down-sampling to an original square projection face through non-uniform mapping. However, this is for illustrative purposes only, and is not meant to be a limitation of the present invention. Alternatively, a re-sampled square projection face may be derived from applying up-sampling to an original square projection face through non-uniform mapping, or may be derived from applying re-sampling with no size change to an original square projection face through non-uniform mapping. FIG. 24 is a diagram illustrating a second example of re-sampling a square projection face obtained by the cube-map projection through non-uniform mapping according to an embodiment of the present invention. A square projection face 2402 to be re-sampled may be any of the square projection faces "L", "F", "R", "BK", "T", "B" shown in FIG. 20. In this example, re-sampling without size change is employed. Hence, a square projection face 2404 is derived from re-sampling the square projection face 2402 in its height direction (i.e., y-axis direction) and width direction (i.e., x-axis direction), where the square projection face 2302 has width w and height h (h=w), and the square projection face 2304 has width W and height H (W=H=h). Regarding an integer pixel position located at a coordinate of y-axis in the square rectangular projection face 2404, a corresponding sampling point located at a coordinate of y-axis in the square projection face 2402 can be determined from a non-uniform mapping function in the y-axis direction. Regarding an integer pixel position located at a coordinate of x-axis in the square rectangular projection face 2404, a corresponding sampling point located at a coordinate of x-axis in the square projection face 2402 can be determined from a non-uniform mapping function in the x-axis direction, where the non-uniform mapping function used in the x-axis direction may be identical to or different from the non-uniform mapping function used in the y-axis direction.

Figure 25:
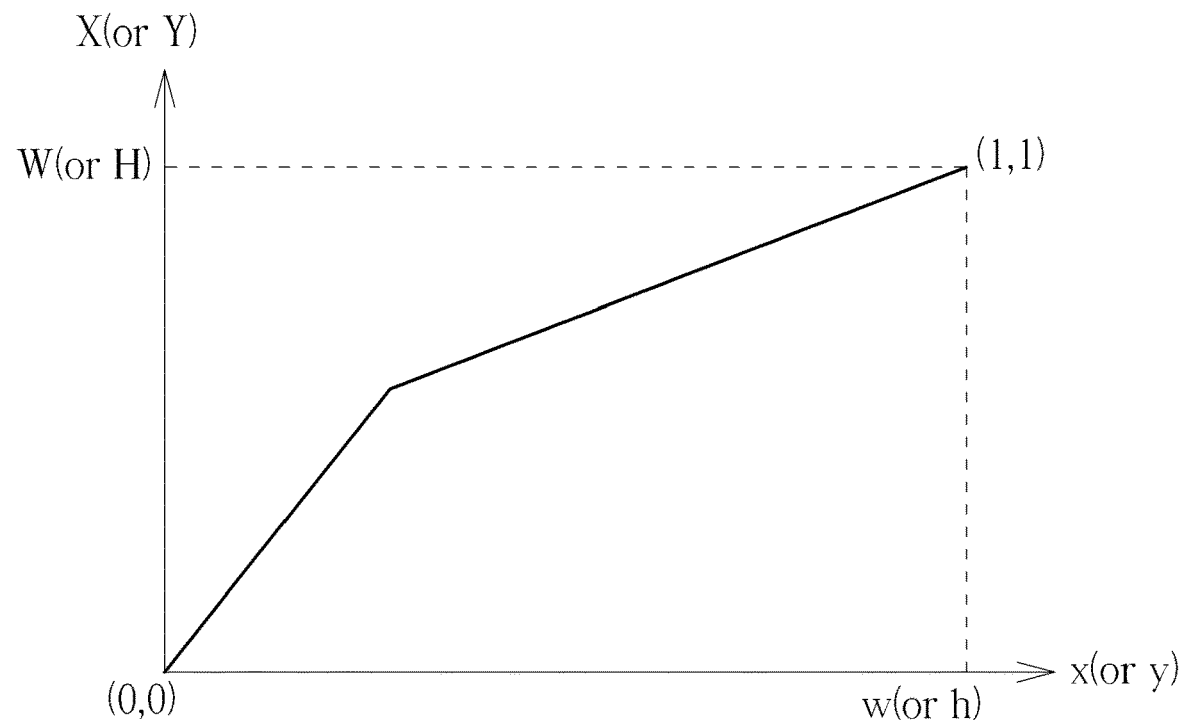
FIG. 25 is a diagram illustrating a curve of a first non-uniform mapping function according to an embodiment of the present invention.
Figure 26:
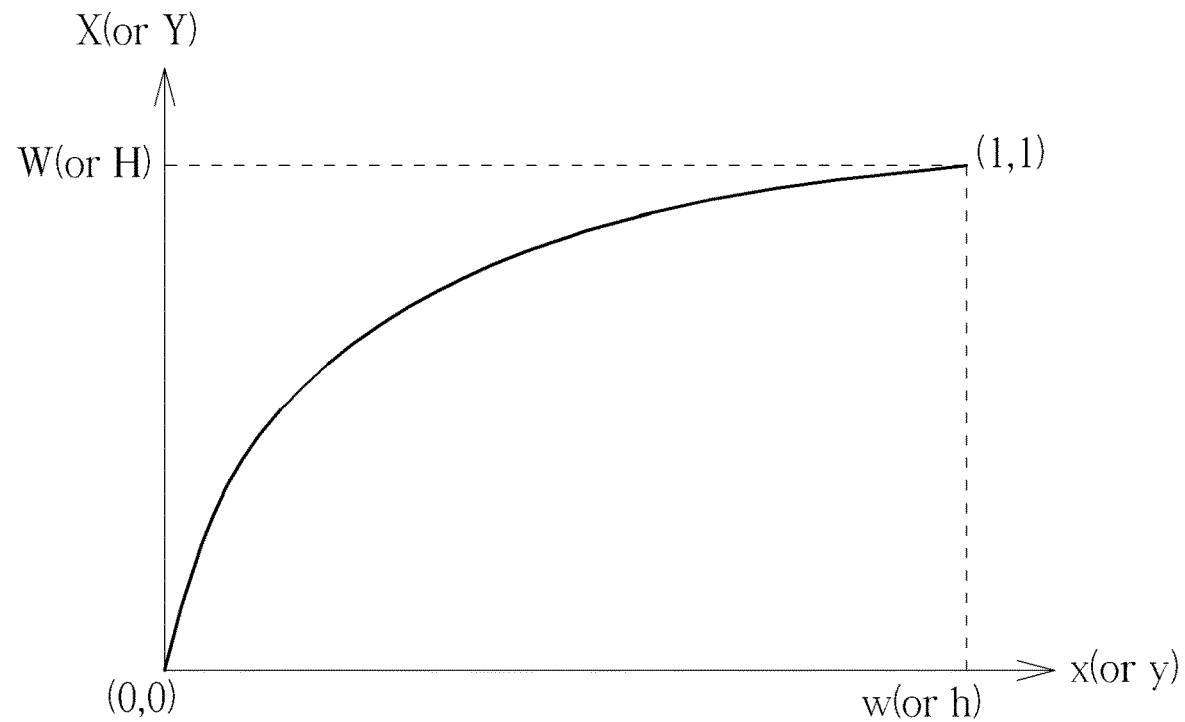
FIG. 26 is a diagram illustrating a curve of a second non-uniform mapping function according to an embodiment of the present invention.

In practice, a non-uniform mapping function can be implemented using any non-decreasing function passing through (0, 0) and (1, 1). That is, a curve of the non-decreasing non-uniform mapping function starts from (0, 0) and ends at (1, 1). For example, the non-uniform mapping function may be a piecewise-linear function, an exponential function, a quadratic equation function, or other function. FIG. 25 is a diagram illustrating a curve of a first non-uniform mapping function according to an embodiment of the present invention. FIG. 26 is a diagram illustrating a curve of a second non-uniform mapping function according to an embodiment of the present invention. The non-uniform mapping curves shown in FIGS. 25-26 are for illustrative purposes only, and are not meant to be limitations of the present invention.

Consider a case where the non-uniform mapping function is set by a quadratic equation function. The quadratic equation function may be defined as $f(p)=A*p^2+B*p$, where $A+B=1$, p represents a pixel position within a source square projection face in a selected direction (e.g., x-axis direction or y-axis direction), and f(p) represents a pixel position within a re-sampled square projection face in the selected direction. Based on experimental results, A may be set by −0.385 and B may be set by 1.385 to make the non-uniform mapping function have best Bjøntegaard-Delta rate (BD-rate).

Moreover, the non-uniform mapping functions applied to different square projection faces obtained by the cubemap projection are not necessarily the same. For example, the re-sampling circuit 1915 obtains a first re-sampled projection face by re-sampling at least a portion (i.e., part or all) of a first square projection face (e.g., one of the square projection faces "L", "F", "R", "BK", "T", and "B" shown in FIG. 20) through non-uniform mapping, and obtains a second re-sampled projection face by re-sampling at least a portion (i.e., part or all) of a second projection face (e.g., another of the square projection faces "L", "F", "R", "BK", "T", and "B" shown in FIG. 20) through non-uniform mapping, wherein the projection-based frame IMG has the first re-sampled projection face and the second re-sampled projection face packed in the 360 VR projection layout L_VR that is a CMP layout, and at least one non-uniform mapping function (e.g., a non-uniform mapping function in a width direction and/or a non-uniform mapping function in a height direction) used by re-sampling of the first projection face is different from at least one non-uniform mapping function (e.g., a non-uniform mapping function in a width direction and/or a non-uniform mapping function in a height direction) used by re-sampling of the second projection face.

Figure 27:
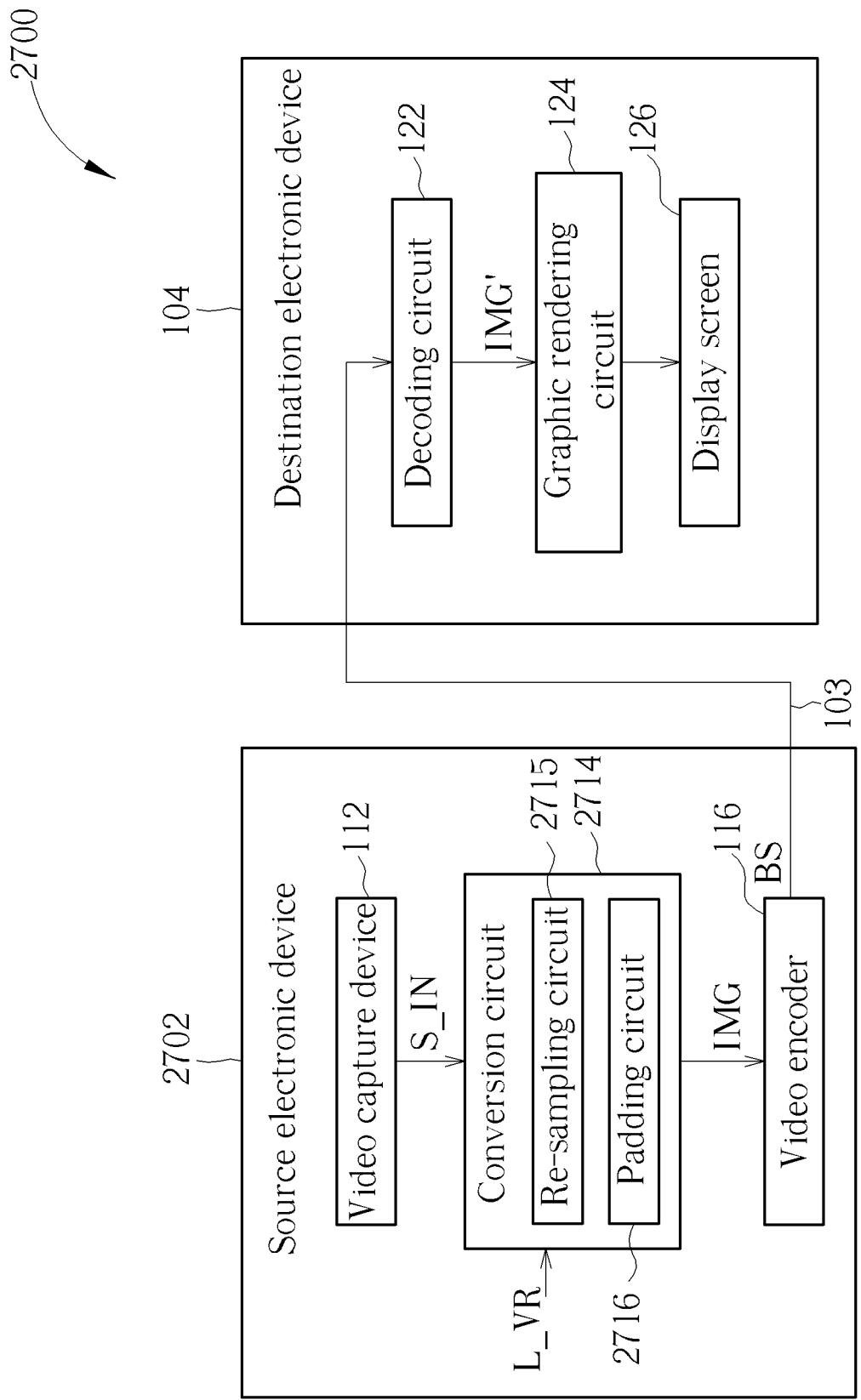
FIG. 27 is a diagram illustrating a third 360 VR system according to an embodiment of the present invention.

FIG. 27 is a diagram illustrating a third 360 VR system according to an embodiment of the present invention. The major difference between the 360 VR systems 1900 and 2700 is that a conversion circuit 2714 of a source electronic device 2702 has a re-sampling circuit 2715 and a padding circuit 2716. Like the re-sampling circuit 1915 shown in FIG. 19, the re-sampling circuit 2715 is arranged to perform a proposed encoder-side projection face re-sampling function to regulate the sampling density (or sampling rate). Like the padding circuit 115 shown in FIG. 1, the padding circuit 2716 is arranged to generate at least one padding region for artifact reduction. The conversion circuit 2714 creates the projection-based frame IMG by packing re-sampled projection faces and at least one padding region in a projection layout with padding. For example, the 360 VR projection layout L_VR is a CMP layout with padding.

Regarding the embodiment shown in FIG. 19, re-sampled square projection faces are packed in a CMP layout without padding such as a 1×6 cube layout, a 6×1 cube layout, a 3×2 cube layout, or a 2×3 cube layout. However, the projection-based frame IMG after coding may have artifacts due to discontinuous layout boundaries of the CMP layout and/or discontinuous edges of the CMP layout. For example, the CMP layout without padding has a top discontinuous boundary, a bottom discontinuous boundary, a left discontinuous boundary, and a right discontinuous boundary. In addition, there is at least one image content discontinuous edge between two adjacent re-sampled square projection faces packed in the CMP layout without padding. Around layout boundaries, discontinuous edges, and/or transition of sampling rate, additional guard bands generated by pixel padding can be inserted for reducing the seam artifacts.

Figure 28:
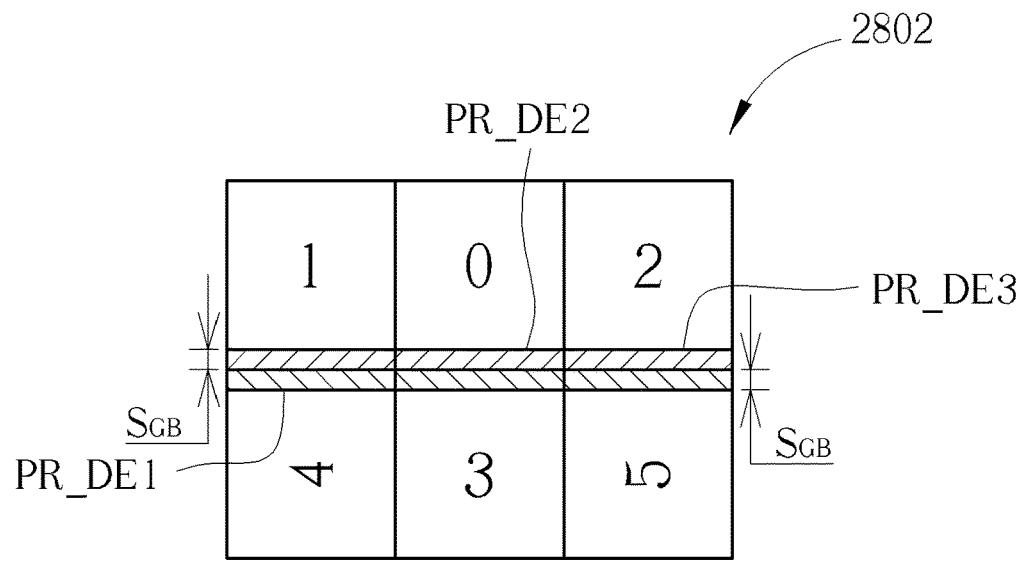
FIG. 28 is a diagram illustrating cubemap projection layouts with edge padding according to an embodiment of the present invention.
Figure 28:
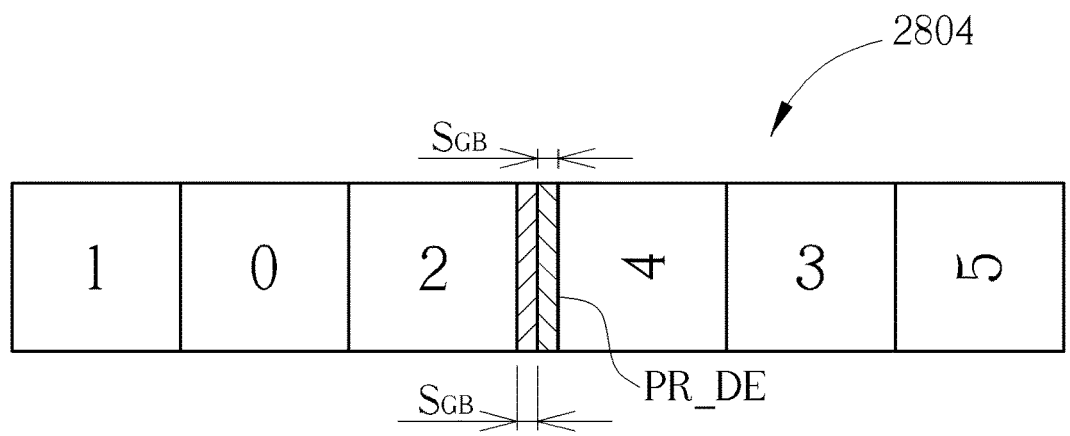

In a first exemplary guard band design, pixel padding can be only added at discontinuous edges. FIG. 28 is a diagram illustrating cubemap projection layouts with edge padding according to an embodiment of the present invention. The sub-diagram (A) of FIG. 28 illustrates a proposed 3×2 cube layout with edge padding 2802. The re-sampled square projection faces are labeled by "0", "1", "2", "3", "4", and "5". For example, the re-sampled square projection face "0" is generated by applying non-uniform mapping to the square projection face "F" shown in FIG. 20, the re-sampled square projection face "1" is generated by applying non-uniform mapping to the square projection face "L" shown in FIG. 20, the re-sampled square projection face "2" is generated by applying non-uniform mapping to the square projection face "R" shown in FIG. 20, the re-sampled square projection face "3" is generated by applying non-uniform mapping to the square projection face "BK" shown in FIG. 20, the re-sampled square projection face "4" is generated by applying non-uniform mapping to the square projection face "T" shown in FIG. 20, and the re-sampled square projection face "5" is generated by applying non-uniform mapping to the square projection face "B" shown in FIG. 20.

An image content discontinuity edge exists between the re-sampled square projection faces "1" and "4" if the bottom side of the re-sampled square projection face "1" connects with the top side of the re-sampled square projection face "4" in a typical 3×2 cube projection layout without padding. An image content discontinuity edge exists between the re-sampled square projection faces "0" and "3" if the bottom side of the re-sampled square projection face "0" connects with the top side of the re-sampled square projection face "3" in a typical 3×2 cube projection layout without padding. An image content discontinuity edge exists between the re-sampled square projection faces "2" and "5" if the bottom side of the re-sampled square projection face "2" connects with the top side of the re-sampled square projection face "5" in a typical 3×2 cube projection layout without padding. In accordance with the proposed 3×2 cube projection layout with padding 2802, a padding region PR_DE1 is inserted between the re-sampled square projection faces "1" and "4", a padding region PR_DE2 is inserted between the re-sampled square projection faces "0" and "3", and a padding region PR_DE3 is inserted between the re-sampled square projection faces "2" and "5".

The first padding region PR_DE1 includes a guard band of the re-sampled square projection face "1" and a guard band of the re-sampled square projection face "4", and therefore isolates the bottom side of the re-sampled square projection face "1" from the top side of the re-sampled square projection face "4" in the projection layout 2802. The second padding region PR_DE2 includes a guard band of the re-sampled square projection face "0" and a guard band of the re-sampled square projection face "3", and therefore isolates the bottom side of the re-sampled square projection face "0" from the top side of the re-sampled square projection face "3" in the projection layout 2802. The third padding region PR_DE3 includes a guard band of the re-sampled square projection face "2" and a guard band of the re-sampled square projection face "5", and therefore isolates the bottom side of the re-sampled square projection face "2" from the top side of the re-sampled square projection face "5" in the projection layout 2802. Each of the guard bands has a guard band size $S_{GB}$. Hence, the width of each padding region PR_DE1/PR_DE2/PR_DE3 is equal to $2*S_{GB}$. For example, the guard band size $S_{GB}$ may be 8 pixels in width. It should be noted that the guard band size $S_{GB}$ may be adjustable. Alternatively, the guard band size $S_{GB}$ may be 4 pixels in width, 16 pixels in width, or any number of pixels in width.

The sub-diagram (B) of FIG. 28 illustrates a proposed 6×1 cube layout with edge padding 2804. An image content discontinuity edge exists between the re-sampled square projection faces "2" and "4" if the right side of the re-sampled square projection face "2" connects with the left side of the re-sampled square projection face "4" in a typical 6×1 cube projection layout without padding. In accordance with the proposed 6×1 cube projection layout with padding 2804, a padding region PR_DE is inserted between the re-sampled square projection faces "2" and "4". The padding region PR_DE includes a guard band of the re-sampled square projection face "2" and a guard band of the re-sampled square projection face "4", and therefore isolates the right side of the re-sampled square projection face "2" from the left side of the re-sampled square projection face "4" in the projection layout 2804. Each of the guard bands has a guard band size $S_{GB}$. Hence, the width of the padding region PR_DE is equal to $2*S_{GB}$. For example, the guard band size $S_{GB}$ may be 8 pixels in width. It should be noted that the guard band size $S_{GB}$ may be adjustable. Alternatively, the guard band size $S_{GB}$ may be 4 pixels in width, 16 pixels in width, or any number of pixels in width.

Figure 29:
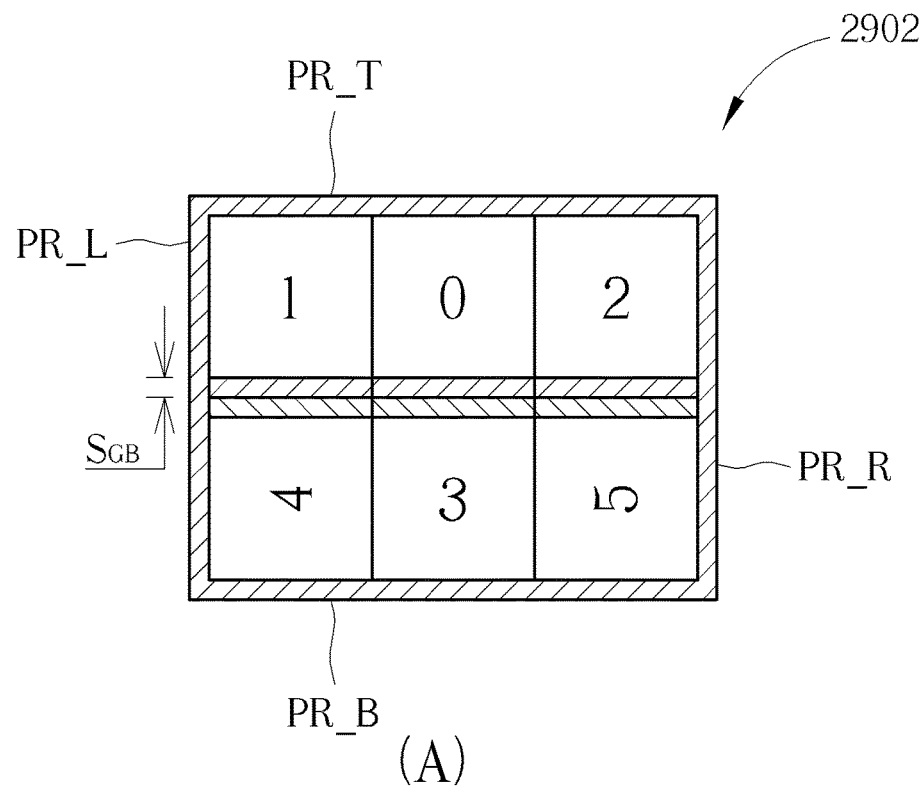
FIG. 29 is a diagram illustrating cubemap projection layouts with boundary padding and edge padding according to an embodiment of the present invention.
Figure 29:
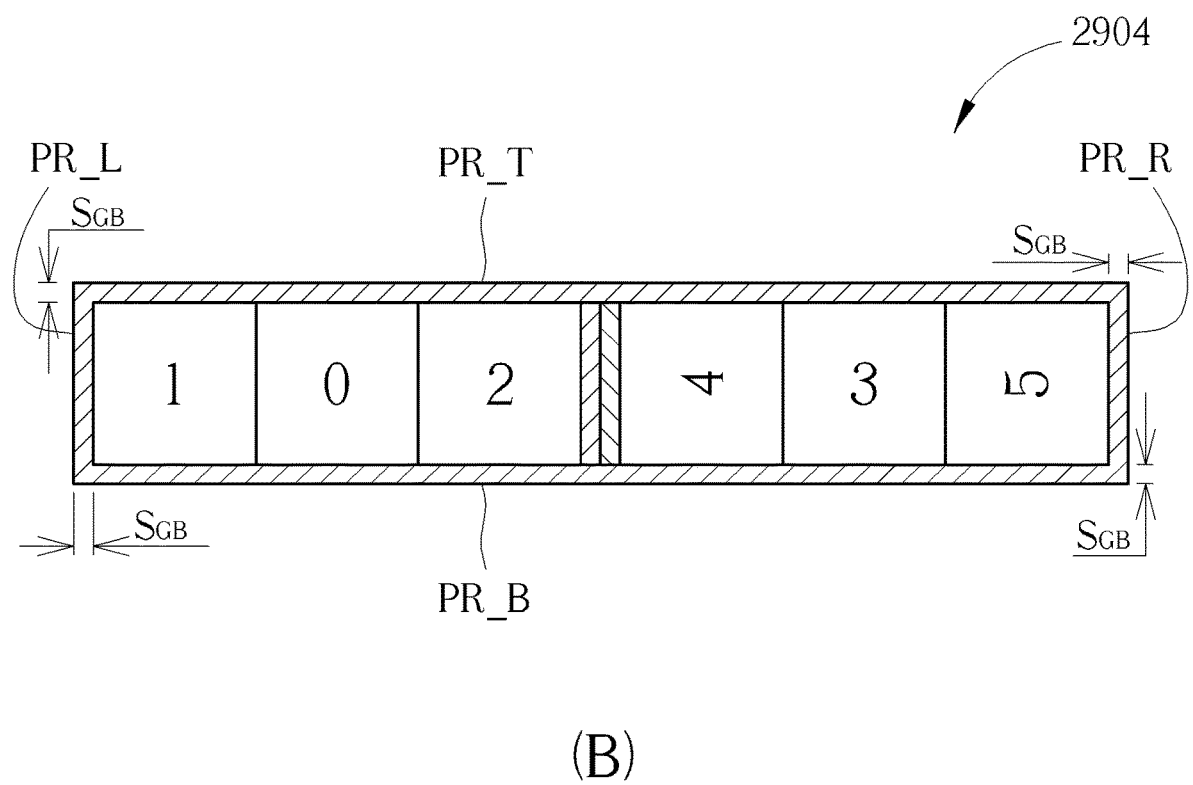

In a second exemplary guard band design, padding can be added at layout boundaries and discontinuous edges. FIG. 29 is a diagram illustrating cubemap projection layouts with boundary padding and edge padding according to an embodiment of the present invention. The sub-diagram (A) of FIG. 29 illustrates a proposed 3×2 cube layout with boundary padding and edge padding 2902. If the re-sampled square projection faces "0", "1", "2", "3", "4", and "5" are packed in a typical 3×2 cube projection layout without padding, top sides of the re-sampled square projection faces "1", "0", and "2" form a top discontinuous boundary, bottom sides of the re-sampled square projection faces "4", "3", and "5" form a bottom discontinuous boundary, left sides of the re-sampled square projection faces "1" and "4 form a left discontinuous boundary, and right sides of the re-sampled square projection faces "2" and "5" form a right discontinuous boundary. The proposed 3×2 cube layout with boundary padding and edge padding 2902 can be derived from adding boundary padding to the proposed 3×2 cube layout with edge padding 2802. Hence, in addition to the padding regions PR_DE1, PR_DE2, PR_DE3 at discontinuous edges, the proposed 3×2 cube layout with boundary padding and edge padding 2902 further has a top padding region PR_T that connects with top sides of the re-sampled square projection faces "1", "0", and "2", a bottom padding region PR_B that connects with bottom sides of the re-sampled square projection faces "4", "3", and "5", a left padding region PR_L that connects with left sides of the re-sampled square projection faces "1" and "4, and a right padding region PR_R that connects with right sides of the re-sampled square projection faces "2" and "5".

The top padding region PR_T includes a guard band of the re-sampled square projection face "1", a guard band of the re-sampled square projection face "0", and a guard band of the re-sampled square projection face "2". The bottom padding region PR_B includes a guard band of the re-sampled square projection face "4", a guard band of the re-sampled square projection face "3", and a guard band of the re-sampled square projection face "5". The left padding region PR_L includes a guard band of the re-sampled square projection face "1" and a guard band of the re-sampled square projection face "4. The right padding region PR_R includes a guard band of the re-sampled square projection face "2" and a guard band of the re-sampled square projection face "5". Each of the guard bands has a guard band size $S_{GB}$. Hence, the width of each boundary padding region PR_T/PR_B/PR_L/PR_R is equal to $S_{GB}$. For example, the guard band size $S_{GB}$ may be 8 pixels in width. It should be noted that the guard band size $S_{GB}$ may be adjustable. Alternatively, the guard band size $S_{GB}$ may be 4 pixels in width, 16 pixels in width, or any number of pixels in width.

The sub-diagram (B) of FIG. 29 illustrates a proposed 6×1 cube layout with boundary padding and edge padding 2904. If the re-sampled square projection faces "0", "1", "2", "3", "4", and "5" are packed in a typical 6×1 cube projection layout without padding, top sides of the re-sampled square projection faces "1", "0", "2", "4", "3", and "5" form a top discontinuous boundary, bottom sides of the re-sampled square projection faces "1", "0", "2", "4", "3", and "5" form a bottom discontinuous boundary, a left side of the re-sampled square projection face "1" forms a left discontinuous boundary, and a right side of the re-sampled square projection face "5" forms a right discontinuous boundary. The proposed 6×1 cube layout with boundary padding and edge padding 2904 can be derived from adding boundary padding to the proposed 6×1 cube layout with edge padding 2804. Hence, in addition to the padding region PR_DE at the discontinuous edge, the proposed 6×1 cube layout with boundary padding and edge padding 2904 further has a top padding region PR_T that connects with top sides of the re-sampled square projection faces "1", "0", "2", "4", "3", and "5", a bottom padding region PR_B that connects with bottom sides of the re-sampled square projection faces "1", "0", "2", "4", "3", and "5", a left padding region PR_L that connects with the left side of the re-sampled square projection face "1", and a right padding region PR_R that connects with the right side of the re-sampled square projection face "5".

The top padding region PR_T includes a guard band of the re-sampled square projection face "1", a guard band of the re-sampled square projection face "0", a guard band of the re-sampled square projection face "2", a guard band of the re-sampled square projection face "4", a guard band of the re-sampled square projection face "3", and a guard band of the re-sampled square projection face "5". The bottom padding region PR_B includes a guard band of the re-sampled square projection face "1", a guard band of the re-sampled square projection face "0", a guard band of the re-sampled square projection face "2", a guard band of the re-sampled square projection face "4", a guard band of the re-sampled square projection face "3", and a guard band of the re-sampled square projection face "5". The left padding region PR_L includes a guard band of the re-sampled square projection face "1". The right padding region PR_R includes a guard band of the re-sampled square projection face "5". Each of the guard bands has a guard band size $S_{GB}$. Hence, the width of each boundary padding region PR_T/PR_B/PR_L/PR_R is equal to $S_{GB}$. For example, the guard band size $S_{GB}$ may be 8 pixels in width. It should be noted that the guard band size $S_{GB}$ may be adjustable. Alternatively, the guard band size $S_{GB}$ may be 4 pixels in width, 16 pixels in width, or any number of pixels in width.

Figure 30:
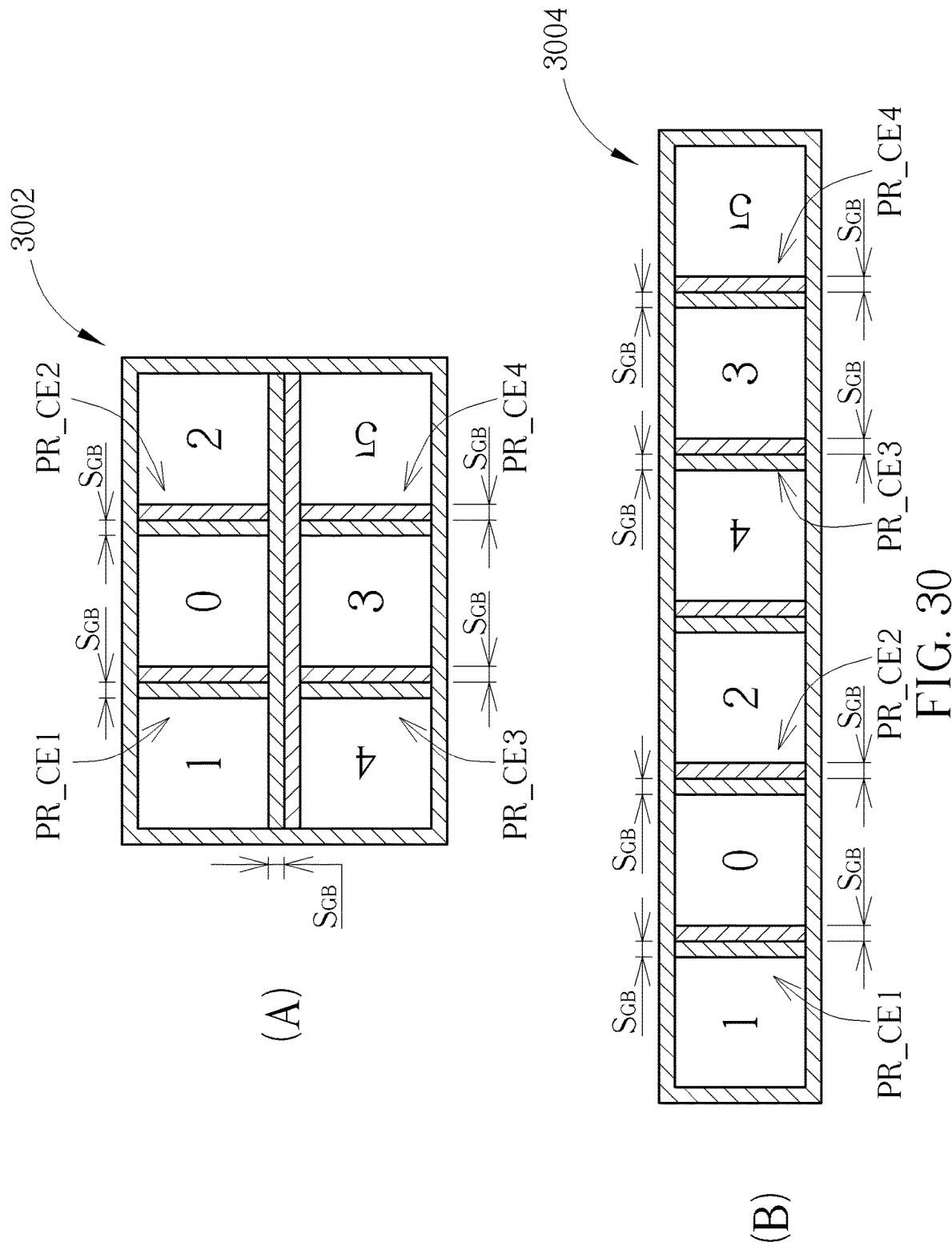
FIG. 30 is a diagram illustrating other cubemap projection layouts with boundary padding and edge padding according to an embodiment of the present invention.

In a third exemplary guard band design, padding can be added at layout boundaries, discontinuous edges, and continuous edges. FIG. 30 is a diagram illustrating other cube-map projection layouts with boundary padding and edge padding according to an embodiment of the present invention. The sub-diagram (A) of FIG. 30 illustrates another proposed 3×2 cube layout with boundary padding and edge padding 3002. An image content continuity edge exists between the re-sampled square projection faces "1" and "0" if the right side of the re-sampled square projection face "1" connects with the left side of the re-sampled square projection face "0" in a typical 3×2 cube projection layout without padding. An image content continuity edge exists between the re-sampled square projection faces "0" and "2" if the right side of the re-sampled square projection face "0" connects with the left side of the re-sampled square projection face "2" in a typical 3×2 cube projection layout without padding. An image content continuity edge exists between the re-sampled square projection faces "4" and "3" if the right side of the re-sampled square projection face "4" connects with the left side of the re-sampled square projection face "3" in a typical 3×2 cube projection layout without padding. An image content continuity edge exists between the re-sampled square projection faces "3" and "5" if the right side of the re-sampled square projection face "3" connects with the left side of the re-sampled square projection face "5" in a typical 3×2 cube projection layout without padding. The proposed 3×2 cube layout with boundary padding and edge padding 3002 can be derived from adding more padding to the proposed 3×2 cube layout with boundary padding and edge padding 2902. Hence, in addition to the padding regions PR_DE1, PR_DE2, PR_DE3 at discontinuous edges and padding regions PR_T, PR_B, PR_L, PR_R at discontinuous boundaries, the proposed 3×2 cube layout with boundary padding and edge padding 3002 further has a padding region PR_CE1 that connects with the right side of the re-sampled square projection face "1" and the left side of the re-sampled square projection face "0", a padding region PR_CE2 that connects with the right side of the re-sampled square projection face "0" and the left side of the re-sampled square projection face "2", a padding region PR_CE3 that connects with the right side of the re-sampled square projection face "4" and the left side of the re-sampled square projection face "3", and a padding region PR_CE4 that connects with the right side of the re-sampled square projection face "3" and the left side of the re-sampled square projection face "5".

The padding region PR_CE1 includes a guard band of the re-sampled square projection face "1" and a guard band of the re-sampled square projection face "0", and therefore isolates the right side of the re-sampled square projection face "1" from the left side of the re-sampled square projection face "0" in the projection layout 3002. The padding region PR_CE2 includes a guard band of the re-sampled square projection face "0" and a guard band of the re-sampled square projection face "2", and therefore isolates the right side of the re-sampled square projection face "0" from the left side of the re-sampled square projection face "2" in the projection layout 3002. The padding region PR_CE3 includes a guard band of the re-sampled square projection face "4" and a guard band of the re-sampled square projection face "3", and therefore isolates the right side of the re-sampled square projection face "4" from the left side of the re-sampled square projection face "3" in the projection layout 3002. The padding region PR_CE4 includes a guard band of the re-sampled square projection face "3" and a guard band of the re-sampled square projection face "5", and therefore isolates the right side of the re-sampled square projection face "3" from the left side of the re-sampled square projection face "5" in the projection layout 3002. Each of the guard bands has a guard band size $S_{GB}$. Hence, the width of each padding region PR_CE1/PR_CE2/PR_CE3/PR_CE4 is equal to 2*$S_{GB}$. For example, the guard band size $S_{GB}$ may be 8 pixels in width. It should be noted that the guard band size $S_{GB}$ may be adjustable. Alternatively, the guard band size $S_{GB}$ may be 4 pixels in width, 16 pixels in width, or any number of pixels in width.

The sub-diagram (B) of FIG. 30 illustrates another proposed 6×1 cube layout with boundary padding and edge padding 3004. An image content continuity edge exists between the re-sampled square projection faces "1" and "0" if the right side of the re-sampled square projection face "1" connects with the left side of the re-sampled square projection face "0" in a typical 6×1 cube projection layout without padding. An image content continuity edge exists between the re-sampled square projection faces "0" and "2" if the right side of the re-sampled square projection face "0" connects with the left side of the re-sampled square projection face "2" in a typical 6×1 cube projection layout without padding. An image content continuity edge exists between the re-sampled square projection faces "4" and "3" if the right side of the re-sampled square projection face "4" connects with the left side of the re-sampled square projection face "3" in a typical 6×1 cube projection layout without padding. An image content continuity edge exists between the re-sampled square projection faces "3" and "5" if the right side of the re-sampled square projection face "3" connects with the left side of the re-sampled square projection face "5" in a typical 6×1 cube projection layout without padding.

The proposed 6×1 cube layout with boundary padding and edge padding 3004 can be derived from adding more padding to the proposed 6×1 cube layout with boundary padding and edge padding 2904. Hence, in addition to the padding region PR_DE at the discontinuous edge and padding regions PR_T, PR_B, PR_L, PR_R at the discontinuous boundaries, the proposed 6×1 cube layout with boundary padding and edge padding 3004 further has a padding region PR_CE1 that connects with the right side of the re-sampled square projection face "1" and the left side of the re-sampled square projection face "0", a padding region PR_CE2 that connects with the right side of the re-sampled square projection face "0" and the left side of the re-sampled square projection face "2", a padding region PR_CE3 that connects with the right side of the re-sampled square projection face "4" and the left side of the re-sampled square projection face "3", and a padding region PR_CE4 that connects with the right side of the re-sampled square projection face "3" and the left side of the re-sampled square projection face "5".

The padding region PR_CE1 includes a guard band of the re-sampled square projection face "1" and a guard band of the re-sampled square projection face "0", and therefore isolates the right side of the re-sampled square projection face "1" from the left side of the re-sampled square projection face "0" in the projection layout 3004. The padding region PR_CE2 includes a guard band of the re-sampled square projection face "0" and a guard band of the re-sampled square projection face "2", and therefore isolates the right side of the re-sampled square projection face "0" from the left side of the re-sampled square projection face "2" in the projection layout 3004. The padding region PR_CE3 includes a guard band of the re-sampled square projection face "4" and a guard band of the re-sampled square projection face "3", and therefore isolates the right side of the re-sampled square projection face "4" from the left side of the re-sampled square projection face "3" in the projection layout 3004. The padding region PR_CE4 includes a guard band of the re-sampled square projection face "3" and a guard band of the re-sampled square projection face "5", and therefore isolates the right side of the re-sampled square projection face "3" from the left side of the re-sampled square projection face "5" in the projection layout 3004. Each of the guard bands has a guard band size $S_{GB}$. Hence, the width of each padding region PR_CE1/PR_CE2/PR_CE3/PR_CE4 is equal to $2*S_{GB}$. For example, the guard band size $S_{GB}$ may be 8 pixels in width. It should be noted that the guard band size $S_{GB}$ may be adjustable. Alternatively, the guard band size $S_{GB}$ may be 4 pixels in width, 16 pixels in width, or any number of pixels in width.

In a first exemplary padding design, the padding circuit 2716 applies geometry padding to a projection face to determine pixel values of pixels included in a padding region (e.g., one of PR_DE, PR_DE1-PR_DE3, PR_T, PR_B, PR_L, PR_R, and PR_CE1-PR_CE4) that connects with the projection face. Taking the padding region PR_T shown in sub-diagram (A) of FIG. 29 for example, it includes a left geometry mapping region, a middle geometry mapping region, and a right geometry mapping region, where the left geometry mapping region acts as a guard band of the re-sampled square projection face "1", the middle geometry mapping region acts as the guard band of the re-sampled square projection face "0", and the right geometry mapping region acts as the guard band of the re-sampled square projection face "2". The content of a region on a sphere (e.g., sphere 2002 shown in FIG. 20) is mapped onto the left geometry mapping region of the padding region PR_T, where the region on the sphere is adjacent to a region from which the square projection face "L" is obtained, and the re-sampled square projection face "1" is obtained from applying non-uniform mapping to the square projection face "L". The content of a region on a sphere (e.g., sphere 2002 shown in FIG. 20) is mapped onto the middle geometry mapping region of the padding region PR_T, where the region on the sphere is adjacent to a region from which the square projection face "F" is obtained, and the re-sampled square projection face "0" is obtained from applying non-uniform mapping to the square projection face "F". The content of a region on a sphere (e.g., sphere 2002 shown in FIG. 20) is mapped onto the right geometry mapping region of the padding region PR_T, where the region on the sphere is adjacent to a region from which the square projection face "R" is obtained, and the re-sampled square projection face "2" is obtained from applying non-uniform mapping to the square projection face "R". Hence, there is image content continuity between the re-sampled square projection face "1" and the left geometry mapping region of the padding region PR_T, there is image content continuity between the re-sampled square projection face "0" and the middle geometry mapping region of the padding region PR_T, and there is image content continuity between the re-sampled square projection face "2" and the right geometry mapping region of the padding region PR_T. That is, content is continuously represented in the re-sampled projection face "1" and the left geometry mapping region of the padding region PR_T, content is continuously represented in the re-sampled square projection face "0" and the middle geometry mapping region of the padding region PR_T, and content is continuously represented in the re-sampled square projection face "2" and the right geometry mapping region of the padding region PR_T.

In a second exemplary padding design, the padding circuit 2716 sets pixel values of pixels included in a padding region (e.g., one of PR_DE, PR_DE1-PR_DE3, PR_T, PR_B, PR_L, PR_R, and PR_CE1-PR_CE4) by duplicating pixel values of pixels included in a projection face that connects with the padding region. For example, edge pixels of a projection face are replicated to create padding pixels of a padding region that connects with the projection face. Taking the padding region PR_T shown in sub-diagram (A) of FIG. 29 for example, it includes a left duplication region, a middle duplication region, and a right duplication region, where the left duplication region acts as a guard band of the re-sampled square projection face "1", the middle duplication region acts as the guard band of the re-sampled square projection face "0", and the right duplication region acts as the guard band of the re-sampled square projection face "2". Since the left duplication region connects with the top side of the re-sampled square projection face "1", edge pixels located at the top side of the re-sampled square projection face "1" are directly duplicated to set pixel values of pixels in the left duplication region of the padding region PR_T. Since the middle duplication region connects with the top side of the re-sampled square projection face "0", edge pixels located at the top side of the re-sampled square projection face "0" are directly duplicated to set pixel values of pixels in the middle duplication region of the padding region PR_T. Since the middle duplication region connects with the top side of the re-sampled square projection face "2", edge pixels located at the top side of the re-sampled square projection face "2" are directly duplicated to set pixel values of pixels in the right duplication region of the padding region PR_T.

Figure 31:
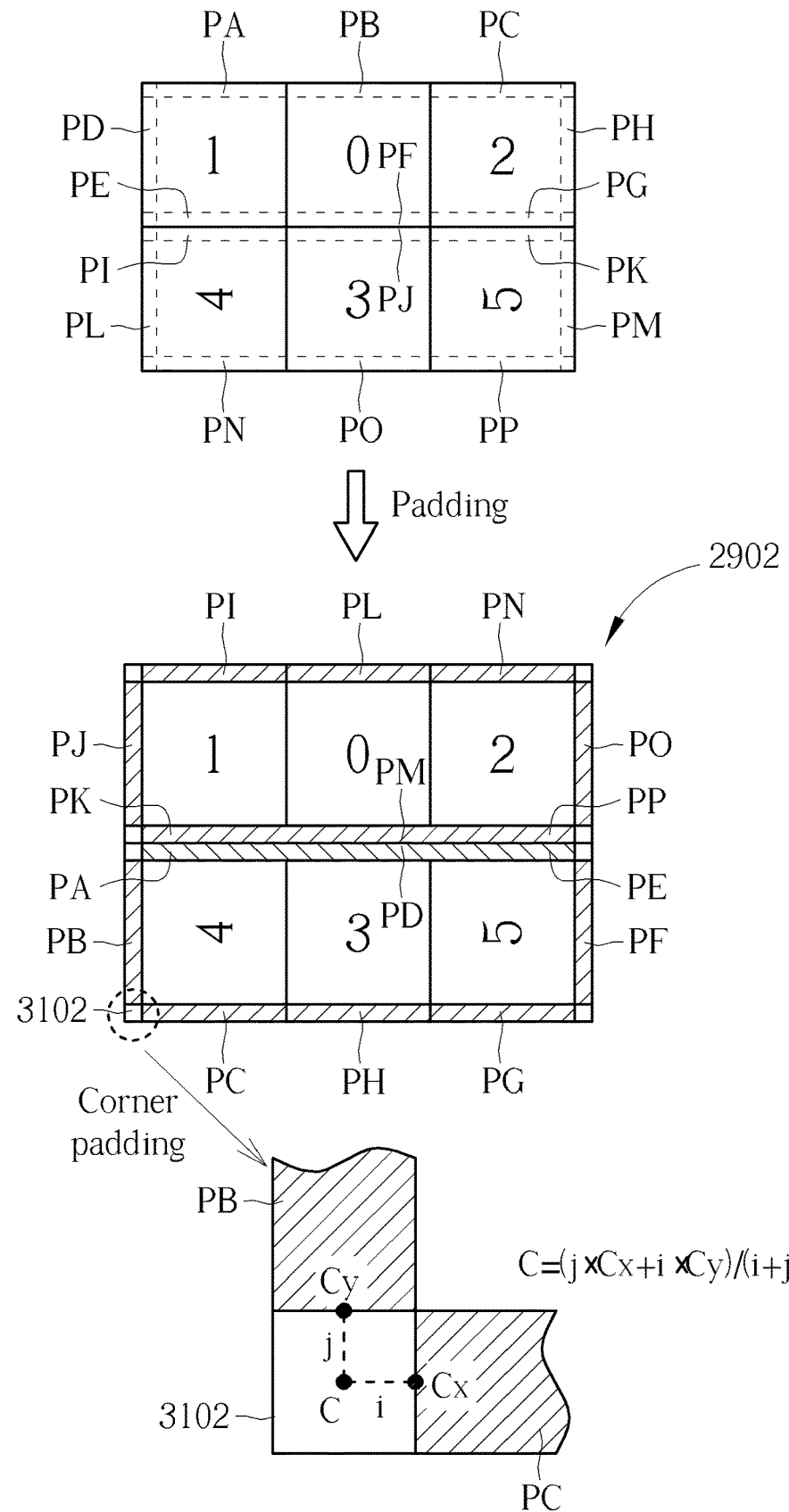
FIG. 31 is a diagram illustrating a padding design which generates a padding region of one projection face by copying a partial region in another projection face according to an embodiment of the present invention.

In a third exemplary padding design, the padding circuit 2716 sets pixel values of pixels included in a padding region (e.g., one of PR_DE, PR_DE1-PR_DE3, PR_T, PR_B, PR_L, PR_R, and PR_CE1-PR_CE4) of a first projection face by duplicating pixel values of pixels included in a second projection face that does not connect with the padding region. For example, the first projection face and the second projection face correspond to neighboring faces of a cube in a 3D space (e.g., neighboring faces of the cube 2004 shown in FIG. 20). FIG. 31 is a diagram illustrating a padding design which generates a padding region of one projection face by copying a partial region in another projection face according to an embodiment of the present invention. In this example, the re-sampled square projection face "0" is generated by applying non-uniform mapping to the square projection face "F" shown in FIG. 20, the re-sampled square projection face "1" is generated by applying non-uniform mapping to the square projection face "L" shown in FIG. 20, the re-sampled square projection face "2" is generated by applying non-uniform mapping to the square projection face "R" shown in FIG. 20, the re-sampled square projection face "3" is generated by applying non-uniform mapping to the square projection face "BK" shown in FIG. 20, the re-sampled square projection face "4" is generated by applying non-uniform mapping to the square projection face "T" shown in FIG. 20, and the re-sampled square projection face "5" is generated by applying non-uniform mapping to the square projection face "B" shown in FIG. 20. Further, the proposed 3×2 cube layout with boundary padding and edge padding 2902 as shown in the sub-diagram (A) of FIG. 29 is employed.

Based on image content continuity characteristics, the padding region PR_DE1 inserted between the re-sampled square projection faces "1" and "4" includes a duplicate of a partial region PK in the re-sampled square projection face "5" and a duplicate of a partial region PA in the re-sampled square projection face "1", the padding region PR_DE2 inserted between the re-sampled square projection faces "0" and "3" includes a duplicate of a partial region PM in the re-sampled square projection face "5" and a duplicate of a partial region PD in the re-sampled square projection face "1", the padding region PR_DE3 inserted between the re-sampled square projection faces "2" and "5" includes a duplicate of a partial region PP in the re-sampled square projection face "5" and a duplicate of a partial region PE in the re-sampled square projection face "1".

Further, based on image content continuity characteristics, the top padding region PR_T that connects with the re-sampled square projection faces "1", "0", and "2" includes a duplicate of a partial region PI in the re-sampled square projection face "4", a duplicate of a partial region PL in the re-sampled square projection face "4", and a duplicate of a partial region PN in the re-sampled square projection face "4"; the bottom padding region PR_B that connects with the re-sampled square projection faces "4", "3", and "5" includes a duplicate of a partial region PC in the re-sampled square projection face "2", a duplicate of a partial region PH in the re-sampled square projection face "2", and a duplicate of a partial region PG in the re-sampled square projection face "2"; the left padding region PR_L that connects with the re-sampled square projection faces "1" and "4" includes a duplicate of a partial region PJ in the re-sampled square projection face "3" and a duplicate of a partial region PB in the re-sampled square projection face "0"; and the right padding region PR_R that connects with the re-sampled square projection faces "2" and "5" includes a duplicate of a partial region PO in the re-sampled square projection face "3" and a duplicate of a partial region PF in the re-sampled square projection face "0".

Moreover, corner padding is performed to set corner padding regions around face corners of certain re-sampled projection faces "1", "2", "4", and "5". Specifically, a pixel value of each padding pixel in a corner padding region is derived from interpolation performed upon edge pixels of adjacent padding regions. Taking a corner padding region 3102 for example, a pixel value of a padding pixel C is set by interpolation performed upon an edge pixel $C_y$ of the duplicated partial region PB and an edge pixel $C_x$ of the duplicated partial region PC, where the padding pixel C and the edge pixel $C_y$ have the same y-axis coordinate, and the padding pixel C and the edge pixel $C_x$ have the same x-axis coordinate. The horizontal distance between the padding pixel C and the edge pixel $C_x$ is represented by i. The vertical distance between the padding pixel C and the edge pixel $C_y$ is represented by j. The interpolation may be expressed using the following formula.

$$C = \frac{j*C_x + i*C_y}{i+j} \quad (3)$$

Regarding the embodiment shown in FIG. 27, the conversion circuit 2714 has the re-sampling circuit 2715 and the padding circuit 2716, such that re-sampled square projection face(s) generated from the re-sampling circuit 2715 and padding region(s) generated from the padding circuit 2716 are packed in the projection-based frame IMG according to the 360 VR projection layout L_VR that is set by a proposed CMP layout with padding. However, this is for illustrative purposes only, and is not meant to be a limitation of the present invention. For example, the proposed CMP layout with padding may be used by the conversion circuit 114 shown in FIG. 1. Hence, the padding regions shown in FIGS. 28-31 may be generated by the padding circuit 115, and the projection faces "0", "1", "2", "3", "4", "5" shown in FIGS. 28-31 may be the square projection faces "L", "F", "BK", "T", "B" shown in FIG. 20. The square projection faces "L", "F", "R", "BK", "T", "B" directly obtained by the cubemap projection without re-sampling and the padding regions generated from the padding circuit 114 are packed in the projection-based frame IMG according to the 360 VR projection layout L_VR that is set by a proposed CMP layout with padding.

The guard band may be set according to one guard band design selected from the first exemplary guard band design, the second exemplary guard band design, and the third exemplary guard band design as mentioned above. In addition, the guard band size $S_{GB}$ may be 4 pixels in width, 8 pixels in width, 16 pixels in width, or any number of pixels in width. The guard band information may be signaled in the bitstream BS for further use in reconstruction/rendering at the decoder side. In accordance with a proposed syntax signaling method, the following syntax table may be employed.

| Guard_band (payloadSize) { | Descriptor |
|---|---|
| ... | |
| ... | |
| guard_band_width | u (8) |
| guard_band_type | u (3) |
| ... | |
| ... | |
| } | |

It should be noted that the descriptors in the above exemplary syntax table specify the parsing process of each syntax element. For example, the descriptor u(n) describes an unsigned integer using n bits.

The syntax element guard band width specifies the width of the guard band on the top/left/right/bottom size of each projection face in units of luma samples. When the decoded picture has 4:2:0 or 4:2:2 chroma format, guard band width should be an even number.

The syntax element guard_band_type specifies the pixel padding method on the guard band. When the guard band around the projection face is unspecified, the syntax element guard_band_type may be set by 0 (i.e., guard_band_type==0). When the pixels in the guard band are derived from replicating edge pixels of a projection face, the syntax element guard_band_type may be set by 1 (i.e., guard_band_type==1). When the pixels in the guard band of a projection face are copied from a neighboring face in a 3D space, the syntax element guard_band_type may be set by 2 (i.e., guard_band_type==2). When the pixels in the guard band of a projection face are derived from applying geometry padding to the projection face, the syntax element guard_band_type may be set by 3 (i.e., guard_band_type==3).

As mentioned above, the decoding circuit 122 of the destination electronic device 104 receives the bitstream BS from the transmission means 103 (e.g., a wired/wireless communication link or a storage medium), and performs a video decoder function for decoding a part of the received bitstream BS to generate the decoded frame IMG' that is a decoded projection-based frame having the same 360 VR projection layout L_VR employed by the conversion circuit 114/2714 of the source electronic device 102/2702. In a case where the 360 VR projection layout L_VR is set by a projection layout with padding (e.g., a projection layout with boundary padding, a projection layout with edge padding, or a projection layout with boundary padding and edge padding), the decoded frame IMG' has padding regions located at layout boundaries and/or face edges of a projection layout. In one embodiment, the decoding circuit 122 may crop the padding regions, such that only the non-padding regions (e.g., omnidirectional image/video content represented in projection faces originally obtained from 360 VR projection, or omnidirectional image/video content represented in re-sampled projection faces derived from re-sampling projection faces originally obtained from 360 VR projection) are reconstructed. In an alternative design, the decoding circuit 122 may be modified to perform blending that is based on padding pixels in a padding region and pixels in a non-padding region. For example, a pixel value of a pixel in a projection face may be updated by blending an original pixel value of the pixel in the projection face with a pixel value of a corresponding padding pixel in a padding region. For another example, a pixel value of a padding pixel in a padding region may be updated by blending an original pixel value of the padding pixel in the padding region and a pixel value of a corresponding pixel in a projection face.

Figure 32:
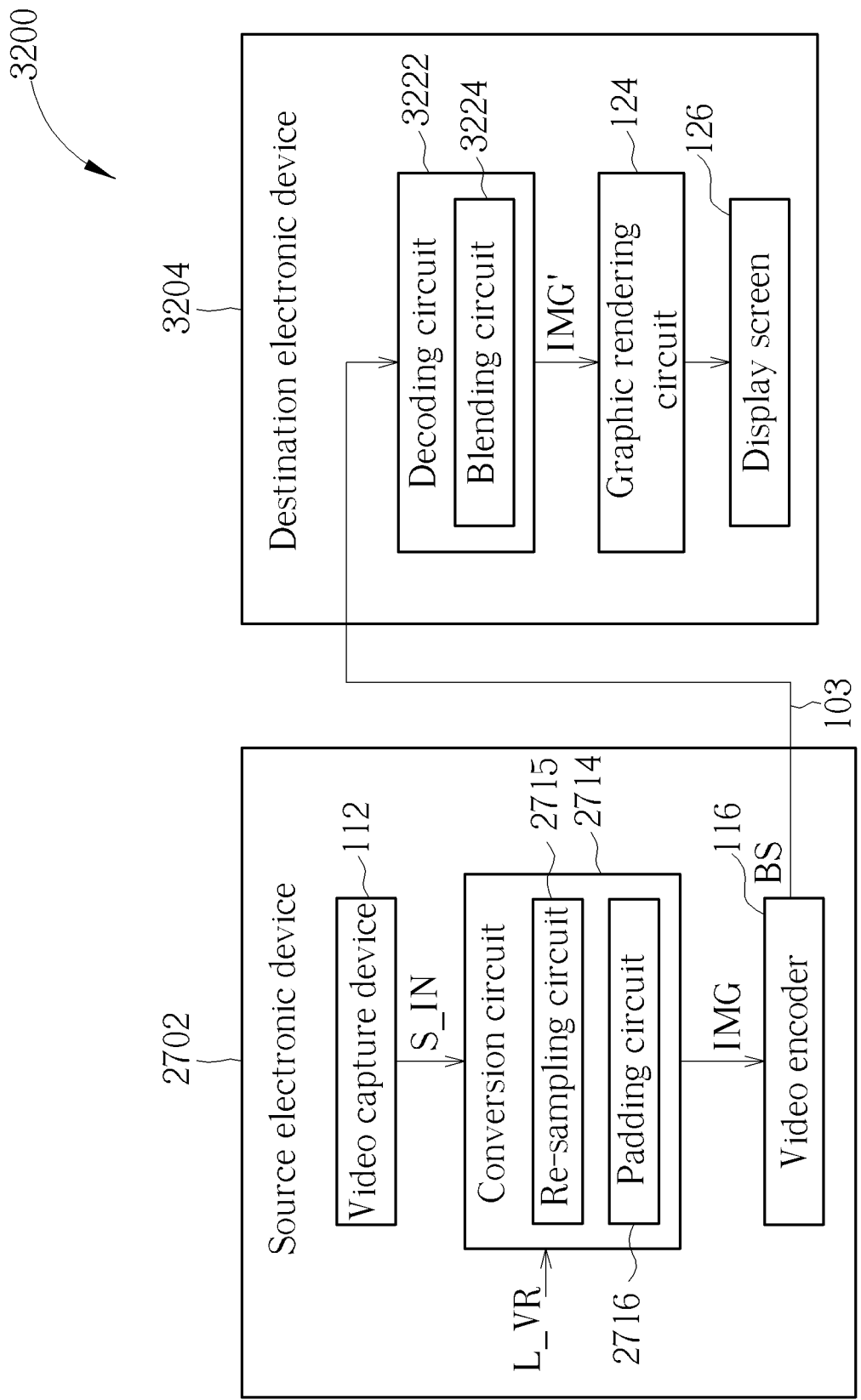
FIG. 32 is a diagram illustrating a fourth 360 VR system according to an embodiment of the present invention.
Figure 33:
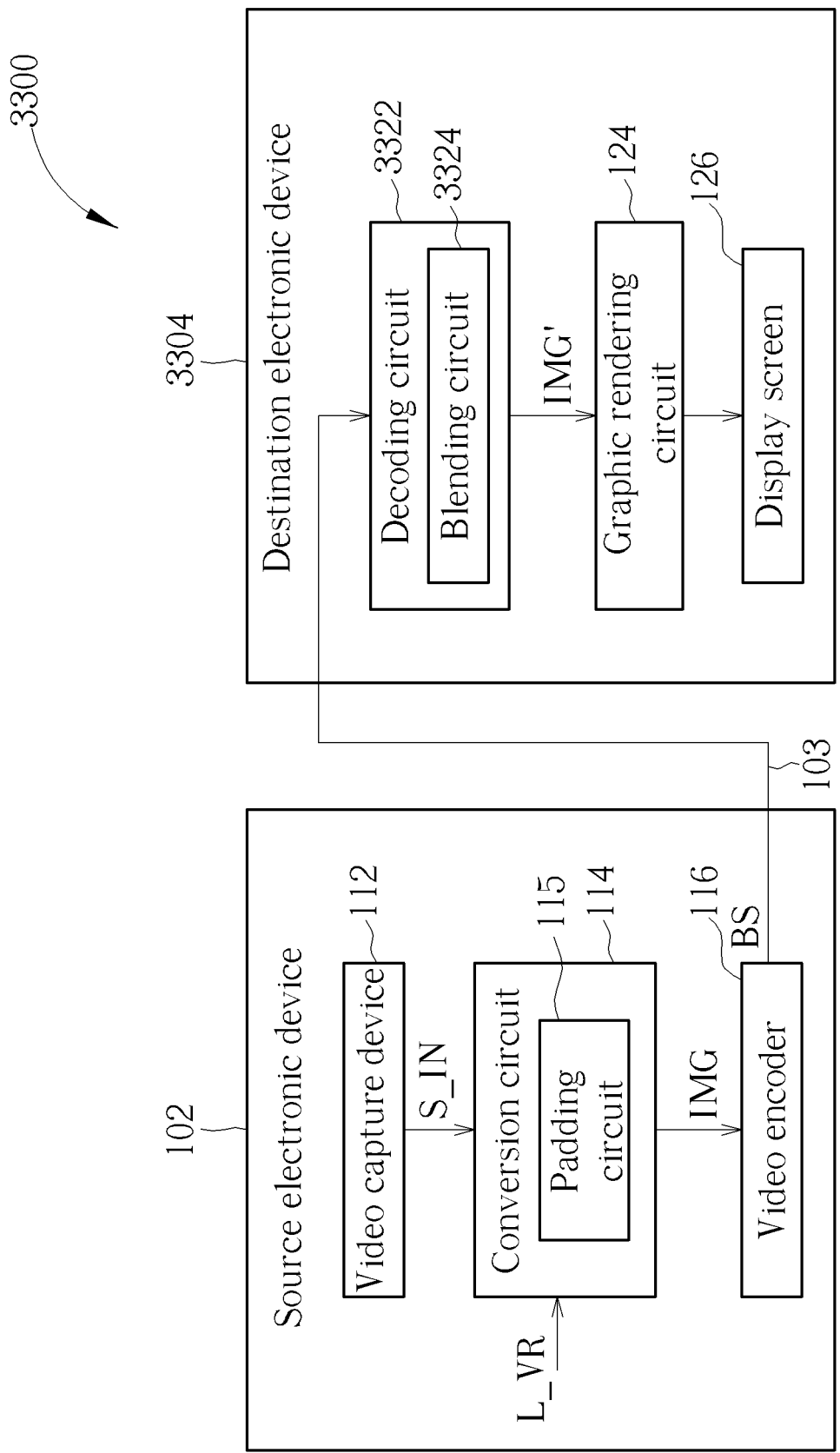
FIG. 33 is a diagram illustrating a fifth 360 VR system according to an embodiment of the present invention.

FIG. 32 is a diagram illustrating a fourth 360 VR system according to an embodiment of the present invention. The major difference between the 360 VR systems 2700 and 3200 is that a decoding circuit 3222 of a destination electronic device 3204 has a blending circuit 3224 arranged to perform blending after coding. FIG. 33 is a diagram illustrating a fifth 360 VR system according to an embodiment of the present invention. The major difference between the 360 VR systems 100 and 3300 is that a decoding circuit 3322 of a destination electronic device 3304 has a blending circuit 3324 arranged to perform blending after coding.

The decoding circuit 3222/3322 is arranged to decode a part of the bitstream BS to generate a decoded frame (i.e., a decoded projection-based frame) IMG' with at least one projection face and at least one padding region packed in the 360 VR projection layout L_VR (e.g., a projection layout with boundary padding, a projection layout with edge padding, or a projection layout with boundary padding and edge padding). During the decoding process of generating the decoded frame IMG', the decoding circuit 3222/3322 reconstructs a first pixel in a projection face by using the blending circuit 3224/3324 to blend a decoded pixel value obtained for the first pixel and a decoded pixel value obtained for a second pixel included in a padding region. For example, the padding region is generated by the padding circuit 2716/115 at the encoder side (i.e., source electronic device 2702/102) through using the aforementioned third exemplary padding design. That is, a pixel value of the second pixel included in the padding region packed in the projection-based frame IMG is generated due to duplication applied to a partial region in the projection face. For another example, the padding region is generated by the padding circuit 2716/115 at the encoder side (i.e., source electronic device 2702/102) through using the aforementioned first exemplary padding design. That is, a pixel value of the second pixel included in the padding region packed in the projection-based frame IMG is generated due to geometry mapping applied to the projection face. In some embodiments of the present invention, a distance-based weighting scheme can be adopted by the blending circuit 3224/3324.

Regarding the blending circuit 3224, it can be used to update pixel values of pixels in a projection face that is obtained from a re-sampling process. Regarding the blending circuit 3324, it can be used to update pixel values of pixels in a projection face that does not undergo a re-sampling process. The same distance-based weighting scheme can be adopted by both of the blending circuits 3224 and 3324. In the following description of the distance-based weighting scheme, the term "projection face" may mean a projection face that is obtained from a re-sampling process or a projection face that does not undergo a re-sampling process.

Figure 34:
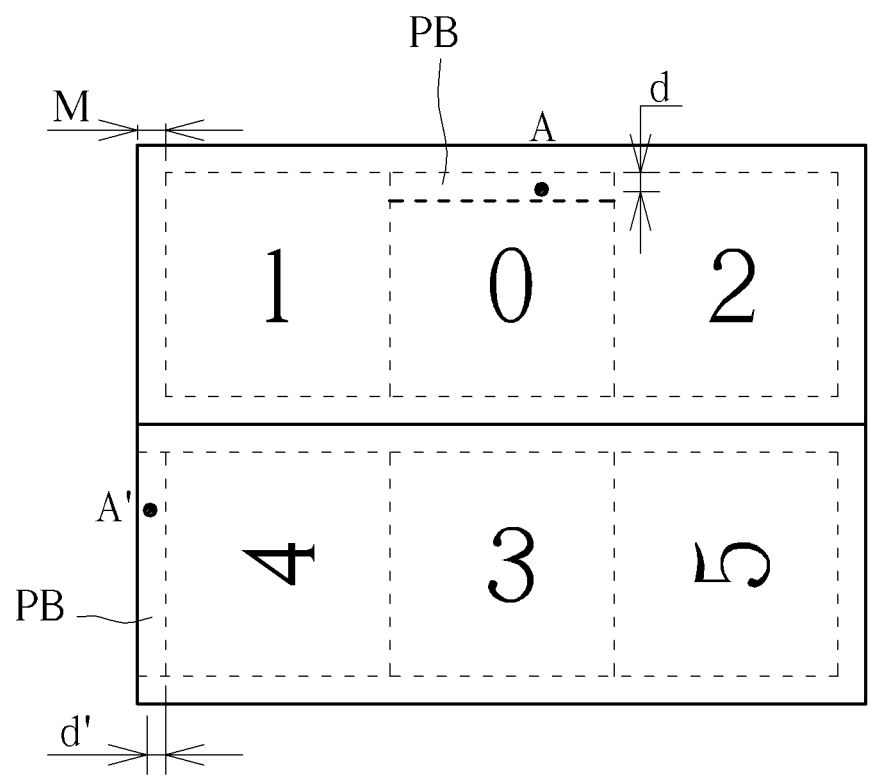
FIG. 34 is a diagram illustrating a decoder-side blending operation according to an embodiment of the present invention.

FIG. 34 is a diagram illustrating a decoder-side blending operation according to an embodiment of the present invention. Suppose that the exemplary padding design shown in FIG. 31 is employed by the padding circuit 2716/115. Hence, a padding region of one projection face is obtained by copying a partial region in another projection face according to the aforementioned third exemplary padding design. Based on image content continuity characteristics, a padding region added to the left side of the projection face "4" in FIG. 34 is set by a duplicate of the partial region PB in the square projection face "0". However, an encoding result of the partial region PB in the square projection face "0" and an encoding result of the padding region added to the left side of the projection face "4" are not necessarily the same. Hence, at a decoder side (e.g., destination electronic device 3204/3304), decoded pixels obtained from decoding of the partial region PB in the square projection face "0" can be blended with decoded pixels obtained from decoding of the padding region added to the left side of the projection face "4". If projection faces have different widths and/or heights due to padding, re-sampling the padding region (e.g., interpolating the padding pixels) is needed for blending according to the ratio of different widths and/or heights.

A reconstructed pixel value of a target pixel (i.e., a source pixel with a pixel value to be updated) in a projection face is an updated pixel value that can be computed by using a following formula.

$$S_{REC} = \frac{(M-N)*T + (M+N)*S}{2*M} \quad (4)$$

In above formula (4), $S_{REC}$ represents the reconstructed pixel value (updated pixel value) of the target pixel in the projection face (e.g., a pixel A in the square projection face "0"), S represents the decoded pixel value (original pixel value) obtained for the target pixel, T represents the decoded pixel value obtained for a corresponding padding pixel in a padding region (e.g., a padding pixel A' in the padding region added to the left side of the square projection face "4"), M represents a padding width of the padding region, and N represents a distance between the target pixel and one side of the projection face. As shown in FIG. 34, the distance between the pixel A and the top side of the square projection face "0" is represented by d, and the distance between the padding pixel A' and the left side of the square projection face "4" is represented by d'. Since a padding region of one projection face is obtained by copying a partial region in another projection face according to the aforementioned third exemplary padding design, the padding pixel A' is located at an integer position (i.e., (x, y), where x and y are integer positions) in the padding region, and the value of d is equal to the value of d'.

However, if a padding region of a projection face is obtained by applying geometry padding to the projection face according to the aforementioned first exemplary padding design, the padding pixel A' may be located at a non-integer position (i.e., (x, y), where x is not an integer position, and/or y is not an integer position) in the padding region, and the value of d may be different from the value of d'. Specifically, the 2D coordinate of the padding pixel A' is converted from the 2D coordinate of the pixel A due to geometry mapping. That is, the pixel A located at an integer position (i.e., (X, Y), where X and Y are integer positions) in the square projection face "0" may be mapped to the padding pixel A' located at a non-integer position (i.e., (x, y), where x is not an integer position, and/or y is not an integer position) in the padding region. Since a pixel value of the padding pixel A' located at a non-integer position is not directly available in the padding region, the blending circuit 3224/3324 may determine the pixel value of the padding pixel A' located at the non-integer position in the padding region by using an interpolation filter to process padding pixels located at integer positions in the padding region. After the pixel value of the padding pixel A' located at the non-integer position is determined, the above formula (4) is used to compute the updated pixel value of the pixel A in the square projection face "0".

In above formula (4), N represents a distance between the target pixel and one side of the projection face. In a first exemplary design, N is set by a positive integer value. For example, N=i+1, where i is the index (distance) counted from one side of the projection face, and 0≤i<M. FIG. 35 is a diagram illustrating the relationship between the weighting values of pixels and the index values of pixels that are involved in updating pixel values of pixels in a projection face according to an embodiment of the present invention. Suppose M=4 and N=i+1. The above formula (4) can be rewritten as below.

$$A_{i,updated} = \frac{(4-i-1)*A'_i + (4+i+1)*A_i}{2*4} \quad (5)$$

In above formula (5), $A_i$ represents a decoded pixel value obtained for a target pixel with an index i in a projection face, $A_{i,updated}$ represents the reconstructed pixel value (updated pixel value) of the target pixel in the projection face, and $A'_i$ represents a decoded pixel value obtained for a corresponding padding pixel in a padding region. As illustrated in FIG. 35, the weighting of the target pixel $A_3$ (i.e., $A_i$ with i=3) is equal to 8 (i.e., 4+3+1), and the weighting of the corresponding padding pixel $A'_3$ (i.e., $A'_i$ with i=3) is equal to 0 (i.e., 4−3−1); the weighting of the target pixel $A_2$ (i.e., $A_i$ with i=2) is equal to 7 (i.e., 4+2+1), and the weighting of the corresponding padding pixel $A'_2$ (i.e., $A'_i$ with i=2) is equal to 1 (i.e., 4−2−1); the weighting of the target pixel $A_1$ (i.e., $A_i$ with i=1) is equal to 6 (i.e., 4+1+1), and the weighting of the corresponding padding pixel $A'_1$ (i.e., $A'_i$ with i=1) is equal to 2 (i.e., 4−1−1); and the weighting of the target pixel $A_0$ (i.e., $A_i$ with i=0) is equal to 5 (i.e., 4+0+1), and the weighting of the padding pixel $A'_0$ (i.e., $A'_i$ with i=0) is equal to 3 (i.e., 4−0−1).

As shown in FIG. 35, the weighting is not decreased from 8 to 0 with a constant step size due to the face that the difference between the adjacent weighting values "5" and "3" is equal to 2. To address this issue, the present invention proposes another setting of a distance between the target pixel and one side of the projection face. In a second exemplary design, N is set by a positive non-integer value. For example, N=i+0.5, where i is the index (distance) counted from one side of the projection face, and 0≤i<M. FIG. 36 is a diagram illustrating another relationship between the weighting values of pixels and the index values of pixels that are involved in updating pixel values of pixels in a projection face according to an embodiment of the present invention. Suppose M=4 and N=i+0.5. The above formula (4) can be rewritten as below.

$$A_{i,updated} = \frac{(4-i-0.5)*A'_i + (4+i+0.5)*A_i}{2*4} \quad (6)$$

In above formula (6), $A_i$ represents a decoded pixel value obtained for a target pixel with an index i in a projection face, $A_{i,updated}$ represents the reconstructed pixel value (updated pixel value) of the target pixel in the projection face, and $A'_i$ represents a decoded pixel value obtained for a corresponding padding pixel in a padding region. As illustrated in FIG. 36, the weighting of the target pixel $A_3$ (i.e., $A_i$ with i=3) is equal to 7.5 (i.e., 4+3+0.5), and the weighting of the corresponding padding pixel $A'_3$ (i.e., $A'_i$ with i=3) is equal to 0.5 (i.e., 4−3−0.5); the weighting of the target pixel $A_2$ (i.e., $A_i$ with i=2) is equal to 6.5 (i.e., 4+2+0.5), and the weighting of the corresponding padding pixel $A'_2$ (i.e., $A'_i$ with i=2) is equal to 1.5 (i.e., 4−2−0.5); the weighting of the target pixel $A_1$ (i.e., $A_i$ with i=1) is equal to 5.5 (i.e., 4+1+0.5), and the weighting of the corresponding padding pixel $A'_1$ (i.e., $A'_i$ with i=1) is equal to 2.5 (i.e., 4−1−0.5); and the weighting of the target pixel $A_0$ (i.e., $A_i$ with i=0) is equal to 4.5 (i.e., 4+0+0.5), and the weighting of the padding pixel $A'_0$ (i.e., $A'_i$ with i=0) is equal to 3.5 (i.e., 4−0−0.5). The weighting is decreased from 7.5 to 0.5 with a constant step size.

For certain applications, a conversion circuit may be implemented in a destination electronic device to convert a decoded frame with a projection layout of a first 360 VR projection format into a converted frame with a projection layout of a second 360 VR projection format that is different from the first 360 VR projection format. For example, the decoded frame generated from a decoding circuit may be a projection-based frame with projection faces and padding regions packed in a cubemap projection layout with padding, and the converted frame generated from the conversion circuit and used by a following graphic rendering circuit may be a projection-based frame with projection faces packed in a typical equirectangular projection (ERP) layout without padding. A pixel located at an integer position (i.e., (x, y), where x and y are integer positions) in the converted frame may be mapped to a pixel located at a non-integer position (i.e., (x', y'), where x' is not an integer position and/or y' is not an integer position) in the decoded frame. That is, when performing projection layout conversion, the conversion circuit may set a pixel value of a pixel located at an integer position in the converted frame by a pixel value of a pixel located at a non-integer position in the decoded frame. Since a pixel value of a pixel located at a non-integer position is not directly available in the decoded frame, the conversion circuit may determine the pixel value of the pixel located at the non-integer position in the decoded frame by using an interpolation filter to process pixels located at integer positions in the decoded frame. In a case where the pixel with the non-integer position is at or near an edge of a projection face in the decoded frame, the pixels used by the interpolation filter may include at least one pixel selected from the projection face and at least one pixel selected from the corresponding padding region. As mentioned above, pixel values of pixels in the projection face are updated by blending (e.g., distance-based weighting). However, pixel values of padding pixels in the corresponding padding region are not updated by blending (e.g., distance-based weighting). As a result, artifacts may be introduced due to interpolation performed upon updated pixel values of pixels in the projection face and original pixel values of padding pixels in the corresponding padding region. To address this issue, the present invention proposes another blending scheme which is performed to update pixel values of pixels in a projection face as well as pixel values of padding pixels in a corresponding padding region.

Figure 37:
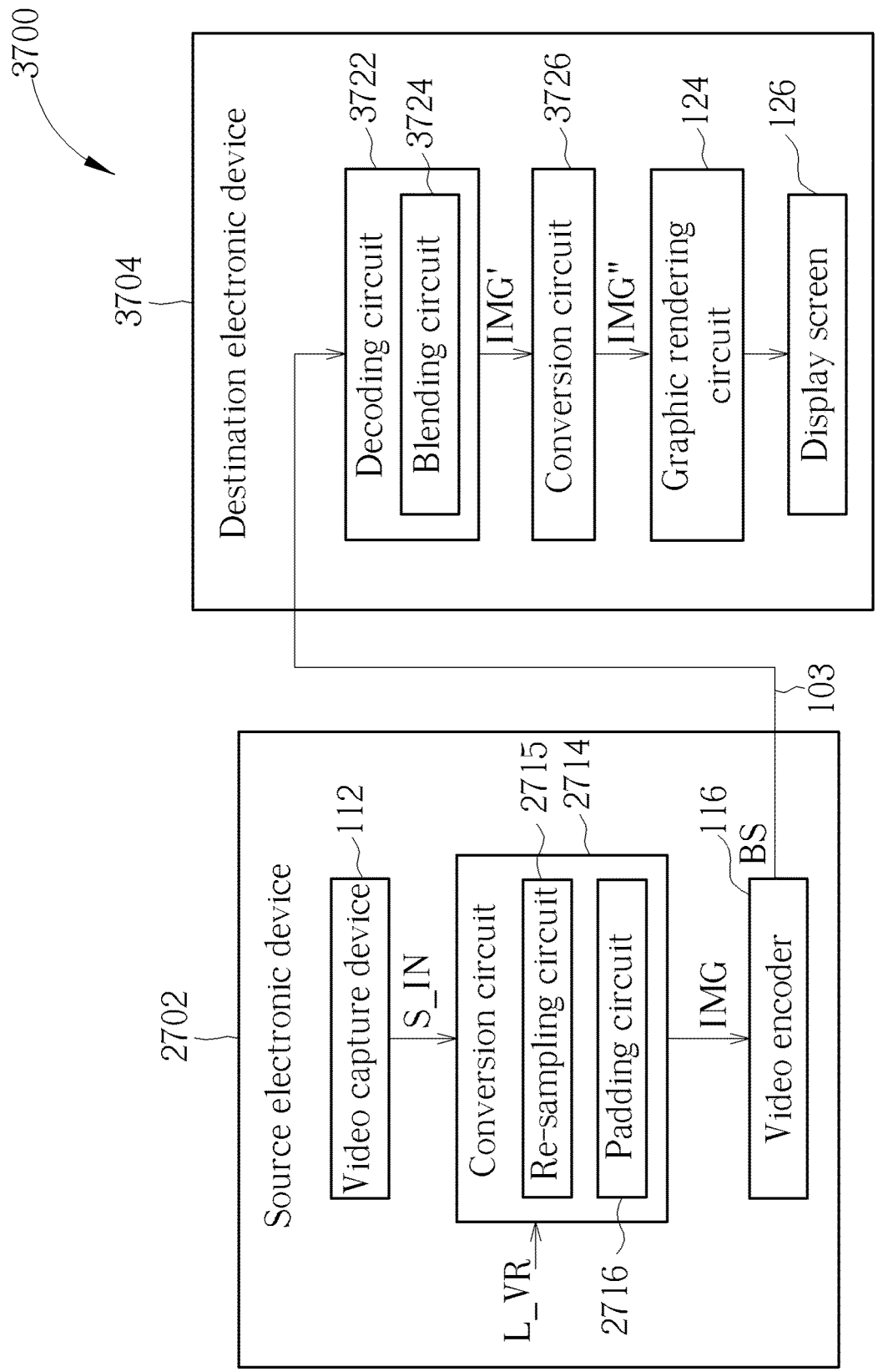
FIG. 37 is a diagram illustrating a sixth 360 VR system according to an embodiment of the present invention.

FIG. 37 is a diagram illustrating a sixth 360 VR system according to an embodiment of the present invention. The major difference between the 360 VR systems 3200 and 3700 is that a blending circuit 3724 in a decoding circuit 3722 of a destination electronic device 3704 is arranged to perform blending for updating pixel values of pixels in projection faces as well as pixel values of padding pixels in padding regions, and the destination electronic device 3704 further includes a conversion circuit 3726 arranged to convert a decoded frame (i.e., a decoded projection-based frame) IMG' with one 360 VR projection layout into a converted frame (i.e., a converted projection-based frame) IMG" with a different 360 VR projection layout. In one embodiment of the present invention, the 360 VR projection layout L_VR may be a CMP layout with padding, and the converted 360 VR projection layout may be an ERP layout without padding. However, this is for illustrative purposes only, and is not meant to be a limitation of the present invention.

Figure 38:
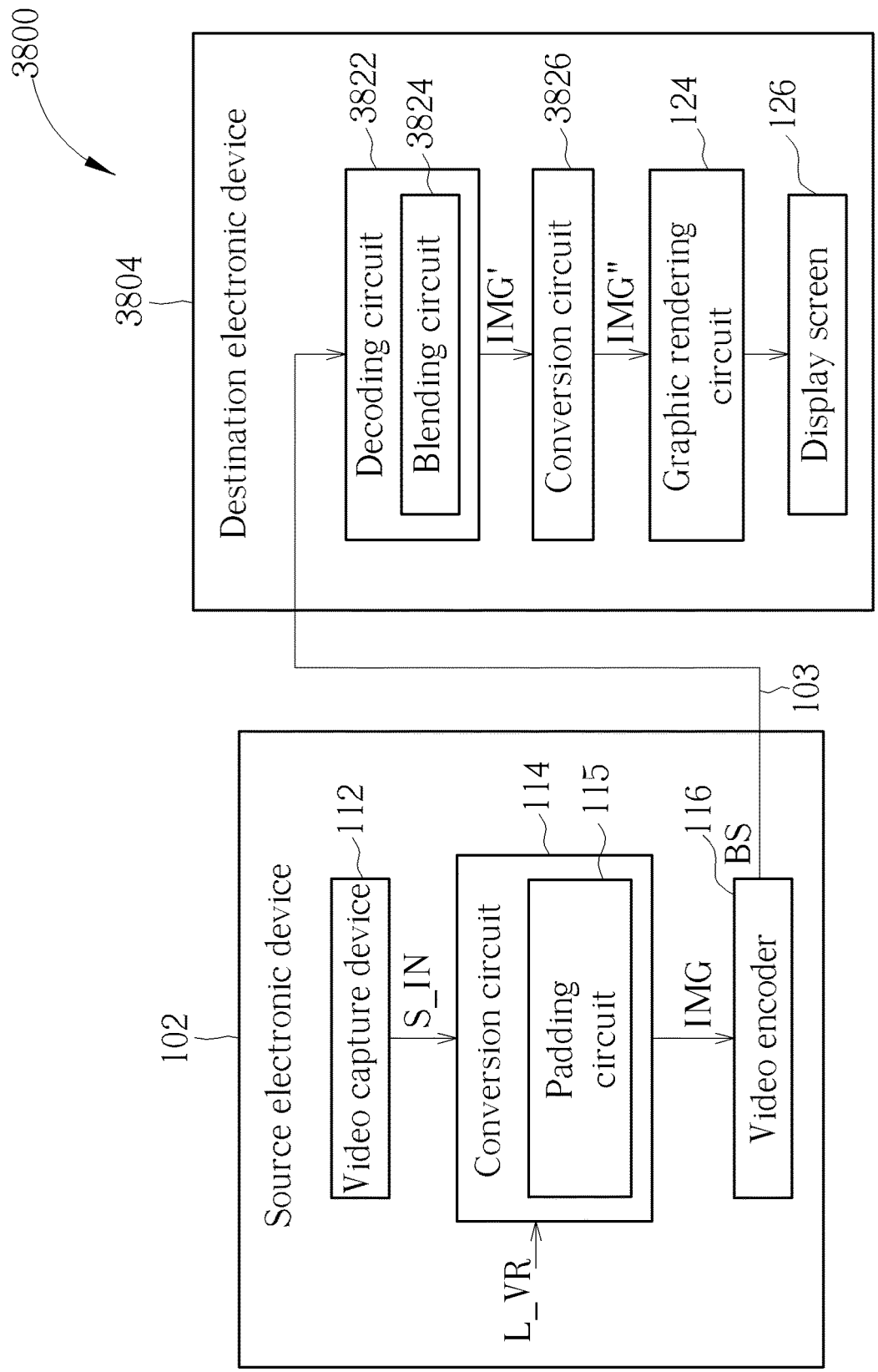
FIG. 38 is a diagram illustrating a seventh 360 VR system according to an embodiment of the present invention.

FIG. 38 is a diagram illustrating a seventh 360 VR system according to an embodiment of the present invention. The major difference between the 360 VR systems 3300 and 3800 is that a blending circuit 3824 in a decoding circuit 3822 of a destination electronic device 3804 is arranged to perform blending for updating pixel values of pixels in projection faces as well as pixel values of padding pixels in padding regions, and the destination electronic device 3804 further includes a conversion circuit 3826 arranged to convert a decoded frame IMG' with one 360 VR projection layout into a converted frame IMG" with a different 360 VR projection layout. In one embodiment of the present invention, the 360 VR projection layout L_VR may be a CMP layout, and the converted 360 VR projection layout may be an ERP layout. However, this is for illustrative purposes only, and is not meant to be a limitation of the present invention.

Regarding the embodiments shown in FIG. 37 and FIG. 38, the 360 VR projection layout L_VR used by the projection-based frame IMG and the decoded frame IMG' may be a projection layout for one 360 VR projection format that is different from another 360 VR projection format associated with the converted frame IMG". For example, different projection layouts used by the decoded frame IMG' and the converted frame IMG" L_VR may be selected from a group of projection layouts, including an ERP layout, a plurality of cube-based projection layouts (e.g., a CMP layout, a pyramid projection layout, a truncated square pyramid projection layout, and a viewport-based cube projection layout), a plurality of triangle-based projection layouts (e.g., an octahedron projection layout, an icosahedron projection layout, a tetrahedron projection layout, a tetragon quartz-based projection layout, and a hexagon quartz-based projection layout), a segmented sphere projection (SSP) layout, an equatorial cylindrical projection layout, a rotated sphere projection layout, etc.

In some embodiments of the present invention, a distance-based weighting scheme can be adopted by the blending circuit 3724/3824. Regarding the blending circuit 3724, it can be used to update pixel values of pixels in a projection face that is obtained from a re-sampling process and can be further used to update pixel values of padding pixels in a padding region. Regarding the blending circuit 3824, it can be used to update pixel values of pixels in a projection face that does not undergo a re-sampling process, and can be further used to update pixel values of padding pixels in a padding region. The same distance-based weighting scheme can be adopted by both of the blending circuits 3724 and 3824. In the following description of the distance-based weighting scheme, the term "projection face" may mean a projection face that is obtained from a re-sampling process or a projection face that does not undergo a re-sampling process.

Please refer to FIG. 34 again. Suppose that the exemplary padding design shown in FIG. 31 is employed by the padding circuit 2716/115. Hence, a padding region of one projection face is obtained by copying a partial region in another projection face according to the aforementioned third exemplary padding design. Based on image content continuity characteristics, a padding region added to the left side of the projection face "4" is set by a duplicate of the partial region PB in the square projection face "0". However, an encoding result of the partial region PB in the square projection face "0" and an encoding result of the padding region added to the left side of the projection face "4" are not necessarily the same. Hence, at a decoder side (e.g., destination electronic device 3704/3804), decoded pixels obtained from decoding of the partial region PB in the square projection face "0" can be blended with decoded pixels obtained from decoding of the padding region added to the left side of the projection face "4". In this embodiment, the blending circuit 3724/3824 is used to update pixel values of pixels in the partial region PB of the square projection face "0" by blending original pixel values of pixels in the partial region PB of the square projection face "0" with original pixel values of padding pixels in the padding region added to the left side of the projection face "4", and the blending circuit 3724/3824 is further used to update pixel values of padding pixels in the padding region added to the left side of the projection face "4" by blending original pixel values of padding pixels in the padding region added to the left side of the projection face "4" and original pixel values of pixels in the partial region PB of the square projection face "0". If projection faces have different widths and/or heights due to padding, re-sampling the padding region (e.g., interpolating the padding pixels) is needed for blending according to the ratio of different widths and/or heights.

A reconstructed pixel value of a target pixel (i.e., a source pixel with a pixel value to be updated) in any of a projection face and a padding region is an updated pixel value that can be computed by using a following formula.

$$S'_{REC} = \frac{(M-N')*T' + (M+N')*S'}{2*M} \quad (7)$$

In above formula (7), $S'_{REC}$ represents the reconstructed pixel value (updated pixel value) of the target pixel (e.g., a pixel A in the square projection face "0" shown in FIG. 34, or a padding pixel A' in the padding region added to the left side of the square projection face "4" shown in FIG. 34), S' represents the decoded pixel value (original pixel value) obtained for the target pixel, T represents the decoded pixel value obtained for a corresponding pixel that will be blended with the target pixel (e.g., the padding pixel A' in the padding region added to the left side of the square projection face "4" shown in FIG. 34, or the pixel A in the square projection face "0" shown in FIG. 34), M represents a padding width of the padding region, and N' represents a distance between the target pixel and one side of a projection face. In a case where the target pixel is the pixel A in the square projection face "0" shown in FIG. 34, N' is set by a value representative of the distance between the pixel A and the top side of the square projection face "0". In another case where the target pixel is the padding pixel A' in the padding region added to the left side of the square projection face "4" shown in FIG. 34, N' is set by a value representative of the distance between the padding pixel A' and the left side of the square projection face "4".

As shown in FIG. 34, the distance between the pixel A and the top side of the square projection face "0" is represented by d, and the distance between the padding pixel A' and the left side of the square projection face "4" is represented by d'. Since a padding region of one projection face is obtained by copying a partial region in another projection face according to the aforementioned third exemplary padding design, the padding pixel A' is located at an integer position (i.e., (x, y), where x and y are integer positions) in the padding region, and the value of d is equal to the value of d'.

However, if a padding region of a projection face is obtained by applying geometry padding to the projection face according to the aforementioned first exemplary padding design, a target pixel (which has a pixel value to be updated) is located at an integer position (i.e., (x, y), where x and y are integer positions), and a non-target pixel (which has a pixel value that is blended with the pixel value of the target pixel) may be located at a non-integer position (i.e., (x', y'), where x' is not an integer position, and/or y' is not an integer position). In a case where the target pixel is the pixel A in the square projection face "0", the non-target pixel is the padding pixel A' that may be located at a non-integer position in the padding region, where the value of d may be different from the value of d'. Specifically, the 2D coordinate of the padding pixel A' is converted from the 2D coordinate of the pixel A due to geometry mapping. That is, the pixel A located at an integer position (i.e., (x, y), where x and y are integer positions) in the square projection face "0" may be mapped to the padding pixel A' located at a non-integer position (i.e., (x', y'), where x' is not an integer position, and/or y' is not an integer position) in the padding region. Since a pixel value of the padding pixel A' located at a non-integer position is not directly available in the padding region, the blending circuit 3724/3824 may determine the pixel value of the padding pixel A' located at the non-integer position in the padding region by using an interpolation filter to process padding pixels located at integer positions in the padding region. After the pixel value of the padding pixel A' located at the non-integer position is determined, the above formula (7) is used to compute the updated pixel value of the pixel A.

In another case where the target pixel is the padding pixel A' in the padding region added to the left side of the square projection face "4", and the non-target pixel is the pixel A that may be located at a non-integer position (i.e., (x', y'), where x' is not an integer position, and/or y' is not an integer position) in the square projection face "0", where the value of d may be different from the value of d'. Specifically, the 2D coordinate of the pixel A is converted from the 2D coordinate of the padding pixel A' due to geometry mapping. That is, the padding pixel A' located at an integer position (i.e., (x, y), where x and y are integer positions) in the padding region may be mapped to the pixel A located at a non-integer position (i.e., (x', y'), where x' is not an integer position, and/or y' is not an integer position) in the square projection face "0". Since a pixel value of the pixel A located at a non-integer position is not directly available in the square projection face "0", the blending circuit 3724/3824 may determine the pixel value of the pixel A located at the non-integer position in the square projection face "0" by using an interpolation filter to process pixels located at integer positions in the square projection face "0". After the pixel value of the pixel A located at the non-integer position is determined, the above formula (7) is used to compute the updated pixel value of the padding pixel A'.

In above formula (7), N' represents a distance between the target pixel and one side of a projection face, where the target pixel may be a pixel in a projection face or a padding pixel in a padding region. In a first exemplary design, N' is set by a non-integer value. For example, N'=i+0.5, where i is the index (distance) counted from one side of a projection face. In this embodiment, i is set by a negative integer value when the target pixel is a padding pixel in a padding region that is located outside of a projection face, and is set by a non-negative integer value when the target pixel is a pixel included in a projection face. FIG. 39 is a diagram illustrating the relationship between the weighting values of pixels and the index values of pixels that are involved in updating pixel values of pixels in a projection face and pixels values of padding pixels in a padding region according to an embodiment of the present invention. Suppose M=4 and N=i+0.5. The above formula (7) can be rewritten as below.

$$A_{i,updated} = \frac{(4-i-0.5)*A'_i + (4+i+0.5)*A_i}{2*4}, \text{ where } -4 \leq i \leq 4 \quad (8)$$

In above formula (8), $A_i$ represents a decoded pixel value obtained for a target pixel with an index i, $A_{i,updated}$ represents the reconstructed pixel value (updated pixel value) of the target pixel, and $A'_i$ represents a decoded pixel value obtained for a corresponding non-target pixel. As illustrated in FIG. 39, the weighting of the target pixel $A_3$ in a projection face (i.e., $A_i$ with i=3) is equal to 7.5 (i.e., 4+3+0.5), and the weighting of the corresponding non-target pixel $A'_3$ in a padding region (i.e., $A'_i$ with i=3) is equal to 0.5 (i.e., 4-3-0.5); the weighting of the target pixel $A_2$ in the projection face (i.e., $A_i$ with i=2) is equal to 6.5 (i.e., 4+2+0.5), and the weighting of the corresponding non-target pixel $A'_2$ in the padding region (i.e., with i=2) is equal to 1.5 (i.e., 4-2-0.5); the weighting of the target pixel $A_1$ in the projection face (i.e., $A_i$ with i=1) is equal to 5.5 (i.e., 4+1+0.5), and the weighting of the corresponding non-target pixel $A'_1$ in the padding region (i.e., $A'_i$ with i=1) is equal to 2.5 (i.e., 4-1-0.5); and the weighting of the target pixel $A_0$ in the projection face (i.e., $A_i$ with i=0) is equal to 4.5 (i.e., 4+0+0.5), and the weighting of the corresponding non-target pixel $A'_0$ in the padding region (i.e., $A'_i$ with i=0) is equal to 3.5 (i.e., 4-0-0.5).

Further, as shown in FIG. 39, the weighting of the target pixel $A_{-1}$ in the padding region (i.e., $A_i$ with i=-1) is equal to 3.5 (i.e., 4−1+0.5), and the weighting of the corresponding non-target pixel A'$_{-1}$ in the projection face (i.e., A'$_i$ with i=−1) is equal to 4.5 (i.e., 4+1−0.5); the weighting of the target pixel A$_{-2}$ in the padding region (i.e., A$_i$ with i=−2) is equal to 2.5 (i.e., 4−2+0.5), and the weighting of the corresponding non-target pixel A'$_{-2}$ in the projection face (i.e., A'$_i$ with i=−2) is equal to 5.5 (i.e., 4+2−0.5); the weighting of the target pixel A$_{-3}$ in the padding region (i.e., A$_i$ with i=−3) is equal to 1.5 (i.e., 4−3+0.5), and the weighting of the corresponding non-target pixel A'$_{-3}$ in the projection face (i.e., A'$_i$ with i=−3) is equal to 6.5 (i.e., 4+3−0.5); and the weighting of the target pixel A$_{-4}$ in the padding region (i.e., A$_i$ with i=−4) is equal to 0.5 (i.e., 4−4+0.5), and the weighting of the corresponding non-target pixel A'$_{-4}$ in the projection face (i.e., A'$_i$ with i=−4) is equal to 7.5 (i.e., 4+4−0.5).

In a second exemplary design, N' is set by an integer value. For example, N'=i+1, where i is the index (distance) counted from one side of a projection face. In this embodiment, i is set by a negative integer value when the target pixel is a padding pixel in a padding region, and i is set by a non-negative integer value when the target pixel is a pixel in a projection face. FIG. 40 is a diagram illustrating another relationship between the weighting values of pixels and the index values of pixels that are involved in updating pixel values of pixels in a projection face and pixels values of padding pixels in a padding region according to an embodiment of the present invention. Suppose M=4 and N'=i+1. The above formula (7) can be rewritten as below.

$$A_{i,updated} = \frac{(4-i-1)*A'_i + (4+i+1)*A_i}{2*4}, \text{ where } -4 \le i \le 4 \quad (9)$$

In above formula (9), A$_i$ represents a decoded pixel value obtained for a target pixel with an index i, A$_{i,updated}$ represents the reconstructed pixel value (updated pixel value) of the target pixel, and A'$_i$ represents a decoded pixel value obtained for a corresponding non-target pixel. As illustrated in FIG. 40, the weighting of the target pixel A$_3$ in a projection face (i.e., A$_i$ with i=3) is equal to 8 (i.e., 4+3+1), and the weighting of the corresponding non-target pixel A'$_3$ in a padding region (i.e., A'$_i$ with i=3) is equal to 0 (i.e., 4−3−1); the weighting of the target pixel A$_2$ in the projection face (i.e., A$_i$ with i=2) is equal to 7 (i.e., 4+2+1), and the weighting of the corresponding non-target pixel A'$_2$ in the padding region (i.e., A'$_i$ with i=2) is equal to 1 (i.e., 4−2−1); the weighting of the target pixel A$_1$ in the projection face (i.e., A$_i$ with i=1) is equal to 6 (i.e., 4+1+1), and the weighting of the corresponding non-target pixel A'$_1$ in the padding region (i.e., A'$_i$ with i=1) is equal to 2 (i.e., 4−1−1); and the weighting of the target pixel A$_0$ in the projection face (i.e., A$_i$ with i=0) is equal to 5 (i.e., 4+0+1), and the weighting of the corresponding non-target pixel A'$_0$ in the padding region (i.e., A'$_i$ with i=0) is equal to 3 (i.e., 4−0−1).

Further, as shown in FIG. 40, the weighting of the target pixel A$_{-1}$ in the padding region (i.e., A$_i$ with i=−1) is equal to 4 (i.e., 4−1+1), and the weighting of the corresponding non-target pixel A'$_{-1}$ in the projection face (i.e., A'$_i$ with i=−1) is equal to 4 (i.e., 4+1−1); the weighting of the target pixel A$_{-2}$ in the padding region (i.e., A$_i$ with i=−2) is equal to 3 (i.e., 4−2+1), and the weighting of the corresponding non-target pixel A'$_{-2}$ in the projection face (i.e., A'$_i$ with i=−2) is equal to 5 (i.e., 4+2−1); the weighting of the target pixel A$_{-3}$ in the padding region (i.e., A$_i$ with i=−3) is equal to 2 (i.e., 4−3+1), and the weighting of the corresponding non-target pixel A'$_{-3}$ in the projection face (i.e., A'$_i$ with i=−3) is equal to 6 (i.e., 4+3−1); and the weighting of the target pixel A$_{-4}$ in the padding region (i.e., A$_i$ with i=−4) is equal to 1 (i.e., 4−4+1), and the weighting of the corresponding non-target pixel A'$_{-4}$ in the projection face (i.e., A'$_i$ with i=−4) is equal to 7 (i.e., 4+4−1).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method comprising:
   obtaining a plurality of projection faces from an omnidirectional content of a sphere, wherein the omnidirectional content of the sphere is mapped onto the projection faces via cubemap projection, and the projection faces comprise a first projection face;
   obtaining, by a re-sampling circuit, a first re-sampled projection face by re-sampling at least a portion of the first projection face through non-uniform mapping, wherein the first projection face has a first source region and a second source region, the first re-sampled projection face has a first re-sampled region and a second re-sampled region, the first re-sampled region is derived from re-sampling the first source region with a first sampling density, the second re-sampled region is derived from re-sampling the second source region with a second sampling density that is different from the first sampling density, the first projection face and the first re-sampled projection face have a same shape type being a square, pixels of the first re-sampled region and the second re-sampled region are uniformly distributed within the first re-sampled projection face such that the first re-sampled region and the second re-sampled region have a same pixel density, and pixel values of the pixels of the first re-sampled region and the second re-sampled region are derived from non-uniformly distributed sampling positions that are found in the first projection face according to the non-uniform mapping;
   generating a projection-based frame according to a projection layout of the cubemap projection, wherein the projection-based frame comprises the first re-sampled projection face packed in the projection layout; and
   encoding the projection-based frame to generate a part of a bitstream.

2. The video processing method of claim 1, wherein the projection faces further comprise a second projection face, the video processing method further comprises:
   obtaining a second re-sampled projection face by re-sampling at least a portion of the second projection face through non-uniform mapping, wherein the projection-based frame further comprises the second re-sampled projection face packed in the projection layout; and
   at least one non-uniform mapping function employed for re-sampling said at least a portion of the first projection face is different from at least one non-uniform mapping function employed for re-sampling said at least a portion of the second projection face.

3. The video processing method of claim 1, wherein said non-uniform mapping comprises a non-uniform mapping function employed for re-sampling said at least a portion of the first projection face, and the non-uniform mapping function is expressed by:

f(p)=A*p²+B*p, where A+B=1, p represents a pixel position within the first projection face in a selected direction, and f(p) represents a pixel position within the first re-sampled projection face in the selected direction.

4. The video processing method of claim 3, wherein A=−0.385 and B=1.385.

5. A video processing method comprising:
obtaining a plurality of projection faces from an omnidirectional content of a sphere, wherein the omnidirectional content of the sphere is mapped onto the projection faces via cubemap projection, and the projection faces comprise a first projection face;
obtaining, by a re-sampling circuit, a first re-sampled projection face by re-sampling at least a portion of the first projection face through non-uniform mapping, wherein the first projection face has a first source region and a second source region, the first re-sampled projection face has a first re-sampled region and a second re-sampled region, the first re-sampled region is derived from re-sampling the first source region with a first sampling density, and the second re-sampled region is derived from re-sampling the second source region with a second sampling density that is different from the first sampling density;
generating a projection-based frame according to a projection layout of the cubemap projection, wherein the projection-based frame comprises the first re-sampled projection face packed in the projection layout; and
encoding the projection-based frame to generate a part of a bitstream;
wherein said non-uniform mapping comprises a first non-uniform mapping function employed for re-sampling said at least a portion of the first projection face in a first direction, and a second non-uniform mapping function employed for re-sampling said at least a portion of the first projection face in a second direction, the first non-uniform mapping function and the second non-uniform mapping function are both applied to a same projection face on a two-dimensional plane, the first direction and the second direction are perpendicular to each other on the two-dimensional plane, and the second non-uniform mapping function is different from the first non-uniform mapping function.

6. A video processing method comprising:
receiving a bitstream; and
decoding, by a decoding circuit, a part of the bitstream to generate a projection-based frame having a projection layout of cubemap projection, wherein the projection-based frame comprises a first re-sampled projection face packed in the projection layout, the first re-sampled projection face is a result of re-sampling at least a portion of a first projection face through non-uniform mapping, the first projection face is one of a plurality of projection faces, an omnidirectional content of a sphere is mapped onto the projection faces via the cubemap projection, the first projection face has a first source region and a second source region, the first re-sampled projection face has a first re-sampled region and a second re-sampled region, the first re-sampled region is a result of re-sampling the first source region with a first sampling density, the second re-sampled region is a result of re-sampling the second source region with a second sampling density that is different from the first sampling density, the first projection face and the first re-sampled projection face have a same shape type being a square, pixels of the first re-sampled region and the second re-sampled region are uniformly distributed within the first re-sampled projection face such that the first re-sampled region and the second re-sampled region have a same pixel density, and pixel values of the pixels of the first re-sampled region and the second re-sampled region are derived from non-uniformly distributed sampling positions that are found in the first projection face according to the non-uniform mapping.

7. The video processing method of claim 6, wherein the projection-based frame further comprises a second re-sampled projection face packed in the projection layout, the second re-sampled projection face is a result of re-sampling at least a portion of a second projection face through non-uniform mapping, the second projection face is one of the projection faces, and at least one non-uniform mapping function employed for re-sampling said at least a portion of the first projection face is different from at least one non-uniform mapping function employed for re-sampling said at least a portion of the second projection face.

8. The video processing method of claim 6, wherein said non-uniform mapping comprises a non-uniform mapping function employed for re-sampling said at least a portion of the first projection face, and the non-uniform mapping function is expressed by:
f(p)=A*p²+B*p, where A+B=1, p represents a pixel position within the first projection face in a selected direction, and f(p) represents a pixel position within the first re-sampled projection face in the selected direction.

9. The video processing method of claim 8, wherein A=−0.385 and B=1.385.

10. A video processing method comprising:
receiving a bitstream; and
decoding, by a decoding circuit, a part of the bitstream to generate a projection-based frame having a projection layout of cubemap projection, wherein the projection-based frame comprises a first re-sampled projection face packed in the projection layout, the first re-sampled projection face is a result of re-sampling at least a portion of a first projection face through non-uniform mapping, the first projection face is one of a plurality of projection faces, an omnidirectional content of a sphere is mapped onto the projection faces via the cubemap projection, the first projection face has a first source region and a second source region, the first re-sampled projection face has a first re-sampled region and a second re-sampled region, the first re-sampled region is a result of re-sampling the first source region with a first sampling density, the second re-sampled region is a result of re-sampling the second source region with a second sampling density that is different from the first sampling density;
wherein said non-uniform mapping comprises a first non-uniform mapping function and a second non-uniform mapping function, said at least a portion of the first projection face is re-sampled by the first non-uniform mapping function in a first direction and re-sampled by the second non-uniform mapping function in a second direction, the first non-uniform mapping function and the second non-uniform mapping function are both applied to a same projection face on a two-dimensional plane, the first direction and the second direction are perpendicular to each other on the two-dimensional plane, and the second non-uniform mapping function is different from the first non-uniform mapping function.

* * * * *